United States Patent
Tagg et al.

(10) Patent No.: US 9,049,042 B2
(45) Date of Patent: Jun. 2, 2015

(54) SYSTEM FOR PROVIDING MOBILE VOIP

(75) Inventors: James Peter Tagg, Edenbridge (GB); Andrew Donald McEwan, Hanwell (GB)

(73) Assignee: Truphone Limited (GB)

( * ) Notice: Subject to any disclaimer, the term of this patent is extended or adjusted under 35 U.S.C. 154(b) by 1785 days.

(21) Appl. No.: 11/129,184

(22) Filed: May 12, 2005

(65) Prior Publication Data

US 2005/0286466 A1    Dec. 29, 2005

Related U.S. Application Data

(63) Continuation-in-part of application No. 09/706,406, filed on Nov. 3, 2000.

(51) Int. Cl.
| | |
|---|---|
| G06F 15/16 | (2006.01) |
| H04L 12/28 | (2006.01) |
| H04L 12/46 | (2006.01) |
| H04L 29/06 | (2006.01) |

(52) U.S. Cl.
CPC ........ *H04L 12/2856* (2013.01); *H04L 12/4633* (2013.01); *H04L 63/029* (2013.01)

(58) Field of Classification Search
CPC .............. H04L 12/2856; H04L 63/029; H04L 12/4633
USPC .................................................. 709/227–229
See application file for complete search history.

(56) References Cited

U.S. PATENT DOCUMENTS

| | | | | |
|---|---|---|---|---|
| 5,008,953 | A * | 4/1991 | Dahlin et al. ................. | 455/423 |
| 5,966,657 | A * | 10/1999 | Sporre ........................... | 455/425 |
| 6,091,951 | A * | 7/2000 | Sturniolo et al. .......... | 455/432.2 |
| 6,154,465 | A * | 11/2000 | Pickett .......................... | 370/466 |
| 6,497,412 | B1 * | 12/2002 | Bramm ......................... | 273/430 |
| 6,522,884 | B2 * | 2/2003 | Tennison et al. .............. | 455/445 |
| 6,732,176 | B1 * | 5/2004 | Stewart et al. ................ | 709/227 |
| 6,757,262 | B1 * | 6/2004 | Weisshaar et al. ............ | 370/310 |
| 6,856,612 | B1 * | 2/2005 | Bjelland et al. ............... | 370/338 |
| 6,889,321 | B1 * | 5/2005 | Kung et al. ................... | 713/153 |
| 6,996,076 | B1 * | 2/2006 | Forbes et al. ................. | 370/310 |
| 7,173,923 | B2 * | 2/2007 | Beach ........................... | 370/338 |
| 7,333,799 | B2 * | 2/2008 | Natarajan ..................... | 455/411 |
| 7,346,926 | B2 * | 3/2008 | Vaarala et al. .................. | 726/14 |
| 7,684,374 | B2 * | 3/2010 | Karaoguz et al. ............. | 370/338 |
| 7,778,187 | B2 * | 8/2010 | Chaturvedi et al. ........... | 370/242 |
| 8,139,578 | B2 * | 3/2012 | Chaturvedi et al. ........... | 370/389 |
| 8,699,474 | B2 * | 4/2014 | Beach ........................... | 370/338 |
| 2001/0032254 | A1 * | 10/2001 | Hawkins ....................... | 709/219 |
| 2002/0041660 | A1 * | 4/2002 | Nakamura ................. | 379/88.17 |
| 2002/0062385 | A1 * | 5/2002 | Dowling ........................ | 709/230 |
| 2002/0101848 | A1 * | 8/2002 | Lee et al. ...................... | 370/349 |

(Continued)

OTHER PUBLICATIONS

NPL: Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.*

*Primary Examiner* — Philip Chea
*Assistant Examiner* — Marcus McKenzie

(57) ABSTRACT

A system for providing handoff for a mobile devices comprising a mobile phone programmed to automatically handover between differing data bearers and to optimally detect those bearers in a roaming environment keeping power consumption to a minimum. Repeating means for these mobile devices to extend the range of coverage and the protocol for that coverage.

43 Claims, 32 Drawing Sheets

(56) References Cited

U.S. PATENT DOCUMENTS

| | | | |
|---|---|---|---|
| 2002/0114318 A1* | 8/2002 | Rines | 370/352 |
| 2002/0131386 A1* | 9/2002 | Gwon | 370/338 |
| 2002/0184299 A1* | 12/2002 | Chou et al. | 709/202 |
| 2002/0191627 A1* | 12/2002 | Subbiah et al. | 370/428 |
| 2003/0026269 A1* | 2/2003 | Paryani | 370/401 |
| 2003/0058832 A1* | 3/2003 | Knauerhase et al. | 370/349 |
| 2003/0086515 A1* | 5/2003 | Trans et al. | 375/346 |
| 2003/0112820 A1* | 6/2003 | Beach | 370/465 |
| 2003/0120826 A1* | 6/2003 | Shay | 709/316 |
| 2003/0134650 A1* | 7/2003 | Sundar et al. | 455/465 |
| 2003/0177384 A1* | 9/2003 | Jones et al. | 713/201 |
| 2003/0182431 A1* | 9/2003 | Sturniolo et al. | 709/227 |
| 2003/0224795 A1* | 12/2003 | Wilhoite et al. | 455/445 |
| 2004/0009748 A1* | 1/2004 | Heinonen et al. | 455/41.2 |
| 2004/0054905 A1* | 3/2004 | Reader | 713/171 |
| 2004/0066769 A1* | 4/2004 | Ahmavaara et al. | 370/338 |
| 2004/0087304 A1* | 5/2004 | Buddhikot et al. | 455/426.2 |
| 2004/0092313 A1* | 5/2004 | Saito et al. | 463/42 |
| 2004/0132452 A1* | 7/2004 | Lee | 455/445 |
| 2004/0184466 A1* | 9/2004 | Chang et al. | 370/401 |
| 2005/0071487 A1* | 3/2005 | Lu et al. | 709/230 |
| 2005/0080884 A1* | 4/2005 | Siorpaes et al. | 709/223 |
| 2005/0128979 A1* | 6/2005 | Wu et al. | 370/331 |
| 2005/0181779 A1* | 8/2005 | Jones et al. | 455/421 |
| 2005/0239441 A1* | 10/2005 | Eronen | 455/411 |
| 2005/0286466 A1* | 12/2005 | Tagg et al. | 370/329 |
| 2006/0018283 A1* | 1/2006 | Lewis et al. | 370/331 |
| 2006/0034335 A1* | 2/2006 | Karaoguz et al. | 370/477 |
| 2006/0050667 A1* | 3/2006 | Verma et al. | 370/338 |
| 2006/0116127 A1* | 6/2006 | Wilhoite et al. | 455/442 |
| 2006/0172772 A1* | 8/2006 | Bjorkner | 455/558 |
| 2006/0209768 A1* | 9/2006 | Yan et al. | 370/338 |
| 2007/0019586 A1* | 1/2007 | Nanda et al. | 370/335 |
| 2007/0019600 A1* | 1/2007 | Zhang | 370/338 |
| 2007/0036120 A1* | 2/2007 | Zhang et al. | 370/338 |
| 2007/0060130 A1* | 3/2007 | Gogic et al. | 455/440 |
| 2007/0070958 A1* | 3/2007 | Rinne et al. | 370/338 |
| 2007/0109993 A1* | 5/2007 | Beach | 370/328 |
| 2007/0159976 A1* | 7/2007 | Dekeyzer et al. | 370/236 |
| 2007/0177561 A1* | 8/2007 | Beach | 370/338 |
| 2009/0066788 A1* | 3/2009 | Baum et al. | 348/143 |
| 2009/0066789 A1* | 3/2009 | Baum et al. | 348/143 |
| 2009/0070473 A1* | 3/2009 | Baum et al. | 709/227 |
| 2009/0070477 A1* | 3/2009 | Baum et al. | 709/231 |
| 2009/0074184 A1* | 3/2009 | Baum et al. | 380/205 |
| 2009/0161626 A1* | 6/2009 | Crawford et al. | 370/331 |
| 2010/0157968 A1* | 6/2010 | Karaoguz et al. | 370/338 |

* cited by examiner

| General Member Information | 301 |
|---|---|
| Member ID | # |
| Customer Record | Name, Address etc.. |
| | |
| Tunnel Provider | 302 |
| Allow data link | YES/NO |
| Allow voice link | YES/NO |
| Bandwidth share | 5%-ALL |
| Number of simultaneous users | 1-16 |
| Number of provided minutes | n |
| Number of discrete connection events | n |
| Total bits provided | n |
| Charge for uplink | $/hour |
| Cost to establish connection | $per connect |
| | |
| Tunnel user | 303 |
| Encryption level (data) | low-high |
| Encryption level (voice) | low-high |
| Pay for up-link | max $/hour |
| Number of used minutes (budget) | n |
| Link budget | max $/day |
| Polling Frequency | per hour |
| Cell phone record | Carrier, number etc... |
| Synchronize or buy | Table of desired content |

*Fig. 3*

| | Cable | Cell phone Slow Move | Cellphone Mobile pos | LAN (T1) | 802.11 | Bluetooth | LAN (T1) | Cell Phone Slow Move | Cell phone Fast Move | Bluetooth | ADSL + Their LAN | Cell Phone | Cable |
|---|---|---|---|---|---|---|---|---|---|---|---|---|---|
| Today | 500 | 9.6 | 9.6 | 10M | 11M | 1M | 10M | 9.6 | 9.6 | 1M | 256 | 9.6 | 500 |
| Min | 100 | 28 | 28 | 10M | 1M | 1M | 10M | 28 | 28 | 1M | 128 | 28 | 100 |
| Max | 2000 | 128 | 56 | 100M | 11M | 10M | 100M | 128 | 56 | 10M | 2000 | 128 | 2000 |
| | Home | Walking to train | In Train | In Office | In Meeting | Lunch Starbucks | Office Desk | Walk to Car | Car | Gas Station | Friend's Home | Taxi | Hotel |
| | 701 | 702 | 703 | 704 | 705 | 706 | 707 | 708 | 709 | 710 | 711 | 712 | 713 |

*Fig. 7*

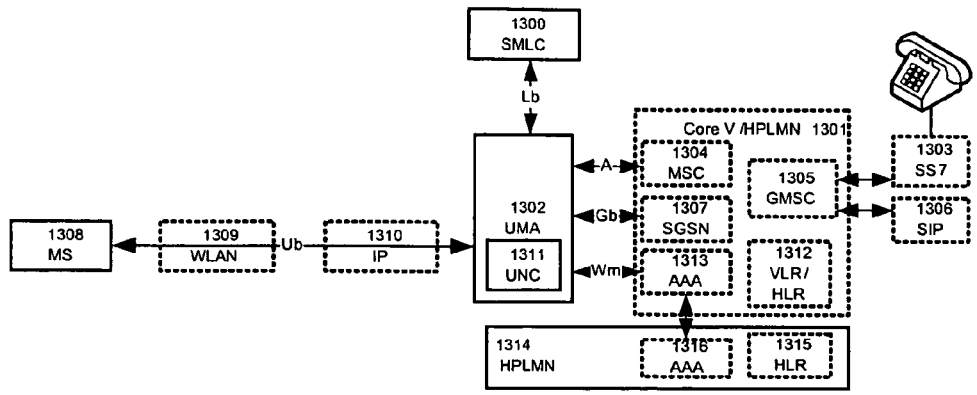
Figure 13a (UMA).
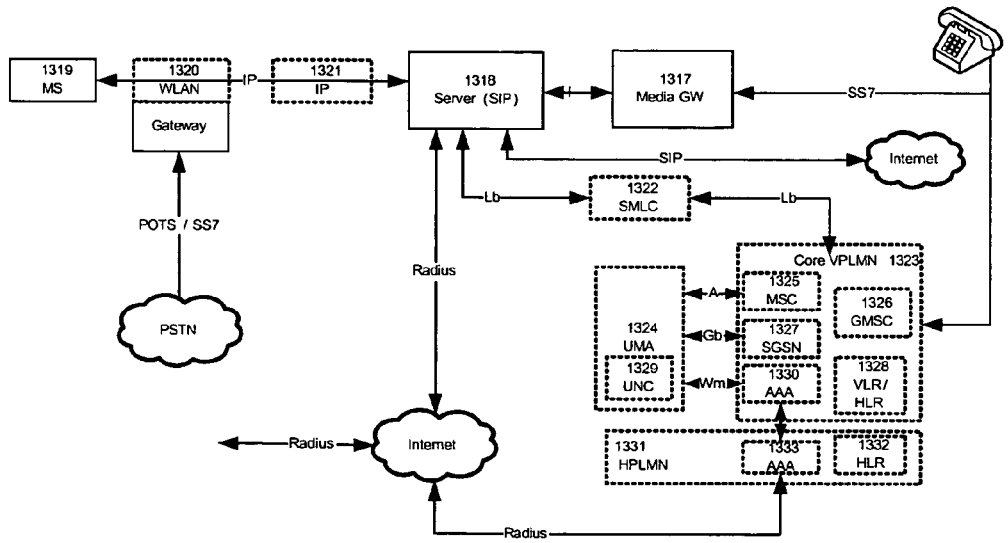
Figure 13b (proposed invention).
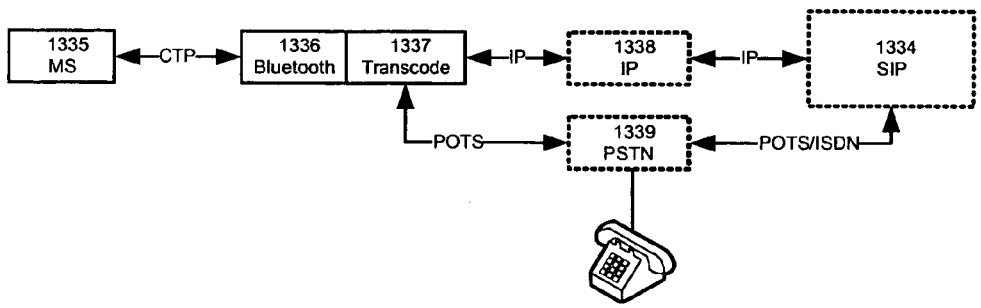
Figure 13c (Bluetooth CTP).

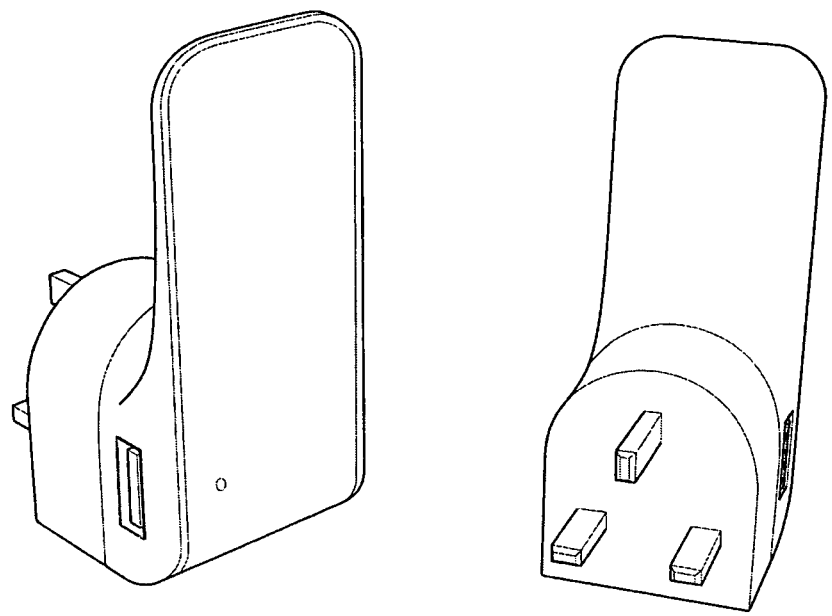
*Figure 17*
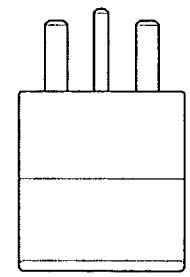
Plan
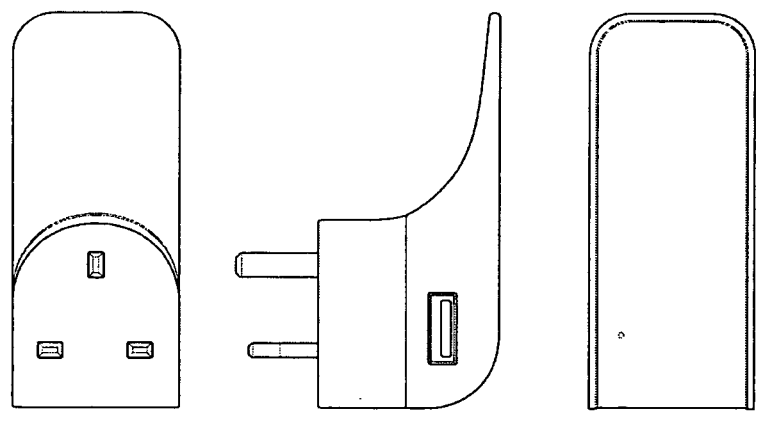
Rear view    Side view    Front view
*Figure 18*

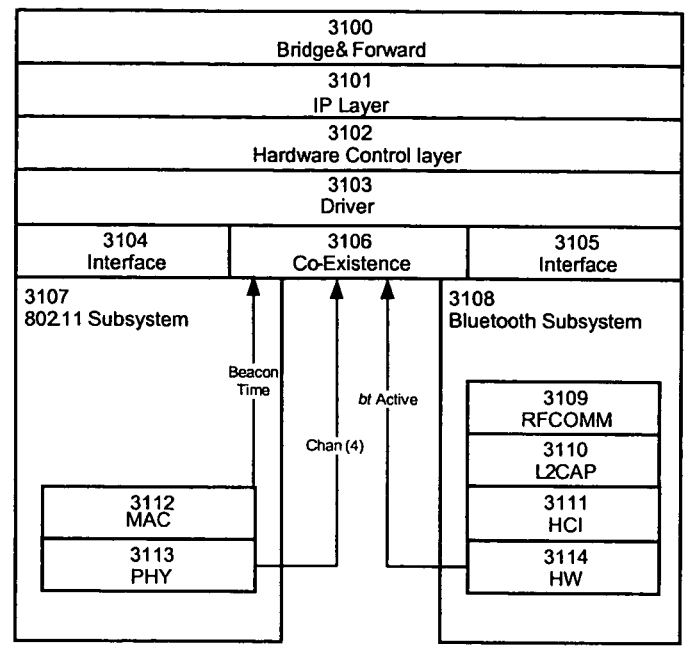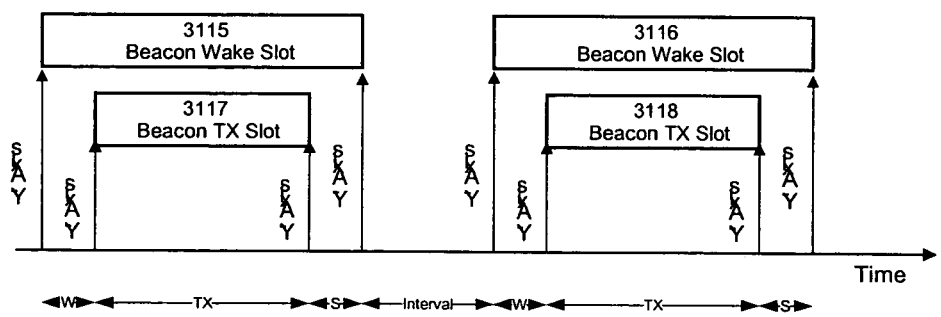
Figure 31

SYSTEM FOR PROVIDING MOBILE VOIP

CROSS-REFERENCE TO RELATED APPLICATIONS

This patent application is a continuation in part of patent application Ser. No. 09/706,406 filed Nov. 3, 2000, the entire disclosure of which is hereby incorporated by reference.

FIELD OF THE INVENTION

The present invention relates to a system that provides VoIP over wireless LAN and WAN networks.

BACKGROUND OF THE INVENTION

The Internet came into being in its current form in 1983 when all the computers connected to ARPANET—a military network—began using the same communication protocol. In 1986 ARPANET became NSFNET in a bid to link the USA's supercomputers. E-mail began to be commercially available in 1990 at much the same time that Mosaic—the first worldwide web browser—became a useful product. The Internet, comprising mainly the WWW (world wide web) and e-mail is now an extremely important business tool.

The world is now networked, much of this provided by TCP/IP (Transmission Control Protocol/Internet Protocol) but ATM (Asynchronous Transfer Mode) is still dominant in telecommunications. Most major companies have access to the Internet and the Internet backbone runs thru much of our environment. This infrastructure is made up from largely fixed, rigid connections; wires, routers, switches and similar.

Human beings tend to move around when engaged in work and leisure. An easy way to connect to the fixed network is needed for these mobile users. Mobile users are commonly envisaged as people using a cell phone or other radio device, but for our purposes a 'mobile user' is anyone away from their fixed home base.

1. Wireless connections are inherently expensive as they use a rare resource—radio frequency spectrum—and require large infrastructure investments.
2. There are practical difficulties when away from home base, such as determining IP addresses, proxy server settings, negotiating billing and payment and security and privacy concerns.

Even the simple task of moving from one office to another within the same company can be fraught with complications and more often than not people fail to make connection when traveling away from home base. With so many companies relying on e-mail and the World Wide Web as a critical business tool, an inability to connect can prove costly to companies. In the last three years the ability to access the Internet has begun to migrate to mobile devices. Small mobile devices have tended to use a variety of specialist Internet access methodologies with varying degrees of commercial success. They all suffer from the limitation of low bandwidth and high cost.

There are a number of methods by which users can get access to data from mobile wireless devices: SMS, HDML, WAP and I-Mode being the main standards. All of these standards suffer to some extent from problems such as limited bandwidth and complex authoring environments.

In SMS (short message service) users can send and receive simple, short text messages from their phone. A server at the mobile phone service either routes them to other mobile phone users or provides a gateway that translates the messages and sends them as e-mail to Internet e-mail services. The gateway will also translate incoming email and send it to the user in SMS format. Although rudimentary, large successful businesses have been founded from sending these short messages demonstrating that people need data on the move and are prepared to pay for it.

In HDML (Handheld Device Markup Language) a web site is composed using specially modified tags. A wireless gateway translates these tags so that the mobile device may view them. A mobile device equipped with a micro browser capable of interpreting HDML can display this information on a small LCD.

In WAP (wireless application protocol) a web site is composed using WML (wireless markup language) and this information sent to a WAP gateway. The user gains access to this gateway either by dialing a RAS (remote access server) or by using a packet based system, commonly referred to as 'always on'.

In I-Mode specialist tags are again used to create pages formatted in compact-HTML. These are served over a gateway to users on a packet-based system.

In the above systems a specialist gateway is used to provide output formatted for mobile devices. An alternative method of accessing the Internet from a mobile device is provided by fixed wireless systems such as Bluetooth and the IEEE 802.11 wireless LAN standard.

In the 802.11 and Bluetooth standard two wireless devices establish a point to point or point to multi-point link using spread spectrum radio technology. The two wireless devices can be any type of electronic appliance—PC, PDA, Cell phone, microwave oven, home security system. This link replaces wires and does nothing to reformat the content of data.

Another wireless standard that has reached ubiquity in availability but has very little usage is IrDA (Infrared Data Association). In the IrDA standard two devices with IrDA capability positioned near one other can communicate using infra-red beams. The standard suffers from two problems. Firstly that the link is optical and therefore requires a clear line of sight. The devices must be positioned so that their ports are visible to each other or at least so that sufficient reflected light reaches the, ports. Secondly the two computers need to have their IrDA ports configured and switched on. This is a non-trivial task: The hardware must be enabled—commonly powersaving and compatibility issues mean that computers are shipped with the port disabled. A device driver must be installed. Once the physical link is available a logical link is needed to allow file transfer or access to the hard disk of the companion computer. Security and privacy must be ensured.

Looking at problems of getting Internet access when mobile a number of steps are required.

1. Some form of driver software is needed to configure the user's hardware to allow a link to be made.
2. The physical link needs to be made. This may be by pointing the two computers at each other or connecting a back-to-back USB cable, which has been provided by, for example, the hotel at which the user is staying.
3. The host user needs to enable and share certain services, such as printers and hard disks and network connections.
4. The host user needs, itself, to log onto the Internet.
5. The host user needs to act as a gateway for the connecting user, translating and forwarding packets onto the Internet.
6. The IP address of the host's interface needs to be configured to a non conflicting address with that of its Internet link.
7. The IP address of the connecting user needs to point to the host user.

8. The ports and proxy servers need to be set up. Even if no special set up is required a user who normally works in a corporate network with special settings will need to write these down and then delete them from the system, remembering to type them back in when returning to the corporate environment.
9. If the link has a cost to it a financial transaction needs to be entered into with metering and billing.
10. No simple solution is available to ensure a secure link.
11. E-mail may or may not require yet more steps to enable.

This multi-step process is fraught with difficulties and there are numerous potential points of failure. Most connections fail because either one of the steps cannot be completed, or each step is so time consuming that the user gives up before completing the task. Since mobile users are usually short of time, have limited resources (such as driver disks, spare cables) and have to configure multiple times as they travel thru different environments, the effort is very frustrating. Typically the above exercise is completed around 30% of the time with a mean time of effort of two and a half hours. Although many operating systems (such as Windows 2000™) allow connection sharing the implementation of these makes the task very complex.

An additional further complexity has been generated by the lack of interoperability between IEEE 802.11 and Bluetooth. Since both standards operate in the same frequency spectrum the two systems will tend to interference with each other.

Additional difficulties occur when a firewall is present. If a shared connection is obtained in the home or office, access to the Internet may be blocked or restricted by the activities of a firewall. The same technology that provides the firewall capability may also track usage and web sites visited providing a risk to privacy. Additionally information that is sent or received may be logged causing considerable security risk.

Although the cellular system provides some degree of roaming it provides no solution to inter-system roaming and uses expensive infrastructure, which results in high call cost. In addition the process of connecting a PC or PDA to a cell phone is complex and requires considerable reconfiguration of the device. The current mode of access to the Internet is predominantly through a one-to-one commercial negotiation. Each person has a connection to the Internet via their own ISP. When visiting someone else's home obtaining access to the Internet is difficult. Calling the ISP requires another phone line. In the case of ADSL or cable systems the MAC address of the network adaptor is registered to the ISP so that a second user can't use the connection. You can install a network and enable connection sharing in your OS—for example Windows 2000™ but this involves a number of complex steps. In addition there is a significant security implications to this. Generally home and commercial networks are not set up with the anticipation that roaming users will be physically connected to the network inside the Firewall. Thus many network services are not secured against internal access. (It is not uncommon for a corporate network running Windows™ 2000 to have numerous hard disks shared without passwords.) Although the firewall blocks this from external access, a local connection would be inside the firewall.

Although these problems have existed for some time, the emergence of Bluetooth and IEEE 802.11 are encouraging people to connect more often. While the above discussion is centered on the difficulty of human beings obtaining connection to the Internet it should be bourn in mind that autonomous machines have similar difficulties. Much talk is made of microwave ovens, video recorders and refrigerators talking together using home networks. It is also envisaged that automobiles will be similarly equipped. These systems are likely to become ubiquitous over the next five years as networking capabilities are built into appliances. These devices need to obtain services from somewhere and need to obtain a connection to the Internet. It will be prohibitively expensive to give each device it's own dedicated connection. The devices will also need services tailored to them. One can consider that an appliance once manufactured an shipped becomes a roaming device in need of connection to the Internet.

As described above, there are two main types of wireless network present in the world today—wide area networks (WWAN) exemplified by cellular systems and local area networks (WLAN) provided typically by 802.11 (also referred to generically as "Wi-Fi") and Bluetooth technologies. Some examples are named in Table 1 set forth below.

TABLE 1

| WWAN | WLAN |
|---|---|
| GSM | Wi-Fi (802.11 a/b/g) |
| UMTS | Bluetooth |
| W-CDMA | DECT |
| CDMA2000 | ZigBee (802.15.4) |
| FOMA | WiMAX |
| TETRA | HomeRF |
| GPRS | HyperLAN |
| HSCSD | |
| HSDPA | |
| EDGE | |

Some technologies defy this simple classification. Bluetooth, when used in its low power mode, is often called a personal area network (PAN) and WiMAX technology can have extended range that rivals cellular macro-cell coverage. The distinctions can often be based on heritage and infrastructure ownership, but nevertheless today there is general agreement on the two classifications and the distinction between them—a WWAN connects to the core cellular network first, while a WLAN connects to a computer network first.

A complication of WWANs in particular, but all networks in general, is that they distinguish between voice bearers and data bearers. Thus in GSM there are GSM audio channels and GSM data channels such as EDGE. For the purposes of this patent, WWAN-audio and WWAN-IP (-Internet Protocol) will refer to these distinctions respectively. Additionally, WWAN-VoIP (-Voice over IP).will refer to the situation of carrying voice over WWAN-IP.

A number of methods have been proposed for implementing mobile voice and data systems so that they operate on both WWAN and WLAN based infrastructure. In implementing such mobile voice and data systems, these systems will have to deal with the problems of roaming and handoff between them. Roaming is the feature where a mobile phone can acquire a radio connection and signal to an authentication method to request a connection to services, while handoff is the feature where a mobile phone moves from one radio connection to the next maintaining a voice call or data connection with as little interruption as possible. When this interruption is not noticeable to the user the handoff is deemed "seamless." Seamless handoff is not always an advantage. For example, when the user moves from a low cost connection to a high cost connection they generally want the transition to be made clear. The ability to do seamless handoff is an important feature of these systems even if, on occasion, it is deliberately switched off or the handoff made non-seamless through the use of notifications. When a mobile phone moves from one radio connection to another and the bearer technologies are the same we will hereafter refer to this as handover to differentiate it from handoff—for example when moving from one Wi-Fi access point to another.

Two types of systems that have implemented mobile voice and data systems that operate on both WWAN and WLAN based infrastructure are; (1) UMA-based systems and (2) Bluetooth CTP-based systems.

UMA-Based Systems

The most prominent standard for WWLAN to WWAN interoperability is the Unlicensed Mobile Access (UMA) system, whose specifications can be obtained from www.umatechnology.org. UMA technology provides a method for using the cellular network infrastructure and specially modified handsets with WLAN Access Points (APs) to implement micro-cells in the network. UMA is described in relation to the GSM system but can be generalized to WWAN-Audio systems including 3G. We shall refer to the GSM case for this discussion. In the UMA system a handset is modified to send voice and data via a WLAN connection (such as 802.11 alb/g or Bluetooth). When using the WLAN connection, the GSM protocols (speech encoding and mobility management et. al.) are encapsulated and sent over WLAN via an access point which routes traffic to a UMA Network Controller (UNC) that de-encapsulates the protocol and sends it on to the cellular infrastructure. The primary object of the UMA specification is to make connection to the core cellular network as quickly as possible and then make all further communication through that core cellular network.

Roaming is possible on UMA because the protocol encapsulation and emulation of a GSM base station allows the handset-AP combination to appear as a GSM cellular phone and GSM base-station even though the wireless protocol being used is WLAN. Handoff is supported between cells where the initial cell is a WLAN-AP and the handoff is made to a GSM cell or vice versa. In these cases the handset must simultaneously switch radio layer protocols while maintaining the GSM signaling and audio channel connectivity.

Because of this requirement to emulate the GSM cellular protocols (signaling and voice) in complex handoff scenarios these systems suffer from a number of practical problems: The GSM specification was not written with the assumption that the radio layer could change mid way through a transaction and it therefore organizes the signaling channel with precise time slot assignments, interleaved with the voice channels. Implementation of UMA therefore requires complex integration with the GSM software stack at a low level in the phone such that the phone can perform these handoff tasks.

In particular the phone may signal a handoff 'start' while using one radio layer and then signal the handoff 'completion' using another radio layer. Because of these timing, slotting, encapsulation and signaling elements, the system design is complex with many points of integration between the WLAN signaling elements and the GSM elements at low levels in the stack. Presently, such low level integration requires considerable engineering time to implement as the software elements are real-time and time critical—often upwards of 18 months for software work, manufacturing and test prior to launch in the network.

While these time scales are appropriate for products in the mobile domain the convergence of fixed and mobile networks brings Internet development timescales into play with the problem that by the time deeply embedded, real-time software stacks have been implemented for a phone it is often the case that the Internet protocols have moved forward or the handset is obsolete before launch. Even with considerable design effort system performance can still be limited with handoff failures and interoperability restrictions.

In addition, although the specification calls for the use of standard access points, in practice the access points have to be specially designed to cope with the timing requirement inherent in the protocol management and this means the systems can not work with general purpose access points such as those deployed in the market already in hotspots, homes and offices. This need to specifically design each AP dramatically increases the total cost to deploy a system as every Access Point must be visited where the older units need to be swapped out and the newer unit installed.

In addition UMA handsets require a full cellular infrastructure to operate, consisting of a Mobile Switching Centre (MSC) within the HPLMN (Home Public Land Mobile Network) interworking with location databases including HLR (Home Location Register) and VLR (Visitor Location Register) or SGSN (Serving GSM Support Nodes). This requirement is disadvantageous because it is architecturally complex—data packets must transit through the cellular system even when they originated from WLAN Access Points as Internet Protocol (IP) and are often destined to terminate via IP, say as a VoIP call, thus putting unnecessary stress on these systems and causing numerous unnecessary protocol translations that introduce latency and potential for failure. A call which might have been routed locally perhaps over only a few hundred yards of IP cabling will have to transit through the entire cellular core network. So a UMA protocol based system is essentially incompatible with peer-to-peer routing and SIP based RTP stream direct connection paths. Also, many companies that want to utilize voice and data services over wireless do not possess core cellular network infrastructure and such infrastructure is extremely expensive to purchase and the arrangements for leasing capacity are generally unattractive.

Bluetooth CTP-Based Systems

Another implementation of a mobile VoIP system entails using a phone that supports the Bluetooth cordless telephony protocol (CTP) connecting to a Bluetooth enabled base station that also supports CTP. A CTP system implements two protocols: telephony control specification—binary (TCS-binary) and the synchronous connection oriented (SCO) audio protocol. A call is initiated between the phone and the access point using the TCS-binary protocol to initiate off-hook, dial-tone, and send and confirm the number. Once the call is connected, audio is transmitted directly from the microphone and speaker hardware to the Bluetooth low level stack, usually a hardware implementation, and then over the air interface to the AP's audio hardware which then needs to encode the audio in a suitable form for onward transmission.

There are a number of problems with this:
  i) The cordless telephony protocol implements 'SCO-Audio' which is a fairly simple high bandwidth audio compression/decompression algorithm (codec) that is not particularly well protected from interference by other radio devices; this limits range.
  ii) The codec used by CTP is not directly supported by Session Initiation Protocol (SIP) servers used in Internet telephony and so the stream has to be re-encoded by the CTP-enabled base station. Re-encoding with different compression can produce serious audio artifacts, takes processing power, increases latency and substantially reduces the Mean Opinion Score (MOS) by which people rate the quality of sound.
  iii) The CTP algorithm is not IP based and so when switching from one network (Bluetooth) to another (WWAN or WLAN), the phone and AP must swap protocols. This typically involves unhooking the Bluetooth hardware audio system and re-initialing a completely new audio path through the phone's digital signal processing (DSP) subsystem which causes an interruption in the audio stream and a change in the audio characteristics requiring an end-to-end renegotiation of elements such as CODECs, Quality of Service (QoS) and echo cancellation parameters. A similar reconfiguration of the AP is also needed.

iv) Differing compression algorithms are used on the differing radio connection methods and this makes for very complex control when trying to throttle bandwidth.

v) Because CTP is a relatively high bandwidth protocol and because CTP is a low level timing critical protocol few connections can be supported by an AP. Three connections can be supported in theory, but only one connection is often feasible in practice.

vi) CTP is implemented at a very low level in the protocol stack and takes audio directly from the microphone and speaker into the Bluetooth audio codec. This means that the higher levels of software have no control of this path to implement elements such as mixing, echo cancellation, improved CODECs, or indeed any extension to the basic audio functionality available.

vii) Finally, the CTP protocol must be implemented in the handset and the AP at a hardware level and interoperability tests performed.

Again, deep integration is needed to implement CTP which is time consuming and expensive and this has not been implemented by several manufacturers. For example Nokia™ does not support CTP on their phones and Microsoft™ does not support audio profiles (including CTP) in any of its operating systems including in particular the current shipping of Windows XP™ service pack 2.

Access Point and WLAN Issues with Other Systems

For both Bluetooth and Wi-Fi as described above, the most commonly available AP in an office is a WLAN-enabled PC. However, problems exist with using these both for Bluetooth and Wi-Fi. In the case of Bluetooth, the current versions of Windows™ do not support audio profiles including CTP. In Wi-Fi enabled PCs they are set as devices rather than access points.

In addition to the protocol elements described above there are a number of problems presented when trying to provide coverage for a home or office in an affordable fashion:

i) WLAN range is limited in a home by in-building multi-path interference effects and blocking due to walls and other obstructions.

ii) WLANs are usually protected by firewalls which are not friendly to VoIP iii) WLANs may not handle mobility very well in that the user's IP address may change as they travel from one access point (AP) to another.

iv) Home wiring is becoming very complex and requiring yet further physical wiring to provide additional WLAN points spread around the home or office is difficult.

v) In home environments, the selection of locations for access points (APs) is difficult as they must be in prominent locations to provide coverage, but when in such locations antenna efficiency may be compromised by having other objects placed close to or on top of them.

The range of Bluetooth and Wi-Fi differs for different classes of system and in different scenarios. On one hand, the Bluetooth protocol has slightly better in-building range, but is hampered by the fact that Bluetooth systems are not commercially available with good diversity schemes. On the other hand, Wi-Fi systems have excellent diversity schemes where two antennas receive signals a few inches apart so that one or other antenna avoids interference, but are generally high-power only devices. A system is needed that optimizes the mix of Wi-Fi and Bluetooth systems and uses each to the best of its capability. A summary of the capabilities of different protocols is presented below.

TABLE 2

| Type | Modulation | Freq. | Range free space | Range in Building | Other considerations |
|---|---|---|---|---|---|
| Bluetooth | Frequency Hopping Spread Spectrum GFSK | 2.4 GHz | CI 330M CII+ 60M CII 40M CII− 25M CIII 10M | CI CII+ CII CII− CIII | Very Low Power Very Low Cost Complex software stack |
| 802.11a | OFDM | 5 GHz | 80M | 40M | No interference |
| 802.11b | Spread Spectrum DSSS | 2.4 GHz | 240M | 120M | Low Cost, backward compatible |
| 802.11g | OFDM | 2.4 GHz | 120M | 60M (200)* | Best in Building at high throughput |

*Advanced diversity methods significantly improve in building range by dramatically mitigating multi-path issues.

While Bluetooth has declined in usage as Wi-Fi enters the space. A number of advantages of Bluetooth over Wi-Fi exist: It is very low cost, it has about $\frac{1}{10}^{th}$ the power consumption of the equivalent Wi-Fi function, it is already designed into roadmaps for the next two years, many low power Bluetooth headsets exist that are unlikely to be displaced by Wi-Fi. Therefore, any proposed system needs to cope with a mixed world of Bluetooth and Wi-Fi handsets and plan for the introduction of Wi-Max. At present there are no satisfactory Bluetooth/Wi-Fi dual mode access devices. In addition, many people already have Broadband access in place but the broadband router (ADSL Router) is often not ideally positioned to give good in home or in office coverage for an area. Existing Bluetooth handsets tend to be low power devices to keep power consumption low and to avoid interference with the WWAN circuitry in the phone. Additionally the phones are optimized for headset links that are perhaps only intended to be 10 meters or so. This means the phone is not optimized for maximum transmission range and provides a poor contribution to the link budget.

As stated above, one of the benefits of Bluetooth is the low cost link. It is a complex task to select a Bluetooth Profile that is available both on a Smart phone and on a PC. The following table is a reasonably comprehensive but far from exhaustive list of the profiles currently specified for Bluetooth.

TABLE 3

| Bluetooth Protocol List |
|---|
| Generic Access Profile (GAP) |
| Service Discovery Application Profile (SDAP) |
| Cordless Telephony Profile (CTP) |
| Intercom Profile (IP) |
| Serial Port Profile (SPP) |
| Headset Profile (HSP) |
| Dial-up Networking Profile (DUNP) |
| Fax Profile |
| LAN Access Profile (LAP) |

TABLE 3-continued

Bluetooth Protocol List

Generic Object Exchange Profile (GOEP)
Object Push Profile (OPP)
File Transfer Profile (FTP)
Synchronization Profile (SP)
Hands-Free Profile (HFP)
Human Interface Device Profile (HID)
Hard Copy Replacement Profile (HCRP)
Basic Imaging Profile (BIP)
Personal Area Networking Profile (PAN)
Basic Printing Profile (BPP)
Advanced Audio Distribution Profile (A2DP)
Audio Video Remote Control Profile (AVRCP)
SIM Access Profile (SAP)

For WLANs in general and 802.11 'Wi-Fi' products in particular, they suffer from voice Quality of Service (QoS) issues because of their original design to carry data. The radio layer error recovery mechanism implemented at the Media Access Control (MAC) level retries packets at lower data rates if a packet is not acknowledged. In some cases, the handset spends more time transmitting error recovery packets than useful data. 802.11e (wireless MAC enhancements for QoS) provides a method for solving this but this still suffers from contention issues for the wireless medium particularly with respect to 'unfriendly' cohabitations such as Bluetooth with Wi-Fi (which share the same frequency band). When Bluetooth interferes with Wi-Fi, the Wi-Fi backs off its data rate to a lower bit rate, increasing the overall packet size in time. These longer packets have a higher probability of colliding with other users of the data network and causing yet more back off and retry events—a downward spiral which limits practical deployments to 6 users per Wi-Fi channel when the theoretical limit is more than 30. Creating a clean interference-free WLAN environment is highly desirable.

Another problem that can exist with these two types of systems is that handoff protocols might have to re-initiate authentication procedures. Fast roaming protocols, 802.11r and Inter Access Point Protocol (IAPP), 802.11f allow for the APs to switch in the sub 100 ms range and exchanges access point context so clients needn't go through the entire authentication process when roaming and handing off, but the context data (the pairing, authentication and channel data that specifies the parameters of a given link) exchanged is vendor proprietary, so handoff performance varies considerably. When roaming in a homogenous access point network with the same Service Set Identifier (SSID), the hand-off is usually fast but an improved and general method for handoff, and handover would be advantageous.

The problems with these systems can be classified as follows:—
1. Architectural Complexity
2. Mobile Device Complexity
3. Protocol mismatch requiring excessive translations
4. Lack of affordable coverage solutions
5. Poor co-existence between different WLAN systems
6. Lack of range due to poor link budget management and protocol issues
7. Slow handoff and handover.
8. Inability to implement peer-to-peer operation.

SUMMARY OF THE INVENTION

An embodiment of the present invention provides a method and system for connecting to a network—typically the Internet via a cooperative membership arrangement. Members of the cooperative networking service have an identifier that uniquely identifies them as a member of the service. A fixed member (host) enables its link capabilities for mobile users (clients) but directs those links to communicate with a secure piece of software—the Cooperative Tunneling Agent (CTA). Upon access by a mobile member, the CTA sends both identifiers and status information to a server. The server contains preference information on all members that can be referenced by their identifiers. The status information is compared to the preferences of the two members and, if the comparison is successful, a link to the Internet is provided to the mobile member. If the comparison fails the members may be notified and allowed to modify the preferences, make a one-off exception or reject the link. The CTA can work with or without reference to a server. When working independently of the server the comparison is made using data from the host and the client and the server is only accessed if additional information or service is required. The CTA ensures that the mobile user has no access to the fixed user's computer other than as a pipe thru to the Internet. To ensure that the mobile user's security and privacy are protected the data packets may be encrypted and sent via the fixed host to the server. The server may decrypts the data and sends it to the Internet. Return data is similarly dealt with. By this method the fixed member cannot eavesdrop on the mobile member's data or voice traffic. Such encryption can be set at a variety of strengths according to user preference and applied selectively depending on the data type. Routing of the data may also be performed selectively according to data type.

Benefits of the Invention (O&A)

An advantage of the system is that two members can quickly and simply set up secure link so that one member can access the Internet thru the other members network connection without causing security risks to either member. A further advantage of the system is that one member can use the low cost access method available to another user.

A further advantage is that voice calls can be sent to the host and routed over the EP network using VoIP technology thus dramatically reducing costs. A further advantage is that voice calls can be routed thru the cellular system to a local VoIP server thus saving long distance cellular charges.

A further advantage is that by simplifying the operation of logging onto the network thru fixed nodes commercial node providers will find it easier to acquire customers and the service to those customers will be improved and simplified. A further advantage is that by providing a universal logical standard for connection incompatible transport protocols can be made compatible. In the example of Bluetooth and IEEE 802.11 the CTA can ensure that the protocols synchronize to divide their spectrum usage in either time domain or frequency domain for all members present.

A further advantage of the system is that since access is automated according to preset preferences the system can be used for the connection of autonomous appliances and machines who are not able to make complex decisions regarding optimal network access.

The link can transport either data or voice. In the case of voice the CTA handles the VoIP (voice over IP) protocol. VoIP and Multimedia can be either sent via the complete path thru our secure server or split apart to take a more optimum routing.

The software allows the user to access the Internet, send and receive e-mail and obtain high bandwidth services such as MP3 files and movies. The network is cooperative as each user agrees to both give and receive access depending on their status. Each user is a node. A cell phone located within 100 feet of a fixed host device can connect to the Internet through that device, obtaining phone calls at a fraction of the cost of a regular cellular connection. Similarly a portable computer or PDA would be able to connect through a host node and obtain a high bandwidth link to the Internet for a modest sum of money. It is anticipated that there will be two main types of connection; cooperative connection and commercial connection. In a cooperative connection, a fixed user connected to the Internet provides a bridge so that other mobile users may access the Internet through their link. This link is provided free of charge in return for reciprocal roaming rights. In a commercial connection the user locates a commercial node and the CTA negotiates connection and payment terms according to preset user preferences. While this invention is primarily targeted at simplifying the task of connecting using fixed wireless devices such as Bluetooth or 802.11 it will apply to any connection methodology—IrDA port, network cable, serial cable, USB crossover connector et al. Our invention is intended to facilitate connection to any rigid network infrastructure but the Internet is the most important of these.

Means for cleanly handing off connection from one system to another are provided by the CTA. By storing both the customer's Cellular provider information and the Cooperative network ID the call can be routed through either system. In addition if a voice call is in progress and a Bluetooth cooperative connection becomes available the call can be set up in the VoIP system and handed over and visa versa.

The technology provides the function of a bandwidth moderator. As a user moves about their daily life from home to office via different modes of transport, their requirements for Internet connection change in characteristic, and the mode of connection changes. Our technology sits between the user and the Internet constantly negotiating the most cost effective means by which they can gain access. While today the modes seem simple—it's a wired or a wireless link—this will not remain so in the future and all software systems will require an agent to perform this task. It is an objective of the present invention to optimize the 'last mile'.

This system differs substantially from the cellular system in that a substantial amount of network hardware is provided by the members of the network and not by high capital value dedicated infrastructure. It is generally a surprise to people when they realize how often they are within 100 feet of an Internet connection. Additionally the cellular system provides no handoff methodology between differing classes of carrier.

The present Invention provides a means for wirelessly enabling a home, office or public environment such that commonly available hardware, such as PCs and mobile phones, may be easily and readily used in conjunction with simple low cost repeaters, PCs enabled as access points and one or more wireless access points, providing a complete telephony solution that allows a person to use one phone handset for all their telecommunications needs. The system solves a range of problems with previous systems.

The use of this technology will also enable VoIP services for the home, office and mobile environments that have hitherto been prohibitively expensive and have suffered from poor user experience. In particular this technology allows Mobile VoIP to operate on Nokia phones and Microsoft operating system PCs that have not previously had these capabilities without modification of the hardware or embedded/fixed software elements of these systems.

Using the roaming and handoff further multi-media services can be provided such as music streaming and download and real time gaming.

Multimedia subsystems within phones are also capable of recording and rendering pictures and video.

System Architecture & Mobile Device Simplicity

In contrast with previous systems based on protocols such as UMA or CTP, the proposed system converts speech or data immediately into VoIP, a protocol optimized for the Internet that is time independent of its control signaling and where the precise timing of the packets is not material. The benefits of a packet-based protocol are that packet time and real time are independent of each other. This significantly reduces the complexity of the software for the phone, access points and server infrastructure. Indeed such simplicity allows that any generic access point can be used.

Another significant advantage of a packet based system is that the packets may follow different routing paths providing for a high degree of redundancy and therefore reliability. For example, a packet may be forwarded at the radio layer via the Bluetooth, Wi-Fi and UMTS link simultaneously during handoff/over in the invented system. While UMA systems are also packet based systems over the radio layer, those packets are only comprehensible by a UNC (UMA Network Controller) and must transit through it for translation back into core cellular protocols. This introduces a compulsory routing node and therefore a single point of failure. Must of the advantage of an IP based packet system is therefore lost.

In addition, the invention separates the radio layer protocol and the audio protocol and uses IP sockets for the interfacing within the phone. By doing this, several advantages are achieved:

1) The radio layer may change without reconfiguring the audio layer thus allowing fast switching and handoff.
2) Digital signal processing techniques may be applied to the audio independently of the radio layer so that the audio quality is kept similar during handoff.
3) Audio packets can be sent to more than one radio subsystem simultaneously allowing a make-before-break architecture.

The protocols used in the invention can be Session Initiation Protocol (SIP) and Real-time Transport Protocol (RTP) optimized for wireless transport. These are encoded at a high level within the protocol stack and transmitted down the protocol stack using IP within the phone to the different radio subsystems for transmission to the network. In this way, the audio or data protocols are radio layer agnostic. A benefit of this agnosticism is that a packet can be formatted and sent to the appropriate socket (Bluetooth, Wi-Fi or UMTS) completely freely and simultaneously. The Network Address Processing in the server of the invention (a modified SIP server) will sort the streams back into a single stream for termination to the PSTN or forwarding to other parties. If the other party has a compatible client then this sorting is not needed as there is no essential restriction on having two streams (i.e. a socket pair rather than a single socket) connecting mobile subscribers in the SIP domain, and this approach can be used to improve QoS and the seamlessness of handover. A further advantage of the system using an all IP architecture is that handoff can be affected without interfacing with the low level stack components of a phone.

Affordable Coverage Solutions

General purpose PCs can be co-opted into the invented network to provide broad coverage by enabling them with either Wi-Fi or Bluetooth. The PCs are configured to bridge between the incoming SIP connection and the LAN. These PCs can perform simple packet forwarding or more advanced mobility tasks such as handover to WWAN or gateways by translating into proprietary protocols such as SKYPE and terminating over the proprietary network.

Repeater

In addition to these PCs, the invented system has a new form of repeater in the system which is also radio layer agnostic and able to translate between Wi-Fi and Bluetooth and forward either protocol quickly and efficiently. FIG. 20 describes the link budget problem. Essentially most mobile phones will have poorer antennas and lower power amplifiers than the access points or repeaters in a given system. This disparity tends to most affect the transmit power from the phone but also affects receive sensitivity. However, the invented system utilizes a low cost receiver that has high power and increased receive sensitivity and diversity reception in addition. The result is that low power standard mobile handsets may be used with reasonable range and coverage being provided by the link budget optimized repeater/AP.

The optimum combination is low noise receiver, high power output (+20 dBm), diversity reception and coexistence methods for removing interference between other radios. Furthermore at the system level, the ability of the AP to talk to the phone via a back channel provided by WWAN and the server can further reduce power consumption and provide an alternate diversity channel for very tough conditions. The invented repeater has Bluetooth and Wi-Fi coexistence and SIP/VoIP compatibility so that it can be introduced into a home/office or hot spot to pick up the existing links and forward them to multiple devices using these giving both range and capacity improvement.

A significant problem that the repeater solves is the ability to quickly enable a home/office or hotspot using a device that has a minimum of configuration and therefore customer support requirements. Correct siting is easy to do using the BLUE/GREEN/AMBER LED pattern on the repeater. Amber indicates no signal, green indicates path back to Internet and blue indicates forward connection either to another repeater or a phone. This allows for very easy improvement to WLAN coverage to be made with minimal support costs. The repeater further supports Simple Network Management Protocol (SNMP) specification so you can monitor and maintain the repeater from afar. A further simplification to pairing and exchanging keys is provided by allowing a USB memory device to be plugged into any device in the system and automatically transfer the link key information to another device subsequently plugged in.

The WLAN repeater/translator further simplifies the home/office wiring problem by allowing wired phones to plug into the repeater with a suitable RJ45, RJ11 or BT plug, thus eliminating the need to provide a wiring system for fixed phones within the home and bonding the home system to the wireless VoIP infrastructure.

Another significant problem that is overcome by the repeater is Network Address Translation (NAT) traversal. Many computer networks block certain ports and allow incoming IP only as a direct response to outgoing IP. The repeater makes regular contact with the system server and thus keeps an incoming channel open. Additionally the repeater may perform Network Address Translation of Processing, search for and switch ports to an unblocked port on the server or take other action to maintain contract with the server. Since it is generally an AC powered, high power device these actions are not detrimental to its operation but would tax a phone in similar circumstances.

Co-Existence between Different WLAN Systems

The system implements advanced coexistence methods to allow a variety of wireless networks to be used in a seamless fashion without causing interference with each other. In general all devices in the invented system are Bluetooth/Wi-Fi coexistence devices capable of offering dual coverage without interference.

Improved Link Budget Management

In the present invention considerable attention is paid to the link budget and maximising the range from both Bluetooth and Wi-Fi access points using techniques such as balancing the transmit and receive link budget and optimising the data packet format for Wireless.

Shortest Signal Path

The system attempts to look for the shortest signal path, thus the handset can uses peer-to peer-techniques to discover if another handset is in range. This may be achieved directly (for direct communication over the local radio link) where the telephone number is resolved to an IP address range and location and Bluetooth address or Wi-Fi MAC address. In this case the device or server can determine that the telephone number called is actually located in close proximity and route the traffic directly without even needing to transit an access point or repeater. The handset or server may track up the address range until it finds a short path for example or via a local repeater or communication over the LAN only. Failing this, if the SIP server detects that two phones are presently logged onto the system and that one phone is trying to 'call' the other by entering its phone number it may link the two phones by the shortest possible path without sending the packets into the PSTN. This in conjunction with presence services can give very rich user experience.

A further advantage of the system is that phones that support Bluetooth but do not support CTP protocol may be used within the system. Nokia phones fall within this category and currently have the largest market share.

A further advantage is that a variety of devices can be used in the system that are Bluetooth and/or Wi-Fi enabled such that the signaling protocol and system architecture and coverage are substantially identical.

An advantage of routing through a PC is that there are widely used low cost devices, in the form of Bluetooth or Wi-Fi cards or dongles, which can be converted to access points with very little additional cost, which in turn means that the overall cost is kept low.

A further advantage is that range is increased by using repeaters. Using Wi-Fi as the backbone and Bluetooth in the local link in a repeater scenario minimizes Bluetooth master/slave role reversal problems. In a system that uses Bluetooth repeaters, one repeater needs to be the master and the other a slave. This introduces the problem that a phone moving from one AP to another would have to connect to the first as a master and the second as a slave, or each AP would have to be slave and master simultaneously. While this simultaneous master and slave is possible within the specification it has an impact on channel throughput and is complex to implement. If Wi-Fi is used as the backbone link between a number of Bluetooth access points the access points can perform a single task, either master or slave, simplifying the architecture. This then allows for easy context transmission over the Wi-Fi backbone without the need for wiring and takes advantages of new developments within 802.11 chip sets implementations to maximize range and throughput.

A further advantage of routing through a PC is that all the VoIP packets and authentication information are available at the PC and can be transcoded to transmit over proprietary VoIP networks such as Skype™ and MSN™.

A further advantage is that the wireless coverage of a home or office can be effected with low cost devices and the wiring plan of that space can be substantially simplified.

The best coverage for the widest range of devices can be obtained by supporting Wi-Fi and Bluetooth, however both systems inhabit the same frequency range and so strategies for coexistence must be used. There are well understood coexistence regimes within the Bluetooth 1.2 specification and additional hardware support for coexistence can be provided for example within the CSR BlueCore™ and UniFi™ Portable specifications. However when using voice over the SCO (Synchronous Connection Oriented) Bluetooth link, interference is still audible. A benefit of using audio over the ACL (Asynchronous Connectionless Link)—a packet based data channel—is that the link is more robust, supporting greater error correction which makes the system much more resistant to noise. In a SCO link, a circuit is set up with reserved bandwidth, the audio is encoded into digital samples and streamed over the link. There is no re-transmission if parts of this stream are lost (although there is some forward error correction provided by the protocol). Thus, an interfering event that affects the stream will still be audible.

In an ACL link, the audio is sampled, compressed and packetized. The link has a degree of packet retry, the forward error correction can be increased because the data is more highly compressed and the CODECs used have lost packet masking characteristics. Therefore there is both a lower chance of loosing a sample and a lost sample has less audible effect.

A further advantage is that all data transits over ACL links which can be optimized to have lower error rates and have forward error correction options.

A further advantage is highly compressed audio data can be transmitted using AMR codecs that are implemented in hardware on most mobile devices. This allows for lower data bandwidth over the link. The system has full control of the audio path.

A further advantage is that the combination of low data bandwidth and an error corrected link translates into improved range, and improved quality in the presence of interfering noise.

A further advantage is that the architecture and protocols are substantially the same when moving from Bluetooth to Wi-Fi networks.

A further advantage is gained by using Bluetooth ACL connections rather than SCO connection in that the quality and range are improved and ACL supports an IP data channel giving the advantages of an all IP approach.

A further advantage of using ACL links is that up to seven devices may be connected at one time to a Bluetooth Master.

In the previously available systems it has proven difficult to implement seamless handoff between cells or infrastructure. In both the UMA and CTP systems the audio is encoded in substantially different ways for the different radio paths—although efforts have been made in UMA to make these as similar as possible. As handoff occurs, the system must be re-configured as quickly as possible to implement the new coding scheme for audio transmission. In the invented system, the protocol is encoded in the same way regardless of which radio connection method is used. This means that without burdening system resources the handoff can be implemented quickly as no re-configuration is required or the packets can be simultaneously sent over both radio connections during the handoff to provide seamless handoff.

In current systems, acquisition of a WLAN Access Point by the handset can take some time. The invented system solves this by providing a table of available Access Points and pre-pairing these in the background. If location information is available through cell ID, network location information, GPS (Global Positioning System) data, or the current or last known Access Point location, then the acquisition procedure can be further improved by initially limiting and then progressively widening the search space. Such efficient search patterns improve power consumption as well as reducing the time to connect. So for example a person may touch down in a foreign country and the phone detects a network change—the person roaming in Germany on one of the German Networks. The handset communicates with the server to indicate that it is in Germany with Cell ID 12345. The server will now send it the AP tables for that region of Germany and it can begin efficiently searching for AP resources. If no AP resources are known for Germany the handset will simply begin a basic search from first principles.

Previous systems have used the low level audio subsystem within the phone implemented for either GSM or Bluetooth CTP. These hardware systems are efficiently built but inflexible as previously illustrated. In particular, they are unable to hand their audio-streams to the high layers of the protocol stack for processing so the systems can not be easily re-programmed. The invented system uses the software configurable digital path utilizing the operating system multi-media framework to implement the audio function. In this case it is necessary to correctly prioritize tasks within the system so that audio is handled without interruption.

Previous systems have used relatively simple coding schemes in the handsets and subsequently encoded the data into VoIP later in the system, either at the AP or in the Network itself. By contrast, in the invented system, voice is converted immediately into Voice over IP (VoIP): This protocol is inherently timing independent and there is no attempt to encapsulate or emulate another protocol, thus minimizing the system complexity. By encoding the audio streams into VoIP streams in the handset our system enables a range of peer-to-peer routing options that are unavailable in the previous systems. Indeed, it is possible for the audio streams to route locally without touching the Internet and even for the audio streams to run handset to handset without routing through the AP's. Thus in each condition the route can be optimized while maintaining the same fundamental audio coding scheme.

A significant contrast with UMA is that connection to the core cellular network is not required in order to perform telecommunication functions allowing anyone to implement a mobile VoIP solution with minimal infrastructure investment.

The use of dual mode repeaters in the system allows the phones to use the optimum WLAN protocol for power consumption.

A major benefit of the invented system is that since the protocol stack is 'all IP' and then communicates over a general socket layer a hand-off between Bluetooth and Wi-Fi is straightforward. Once again, the SIP proxy can cope with two IP addresses or endpoints connecting to the same caller and handoff is a matter of beginning, sending packets on one bearer, and ceasing on the other. Packets can be sent over both bearers to give diversity reception implemented at the IP level and in devices that can connect to more than one AP of either Bluetooth or Wi-Fi then multiple packet streams can be sent to multiple AP's if desired.

Another significant benefit of being able to switch seamlessly from Bluetooth to Wi-Fi is to use the extremely low power capabilities of Bluetooth to preserve battery life but still allow the use of Wi-Fi when Bluetooth is unavailable.

A further benefit is to extend coverage options and increase the likelihood that you will have a WLAN connection available to the Internet

BRIEF DESCRIPTION OF THE DRAWINGS

FIG. 3 is a table showing the data record structure for a customer.

FIG. 7 is a table describing a day in the life of a user.

FIG. 13a depicts a system that implements a UMA-type system

FIG. 13b depicts one embodiment of the present invention

FIG. 13c depicts a system that implements a Bluetooth-CTP type system.

FIGS. 17 and 18 depict the repeater utilized in one embodiment of the present invention.

FIG. 31 is a diagram that illustrates the system elements to permit co-existence between Bluetooth and Wi-Fi systems.

DETAILED DESCRIPTION OF THE INVENTION

Figure 1:
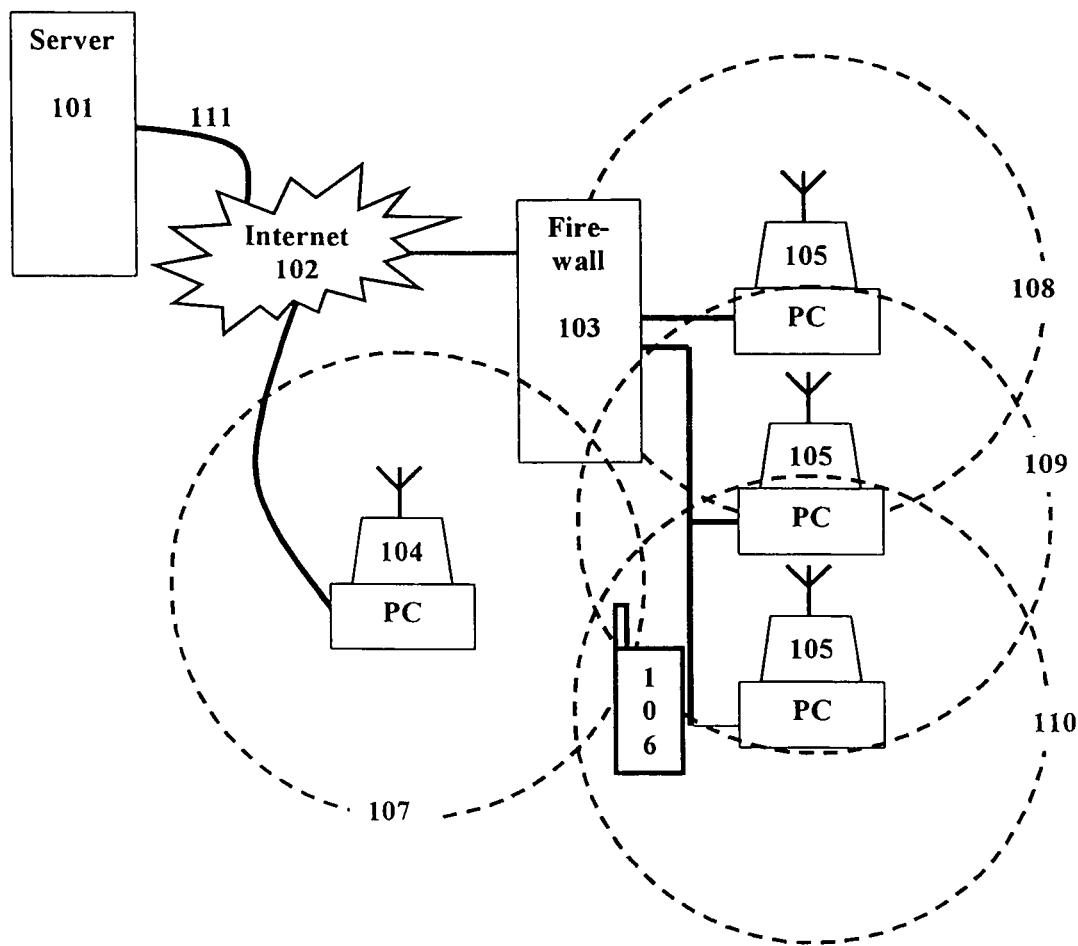
FIG. 1 illustrates tunneling Internet access in one embodiment of the present invention.

Referring to the drawing figures, like reference numerals designate identical or corresponding elements throughout the several figures.

The present invention provides a method and system for easy, secure, mobile Internet access thru fixed connections points. These fixed connection points being computers that are connected to the Internet and have another port available for connection by one or more; mobile users. A fixed connection point can itself be a portable device, such as a portable PC, and may be moved from time to time. The term is a relative one. To a mobile user a PC with an Internet connection is a fixed device. For the purpose of discussions regarding the system operation these fixed points will be described, as hosts and a mobile user will be called a client. The host can be any form of general purpose PC or a custom built device, which as two connection methodologies and an ability to selectively connect those methodologies under program control.

The simplest system has a host and a client. The host will generally communicate with a server to transfer data and receive services but a host can run in stand-alone mode if connection to a server is unavailable or if client security and privacy are not high concerns such as when the host and client are used by the same person.

The system is composed of three main parts: The software application, the web server and associated web site and specialist network services such as streaming and VoIP which are provided by other parties.

The link functions include:
1. Download of software.
2. Installation of software.
3. Updating of software.
4. Registration of the user to the service.
5. Testing the system.
6. Location of another wireless node or enabled device.
7. Backup location of any Node. IrDA, wired, dialer . . .
8. Determination of payment conditions: cooperative free, cooperative with cost, commercial.
9. Determining whether the user permission matches the link available.
10. If it does, establishing the link.
11. If it does not, notifying the user of the availability and giving them the option to accept or reject plus update their user profile.

12. Provide voice over IP.
13. Call handover to cellular network.
14. Data handover to cellular network.
15. Encrypt J Encode data for safe sending to the remote web server.
16. Location of VoIP network nodes (Akamai™, Lipstream™ et al.) and direct communication with streaming servers.
17. Billing, most recent call information.
18. Fault logging and diagnostics.

The Tunneling Functions Include:
1. Identify fixed line connection or another wireless node.
2. Connect to cooperative server and register.
3. Activate and monitor cooperative connection and enumerate service.
4. Negotiate link with request from cooperative member.
5. Provide secure link (tunnel) to Internet.
6. Handover to alternate link upon request or change in network status.

The Server Functions Include:
1. Registration of users.
2. User preference setup.
3. Service list/Portal to customer services.
4. Decocting/De-encrypting transmission and forwarding to web.
5. Provide an Internet store and forward.
6. Negotiation of streaming links.
7. Negotiation of VoIP link.
8. Allow registration to partner services.
9. Negotiate handover upon network status change.

Third Party Functions that may be Linked to Include:
1. Provide VoIP service (Lipstream™, Net2phone™, Akamai™)
2. Provide: Streaming service (RealNetworks™, Akamai™, Microsoft™, QuickTime™)

The software application runs on both the client and the host, varying its mode of operation depending on its function in the network. (It is possible for the software to run within a. browser thus giving a 'software-less' mode of operation. Is will be obvious however that software is indeed running in this instance.) The web server provides the user interface to the service, allowing people to register and also the configuration software to correctly set up each machine and ensure that the software application which runs on the client's and host's is up-to-date and correctly configured.

In the case of multi-media and voice these IP packets may not be routed to the server but may travel via a third party routing service for optimum performance.

The preferred embodiment of the Invention will now be described with the aid of figures. The embodiment assumes that a short-range wireless link such as Bluetooth™ will be available, and the reader is directed to the Bluetooth specification for further implementation detail. In addition a user skilled in the art should be able to translate the flowcharts into useable code by reference to examples provided in the literature, for example the Microsoft Developer Network™ for the Windows™ operating systems.

FIG. 1 illustrates the general layout of the network. A roaming device, 106, which might be a mobile computer, PDA, cellular telephone or home appliance, comes within range of the fixed wireless link of a member, circles 107-110. The mobile device determines the connection methodologies available to it and their relative merits and then connects to the host using the best available standards.

Once the link has been established the cooperative tunneling agent examines the preferences of the roaming member and the fixed member and compares these with a database stored on the server. If the comparison generates a match then standard IP packets are encrypted and sent from the roaming device 106, thru the fixed device 104 or 105 thru any present firewall 103 thru the Internet 102 to our server via a link to the Internet 111. Our server 101 decrypts the packets and sends them onto the Internet via the link. Return packets from the Internet are passed back to the server and are similarly routed back to the member via the encrypted links.

There are two scenarios; corporate and home users. A home user depicted as PC labeled 104 typically makes a direct connection to the Internet 102 without the benefit of a firewall 103. A corporate user connects to the Internet thru a proxy server and firewall 103. These two functions are shown as a single block but may be comprised of several physical units; a router, a server, a proxy server, a firewall and a security monitoring computer. For our purposes it is not important how many physical or logical blocks are involved merely that there is a Firewall function that we need to negotiate. Firewalls provide a range of services. Primarily they block all ports except the commonly used business ports such as http port 80. This stops hackers accessing systems using older methodologies that often grant considerable powers to a user. In addition the firewall may block specific web sites thru the exclusion of certain IP address lists—'black list'.

These preferences may be appropriate for the corporation but wholly inappropriate for the member requesting the tunnel. Therefore the tunneling agent can encode all packets and sends them thru port 80 bypassing any corporate specific snooping of the data. If the UDP ("user datagram protocol") port is available this may be preferentially used for sending VoIP and other real time packets.

References to the server in this description may apply to any server providing our service. There may be more than one server on the network. Accesses may be cached at any point in the network. There may be several synchronized servers located geographically to improve throughput and efficiency of the system. The actions of the server may be split across several logical or physical devices so as to optimize performance. In addition some specialized tasks may be offloaded to third party servers. The server may be the computer of another member such that there are no specialist servers in the system and all tasks are distributed. In such a case the members database might be duplicated and distributed thru the network to provide security and redundancy and a VoIP a single point of failure.

Figure 2:
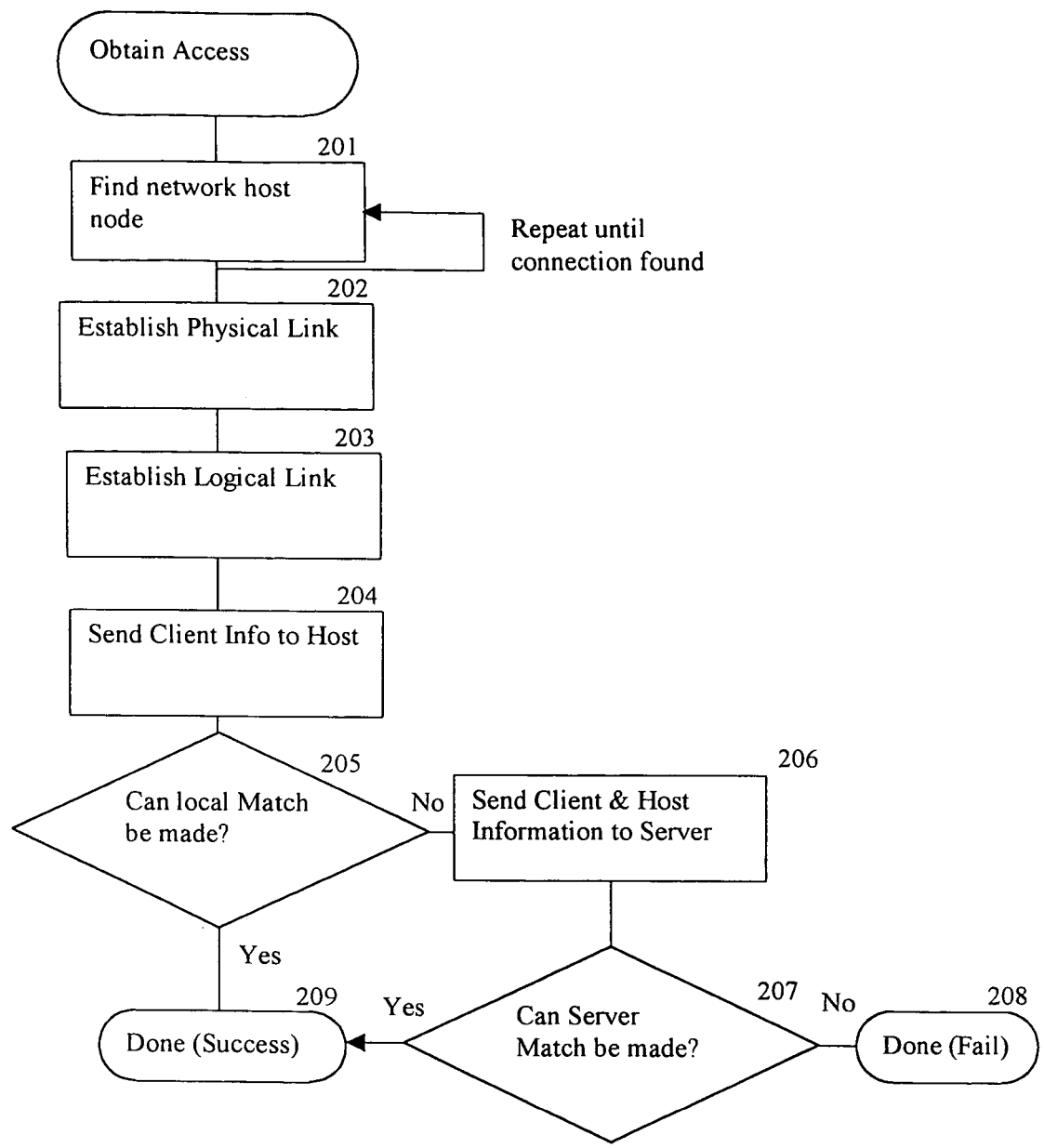
FIG. 2 is a. flowchart of the process by which a link is established.

FIG. 2 is a flowchart giving the steps required to establish a link and obtain access to the Internet. The tunneling agent running on the client computer sits in a loop attempting to find a network node 201. The polling rate can be set by user preference or turned off and re started by user command at a later stage. In the case of a Bluetooth™ radio link the link protocol will find a network node and establish the physical link in step 202. At this point a physical link exists between the two devices but no services are yet available. The host computer has been pre-configured to direct all physical links to the CTA (cooperative tunneling agent) which acts as a gate keeper for all network access thus the logical link 203 is set up to point only to the CTA. The client then sends the client ID and associated information to the CTA. If this is the first access by a user to the host system the local match step 205 will always fail. However the match can fail for two reasons. Firstly that the preferences don't match immediate failure can be notified to the client without reference to the server. If the preferences match but insufficient information is held to determine whether a complete link can be made the host will contact the server. (In certain circumstances such as the request for a non-client-secure link the client and host can operated independently of a server.) The client and host information is sent to the server in step 206 and the server attempts to make a match in 207. If the match fails a link is not made and the user is notified and given options to modify their preferences and start again. If the match is successful the link is made and link information is cached on the host machine. This information can be used to reestablish the link without reference to the server if the link is broken. A mobile user who is on the edge of range may be constantly moving in an out of range so caching the link information allows the link to be made and broken quickly without a server request being required every time.

FIG. 3 is an excerpt of a member record showing the important elements in creating; a match between cooperative members. A person skilled in the art will appreciate that there will be other fields required to fully describe the customer and log historical information but these are generic to all ISP (Internet Service Provider) customer records. Remembering that every user can be a host or client, the record is appropriate for all members. The record is divided into three main sections: general data 301, tunnel provision 302 and tunnel request 303. In simple terms the member agrees to grant access to the Internet on certain terms to other members. Members define the parameters on which they will accept access. If two parties come into range and the granting and accepting criterion match, a link is enabled. The most common link is a fixed member (host) connected to the Internet by an always-on connection, such as an ADSL modem, granting free access to a mobile member. Another common connection occurs where the host is connected by metered access. The host can inform the client of the cost prior to making a connection to the network. The process by which this information is used to establish a link is detailed in FIG. 8.

Figure 4:
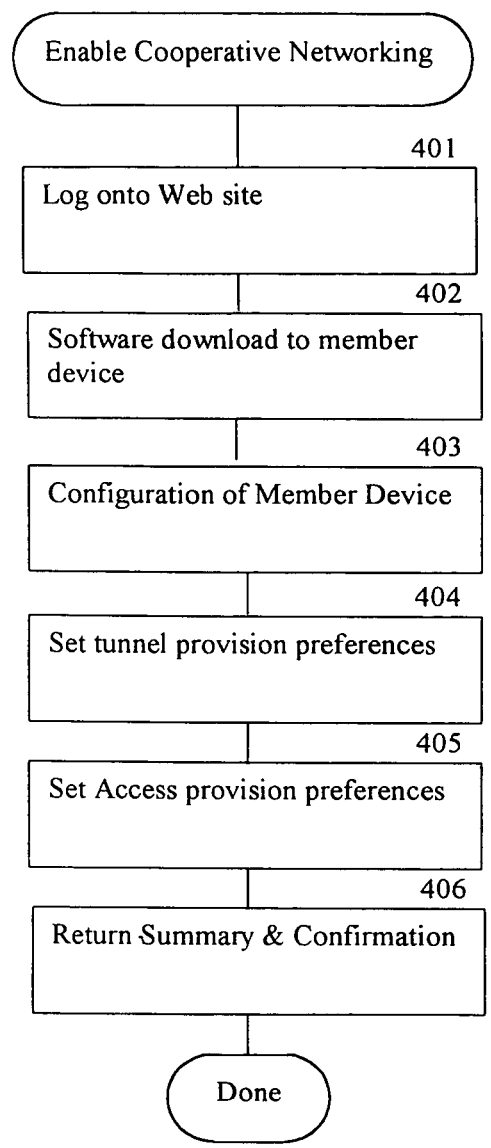
FIG. 4 is a flowchart of the process by which cooperative networking is enabled.

FIG. 4 is the flow diagram by which cooperative networking capability is enabled. In step 401 the user logs onto the website to requests the service. In step 402 software is downloaded to the member device. In step 403 the software scans the members system and determines the connection methodologies available, sets parameters and directs the flow of data from those methods to a secure piece of software. In step 404 the user sets the tunneling preferences that they wish to grant to other members along with their personal details. In step 405 the user sets the access provision preferences they would like when they use the network. In step 406 the system summarizes the preferences and confirms they meet the customer policies pertaining at the time. These preferences are stored on the host client with the associated user ID. Confirmation of credit approval can be given at this point.

One skilled in the art would appreciate that the software could be provided by other means such as a floppy disk or CD-ROM.

Rather than downloading and running the software on the client system, the software could run on the server and client system using a method such as Active Java™ Pages. However in order to configure the client system the software will need to undertake a number of low level tasks which might be protected from modification by a Java program and downloadable program elements are generally required.

Some operating systems, when connected to a new network, automatically log onto a default network specific web page upon boot-up. This feature can be readily provided so that a client system has only to connect their computer and turn it on and the host node will automate steps 401 and 402.

In the absence of a network connection the host computer may store a copy of the installation and registration software so that the registration and setting of preferences can be performed off-line and then uploaded to the server upon next connection.

The configuration software may be 'beamed' from one user to another or transferred over the link to user who does not yet have the service by a push or pull methodology.

Figure 5:
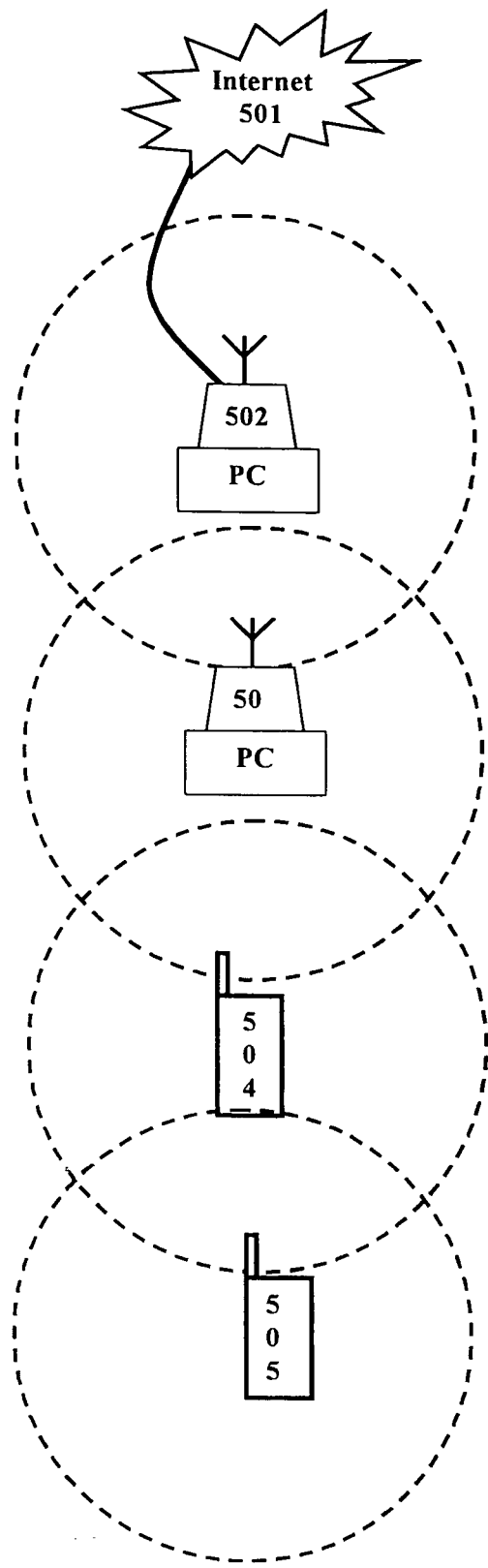
FIG. 5 is a diagram illustrating recursive service discovery.

FIG. 5 illustrates recursive service discovery. In this specification we have generally discussed systems where there is one fixed node connected to the Internet providing one or more Internet connections to mobile nodes. However it may often happen that a mobile node is not within range of a fixed node but is within range of another mobile node that is itself within range of a fixed node: a two hop connection. In this figure we show a three-hop connection. A mobile user 505 wants to gain access to the Internet. Thru the wireless network it connects to another mobile user 504 and requests a tunnel to the Internet. This unit is not connected to the Internet thru a wired connection and so itself makes a request to another unit 503. This unit, although fixed, has no hardwired Internet connection and so connects another Computer 502, which does have a connection to the Internet 501, and a link is made. In this example the link is established on a request basis as it is undesirable to establish a permanent link for power conservation: a pull system. However the link between 502 and 503 can be established once and be substantially permanent as both units have mains power supplies: a push system Thus the network can spread out to all permanently powered computers that are within range of each other and can be further increased in size on an ad hoc basis by requests from mobile units. The scope of the network may be pushed outwards to encompass all available nodes or pulled outward by devices wanting connection to the fixed network.

In order to save power it may be necessary for systems to synchronize their waking by registering a time pulse from the server and waking at predetermined times. (Packet delay time must be measured and added to the time synchronization pulse to ensure accurate synchronization of the servers.) Thus all the components in a system may wake at a predetermined time to attempt to push the network outwards.

Figure 6:
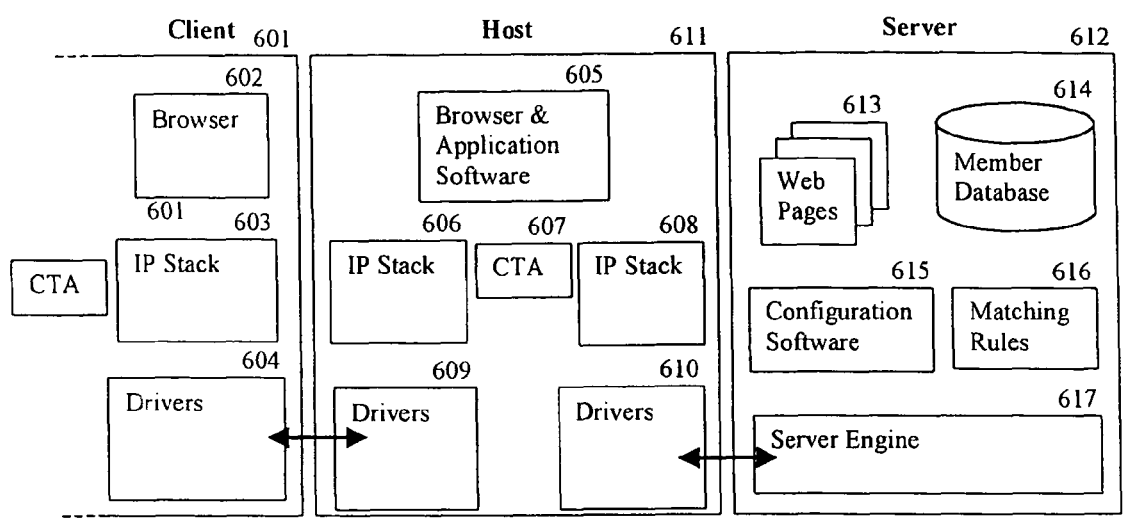
FIG. 6 is a block diagram of the elements of the system.

FIG. 6 illustrates in block diagram form the elements of a system. The client Browser 602 is pointed at the cooperative network website. It downloads and runs a program that sets up the computer. (This set-up was described in detail in association with FIG. 4.) The set-up means ensures that the correct drivers are installed on the computer to physically utilize the ports of the computer and that the IP stack and network resources are available and can be intercepted. Depending on the exact OIS, the CTA cooperative tunneling agent will either redirect all network calls thru its routines or provide a simple means for switching itself in when needed. The best method is usually described with examples in the documentation of the operating system. The software for the client is the same as that of a host system but the CTA on a host system only needs to talk to the uplink as there is no further downlink to manage. That said the downlink must be left in a state awaiting connection so that a multi-hop request can be made.

The host computer runs two IP stacks and two sets of network drivers. The first set 606 and 609 are used to communicate with the client. The second set 608 and 610 are used to talk to the Internet. The CTA 607 provides a low level link between the two. The host browser and applications are generally unaware of the presence of the link unless the host desires to know, in which case it can either run a utility, point to a predefined web page or enable a status notification. The host applications utilize the IP stack and drivers 608 and 610 in the normal way. The server comprises a server engine 617 that performs all the tasks of linking with the Internet and decrypting and re-routing; packets. A store containing the latest configuration software 615. The matching rule file 616. The member database 614 and the web pages which together form the web site 613. A packet from the client takes the following path. In the case where the client makes a web page request the browser routes the call to the IP stack in the client computer. The CTA intercepts the request, encrypts it and encapsulates the packet in a new packet, which is routed to the host. The host picks up the packet and routes it thru the CTA to the outgoing stack, adjusting the IP address appropriately. The server receives the packet, de-encapsulates it, decrypts it and sends it onto the web. When a reply packet arrives, it is encrypted, encapsulated and sent to the client. Further details on implementation of tunneling protocols can be found in the literature.

FIG. 7 is a table describing one potential typical day for a mobile Internet user and illustrates the complex options available for connection and the many hand offs between systems. Starting in the home 701 the user has a cable modem giving access to the Internet at 500 K bytes per second. Walking to the train 702 potential access speed drops to 9.6 Kbps using their mobile phone. On the fast moving transport mode of a train 703 the potential connection speed is limited, even in the new 3G networks that are being proposed. Once at work a free connection is available to the Internet using the office LAN 704. When the user goes to a meeting they disconnect from their LAN and move either to a different LAN node or a mobile network provided by the IEEE 802.11 standard 705. As they go out to lunch in a local coffee bar Starbucks™ they have access to a public Bluetooth node 706. Back in the office 707 LAN access is again available. Cell phone is available as they walk to their car 708 and drive in their car 709. At a gas station where they stop, a Bluetooth link is again available for high speed access 710. At a friend's house an ADSL link is available 711, but connecting to that LAN could be by a variety of means, including Bluetooth link or network cable. After leaving their friends house our user goes via Taxi 712 to a Hotel where a high speed Internet link kit is available in the closet of their room 713. It is an object of our Invention to make such mobile use simpler by provision of means to mediate the handoffs between these systems, store user and network data centrally and to provide common access links to all these different networks.

Figure 8:
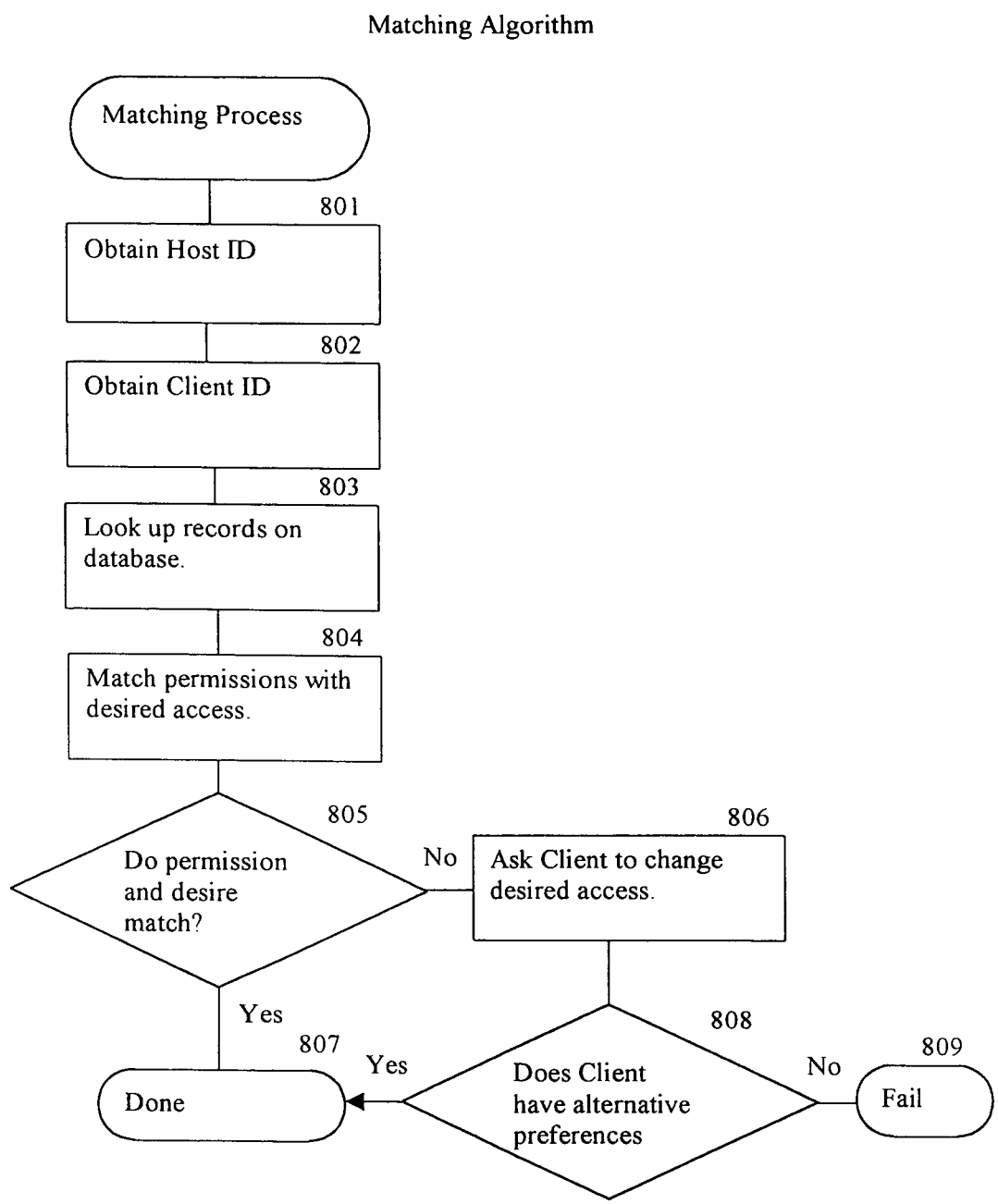
FIG. 8 is a flowchart of the matching algorithm.

FIG. 8 is a flowchart illustrating the matching process. The matching process obtains the host 801 and client ID 802 and looks up the record on the database 803. It then attempts to match the access permission with the desired access 804/805. If this fails the client is asked whether it wants to change preferences 806. (Typically the failure will occur because the client has no settings for obtaining a paid link to the Internet if the host is a commercial link or a cooperative link with non-zero incremental cost for access. The host will want to pass this cost onto the client.) This will require the client to amend their record 807 to provide billing info and to set the maximum connection charge and per minute charge that they are prepared to pay for an Internet connection. In the case of a paid link they can further set a budget for link costs.

Figure 9:
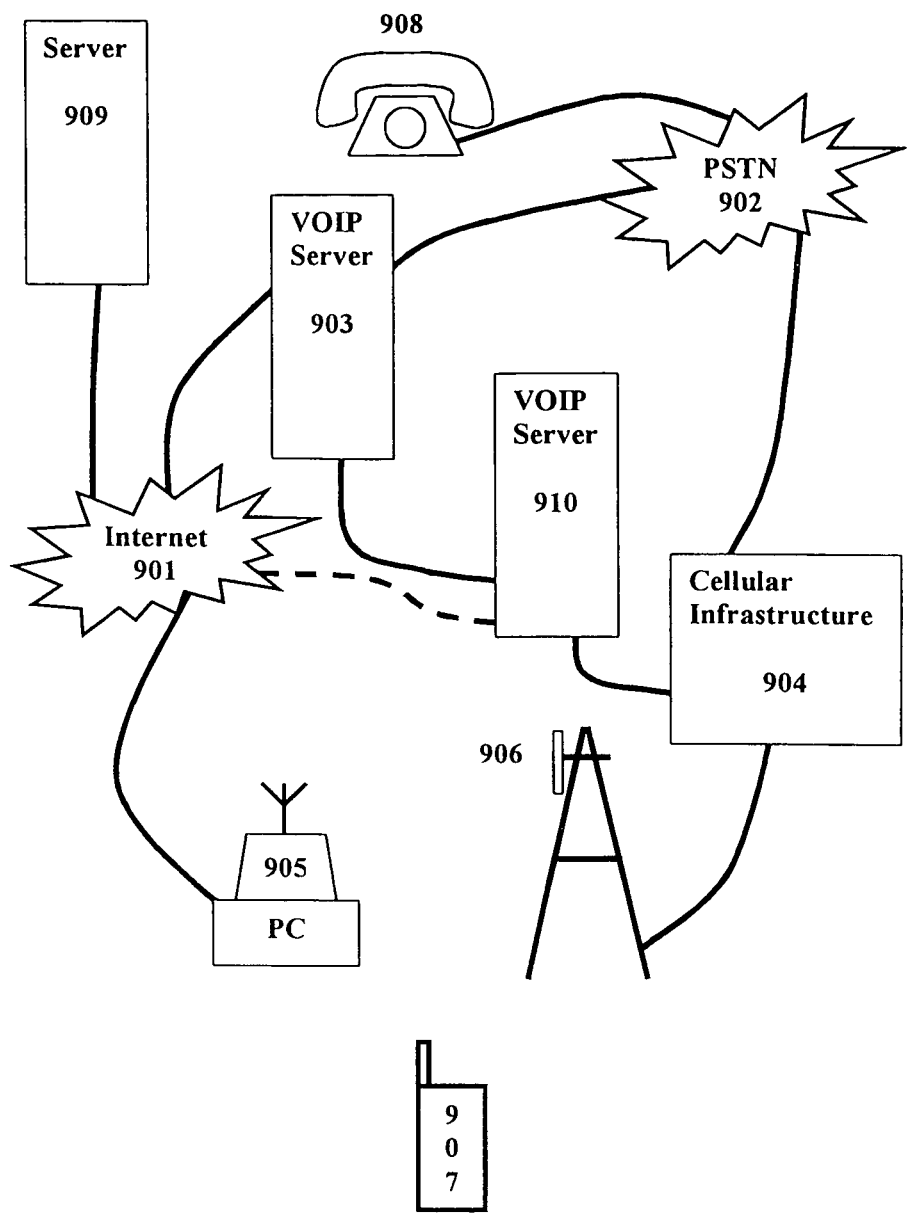
FIG. 9 is a diagram illustrating voice over IP and service handoff.

FIG. 9 illustrates handoff between a fixed wireless, Internet based, VoIP system and the cellular system. A mobile user 907 is within range of two methods for placing a call; a PC running our cooperative networking service and a cellular tower. The call might be preferentially placed to either unit based on the users pre-set preferences or based on the current situation. Both links could be made or broken independently and exist simultaneously. In the case of connection made over the Internet voice packets are sent over the air using a wireless link such as Bluetooth or IEEE802.1 to the host 905 These packets are routed thru the Internet 901 to a VoIP server 903. The VoIP server converts IP packets to a form suitable for use over the PSTN and handles making and breaking the connection to users. There are many VoIP servers, two are shown here, located in each region such that the call is placed at a local rate. If the user moves away from the fixed wireless link 905 or the Internet becomes congested such that call is no longer of sufficient quality, a factor that can be determined either automatically or by the user the call can be dialed on the cellular link. There are a number of methods that handoff could take. Firstly the call could be dropped by the VoIP server and a new call initiated end-to-end thru the cellular network to the destination 908. This would result in a break in the call. More suitably the mobile device would call a VoIP, either the existing server 903 or a server located near to the caller 910. The VoIP server would take information from the cooperative network server and route the call to the already established PSTN link and then to the destination 908 thus maintaining the call. A benefit of this is that the call is not dropped, interrupted or reinitialized. A further benefit is that mobile device can place a call to a. local VoIP server 910 which forwards the information to a VoIP server local to the receiving party thus saving cost. The call routing between the two VoIP servers can be via the public Internet (dashed line) or thru a proprietary network.

The host node may send data using IP over the air or it can emulated the Bluetooth™ air interface and appear as a cordless telephone base station for the client device. By this method no specialist software needs to run on the client device if that device is a handheld phone or similar. Security can be preserves by not decrypting the air interface on the host system and passing the un-decrypted information onto the server.

Ramifications

The use of this technology will enable a number of commercial services that have hitherto been prohibitively expensive or complex.

Roaming users will be able to get automatic high bandwidth connections to the Internet wherever there is another member present. Since members can be commercial or cooperative in their action this will allow ubiquity of service.

One can envisage a member parking their car outside their home. The CTA connecting automatically to their home computer and synchronizing their MP3 music collection with their on board hard drive.

One can envisage a member driving into a gas station, purchasing a movie for their children using the onboard computer and while gas is being pumped and paid for the movie is downloaded to the on-board entertainment system.

Figure 10:
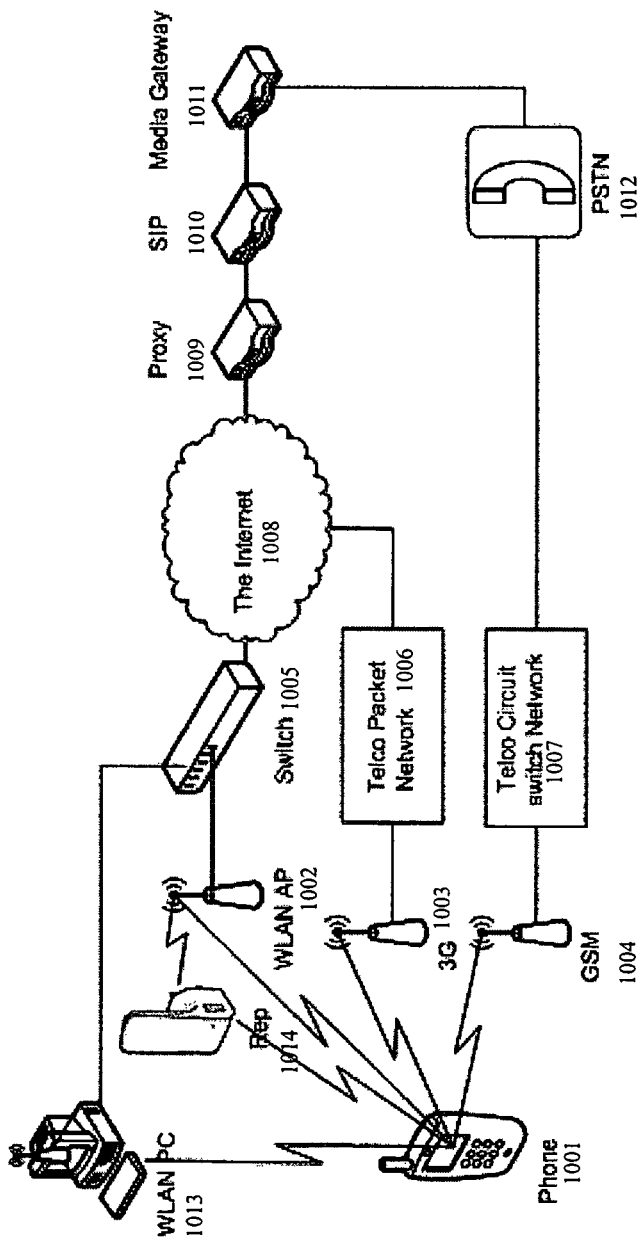
FIG. 10 depicts a wireless VoIP system for a wireless enable home, office or public environment in accordance with one embodiment of the invention.

FIG. 10 illustrates a wireless VoIP system for a wireless enabled home, office or public environment using commonly available systems such as GSM, SIP and UMTS (3G) but other similar systems might be used in substantially the same way for example CDMA (Code Division Multiple Access) and the H323 protocol. A mobile phone 1001 is present in the environment of a PC 1013, a wireless LAN access point 1002, GSM network 1004 and 3G network 1003. Each system is connected to the PSTN 1012 by differing routes.

A call may be made via the PC 1013 or WLAN AP 1002 by way of one or more switches (or routers) 1005 connected to the Internet 1008 and through a SIP proxy server 1009 a SIP server 1010 and a media gateway 1011. For the 3G network 1003, packets must transit the telco packet switch network 1006 prior to reaching the Internet 1008, while the GSM network 1004 is connected via the telco circuit switch infrastructure 1007 directly to the PSTN 1012. The range may be extended and the protocols translated by a repeater 1014.

With the exception of the GSM network 1004 shown, the other routes will utilize the Internet 1008. In those cases, the SIP proxy server 1009 provides media transcoding functions, the SIP server 1010 provides call management and mobility management functions while the media gateway 1011 translates media and signaling for the PSTN 1012 so that a call can be made to a general number, for example a telco circuit switch network 1007.

As described later in reference to FIG. 11, the phone can be modified to include a SIP stack or Micro stack (that is simply a functional subset of SIP) for signaling. Enabling the WWAN (typically UMTS) layer is done by issuing an attach command. Enabling the WLAN connection is done by issuing a pairing and connect command to the Bluetooth subsystem or the equivalent for a Wi-Fi enabled device. Both WWAN and WLAN connections may be made simultaneously providing multiple IP connectivity paths to the same point.

Once a SIP (Session Initiation Protocol) connection has been made, the low level DSP (Digital Signal Processing) subsystem of the phone provides its audio streams to the high level multimedia subsystem within the phone which encodes the voice into RTP (Real-time Transport Protocol) packets. VoIP data (RTP stream plus signaling) is sent over the Bluetooth data link to an access point (AP), for example WLAN AP 1002, which routes the VoIP packets to a SIP server through the Internet 1008.

If the packets are destined for a party that does not support VoIP they are sent to a media gateway that transcodes the packets into Common Channel Signaling System No. 7 (SS7) data for onward transmission to the Public Switched Telephone Network (PSTN) or a private branch exchange (PBX). The process operates in reverse for the return leg of the call. However, if the call is destined for another VoIP enabled party they are routed to that party over IP (if no transcoding is needed, and NAT (Network Address Translation) traversal is not an issue, then the RTP streams will be sent directly peer to peer).

In one embodiment of the proposed system the phones have two numbers—a conventional WWAN phone number and a 'native' number. The owner can choose to use either or both of these numbers in various ways as described. The owner need not be aware of this as the initial configuration on purchase can map the two numbers together for all practical purposes. If the network provider had both an IP and a mobile range within their switching infrastructure the two numbers can be completely hidden. If the system is deployed by a network carrier who has number processing capability then one number can be issued to a customer and the number processed to route calls, however if deployment is required in the telephone system by a non carrier then the following description illustrates how the incoming number routing problems are solved:

Calls made between this embodiment of the present invention system and a landline or mobile number require two types of servers:

Servers capable of call forwarding and proxying. Typically these would be Session Initiation Protocol (SIP) Servers or Common Channel Signaling System No. 7 (SS7) servers.

1) Media gateways which can translate VoIP traffic into PSTN (SS7) traffic or analogue voice traffic and vice versa.

Calling scenarios (the handset of which is hereafter referred to as a 'Truphone' for brevity) in the home and connected via WLAN (Bluetooth or Wi-Fi) are shown in the table below: The existence of a SIP server and media gateway operated by the provider of the Truphone service is referred to as the 'system SIP server'.

TABLE 4

| From | To | Call route |
|---|---|---|
| Truphone | Landline | VoIP call converted by media gateway to analogue voice locally to the receiving number and routed to landline by SS7 or SIP server. |
| Truphone | Mobile | VoIP call converted by media gateway to PSTN data locally to the receiving number and routed to landline by SS7 or SIP server. Optionally, the Truphone can identify whether the recipient is on the same network and in the same country as its own connection, and if so places a conventional phone call. |
| Landline | TruPhone native or PSTN number | Call passes through SS7 or SIP server, which will first identify whether the call can be routed as VoIP, and if so route the call via the media gateway for format translation and forward the data to the Truphone IP address. The initial data packets are specially formatted to cause the Truphone to ring (SIP invite packets), and also cause the Truphone to wake as described. If not, hand the call on to the phone network. |
| Landline | Truphone GSM number | Handle call pursuant to conventional mobile call procedures. |
| WWAN GSM (or UMTS voice) Mobile | Truphone GSM number | If the mobile operator has a suitably configured SS7/SIP server, then the call can be routed to Truphone VoIP or Mobile connection according to user preference, otherwise a conventional mobile call is made. |
| WWAN GSM (or UMTS voice) Mobile | Truphone native number | If the mobile operator has a suitably configured SS7/SIP server, then the call can be routed to Truphone VoIP |
| Truphone | Truphone | End to end VoIP call, route established by P2P discovery techniques, if possible |

When placing an outbound call in range of an IP network (e.g. Bluetooth, UMTS, or Wi-Fi), the phone will search in layers in a sequence as follows:

1) Peer-to-peer (P2P) radio connection via Bluetooth—i.e. call recipient has a Truphone in the same or a nearby room
2) Mediated P2P radio connection via the repeater, or home hub (i.e. WLAN)—i.e. call recipient has a Truphone in the same building
3) P2P connection via internet WAN connection—i.e. call recipient has a Truphone in range of an IP-enabled network anywhere in the world
4) SIP proxy-ed call, where one SIP server passes the call to a second SIP server that then terminates the call or itself passes the call on again.
5) IP routed to a local node and then call termination to a landline or mobile—i.e. recipient has a conventional landline or mobile phone anywhere in the world.

Some of these layers may be skipped for an individual call, based on configuration information or previously discovered location/available connection information. If the phone cannot reach an IP network it will place a conventional mobile call.

Many mobile subscribers have poor or no mobile network coverage at home, and this is a significant cause of subscriber churn for mobile operators. One of the benefits of the phone is to solve this problem. The subscriber in this scenario needs both incoming and outgoing calls, regardless of origin or destination, to be routed over the VoIP radio link (initially Bluetooth). The following scenarios apply:

TABLE 5

| Scenario | What happens |
| --- | --- |
| outgoing calls | routing is under the control of the Truphone |
| Incoming calls placed to the Truphone GSM number where the mobile operator has a suitably configured SIP & media server. | The server will route and translate appropriately. The subscriber can choose at the initial configuration stage whether calls that are not answered should be forwarded to the normal GSM voicemail service, or to some other answering service. |
| Incoming calls placed to the Truphone GSM number where the mobile operator does not have a suitably configured SIP & media server. | When the phone connects to the home WLAN, it automatically uses DTMF to connect to the mobile providers configuration service and change the call divert rule so that incoming calls are routed to the Truphone native number (or this rule could be left permanently in place). The subscriber would, however, in many cases have to pay for each diverted incoming call. |

Figure 11:
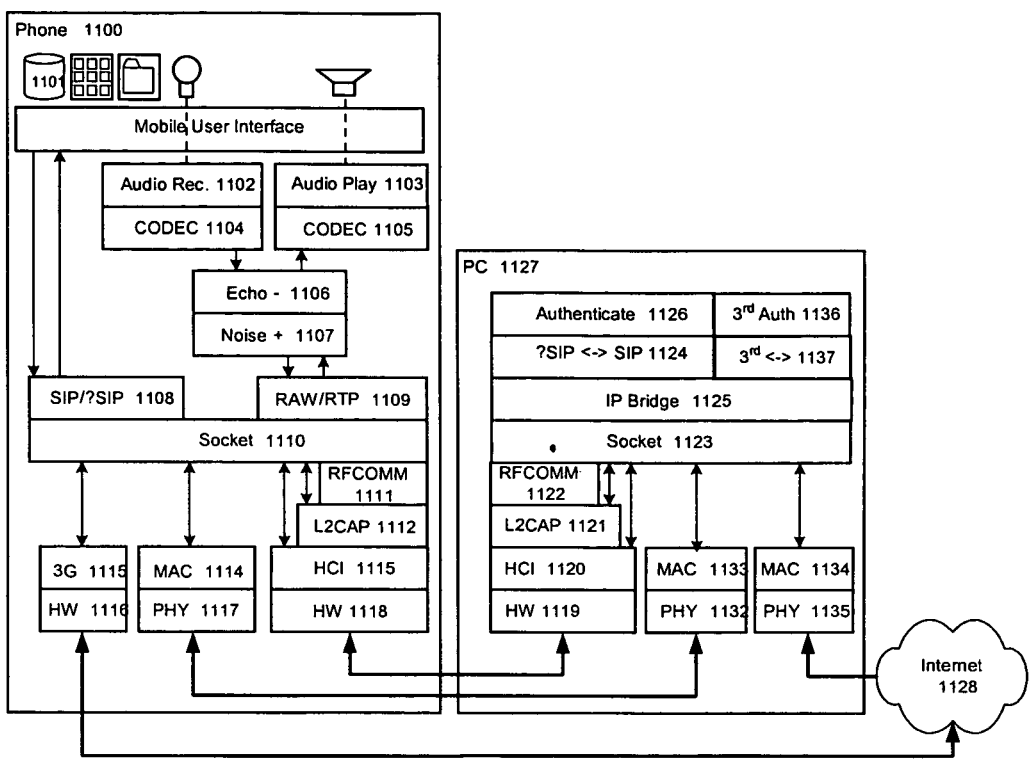
FIG. 11 depicts a block diagram for the phone 200 and PC 227 when using a Bluetooth and/or Wi-Fi and data enabled phone as the radio transport mechanism and a PC with Bluetooth and/or Wi-Fi connectivity in accordance with one embodiment of the invention.

FIG. 11 is a functional block diagram for the phone 1100 and PC 1127 when using a Bluetooth and/or Wi-Fi and data enabled phone as the radio transport mechanism and a PC with Bluetooth and/or Wi-Fi connectivity: The PC is configured as a bridge. Full duplex, bi-directional audio is implemented using the multi-media record 1102 and play 1103 systems that are resident within the phone. Multi-media record system 1102, play system 1103, CODECS 1104, and 1105 can all be implemented using a Digital Signal Processor. A short or long echo cancel 1106 system may be implemented by subtracting a proportion of the play stream from the record stream with an appropriate time delay—such systems may be fixed or adaptive. Comfort noise may be added by noise module 1107 so that the user is not disconcerted during quiet periods. SIP authentication module 1108 is implemented by the user inputting their SIP user ID and password (which can alternatively be auto provisioned) and then placing a call by typing the phone number on the phone keypad or selecting it from the phonebook 1101.

Once the SIP call is set up, audio is sent via the RAW/RTP module 1109 into the socket interface 1110 on the phone which is then connected either to the Bluetooth subsystem over RFCOMM (Radio Frequency Communications Protocol) module 1111, or directly to L2CAP (Logical Link Controller and Adaptation Protocol) module 1112 or directly to the HCI (Host Controller Interface) 1115, or in a Wi-Fi system to the MAC (Medium Access Control) and PHY (Physical) layers 1114, 1117, or in a 3G system to the 3G and hardware layers 1115 & 1116. L2CAP communicates using HCI commands over a UART (Universal Asynchronous Receiver/Transmitter) connection to the Bluetooth 'below HCI' hardware 1118 which implements a radio connection to the PC 1127 hardware Bluetooth element 1119 which reverses the radio packetisation and delivers the packet to the HCI 1120, L2CAP 1121 and RFCOMM 1122 layers and then onto a socket 1123 on the PC 1127. For a PC with Wi-Fi, communication is made over the MAC 1118 and PHY layers of the Wi-Fi card directly to the Socket subsystem 1123 on the PC. For a PC with 3G capability, communication is made over the 3G and Hardware layers on the 3G card 1131 & 1130.

A protocol stack on the PC then performs any SIP conversion necessary through SIP converter 1124, bridges to external IP (using an IP or MAC bridge or Bluetooth to IP conversion) and sends the date to the Internet via the PC's Internet connection. The PC may implement an authentication layer 1126 itself by way of a cooperative tunneling agent (CTA) or other means 1126 so that the server knows whose PC the call was routed through for billing and logging purposes. The on-going Ethernet link 1134, 1135 may itself be a wireless link. In this way, the PC has been configured as a Bluetooth to Wi-Fi repeater.

An important element of the stack organization is that the socket interface is multi-homed and connects to more than one transport layer simultaneously and the SIP/RTP interfaces can connect across the socket layer to multiple lower layers simultaneously.

An optional SIP conversion by module 1124 implements a subset of full SIP when talking to the phone so as to minimize code complexity and processor load in the phone. This penultimate device in the IP routing chain is either a PC 1127 or an access point (not illustrated) and runs the MicroSIP to SIP translation function as follows. The PC device is programmed to implement fully compliant SIP, RTP, RTSP while the phone 1100 can then implement a subset. For example, it can assume that all the packets are transmitted in order with no duplications, that the RTP headers have already been processed and removed leaving raw audio packets and that only the subset of SIP commands that it is programmed to deal with will be transmitted (the PC or access point will intercept and deal with all other protocol elements).

Once the SIP conversion has been done the PC forwards the stream to the Internet by way of its network controller MAC and PHY 1134, 1135. Once in the Internet the data will be routed to the proxy server or another client within the system. We also show that the 3G (UMTS) path from the phone 1115, 1116 reaches the Internet 1128. This happens by way of the 3G Network which is not illustrated. Once here packets may route anywhere on the Internet. It is worth pointing out that because of this connection point via the Internet 1128 the phone is connected by two routes to the Internet and the PC is potentially connected to the phone by at least two routes: The WWAN route via the Internet and one or more WLAN routes through the radio layers 1132 and 1119. This allows the PC to perform all the functions of a server if server code is placed within the PC 1127. This allows the invented system to operate in a pure Peer-to-peer mode without the presence of a server and server code can be placed in the handset(s) to perform pure peer-to-peer operation.

The path between the phone and PC in our preferred embodiment when operating over Bluetooth and connecting from a Nokia™ phone to a Microsoft Windows XP™ PC is the Serial Port Profile (SPP): This is the only Bluetooth profile that the two share. In other embodiments of the invented system, PAN profile or LAN access profile would preferably be used with BNEP protocol or RFCOMM.

FIG. 13 compares and contrasts the typical configurations of the three main forms of converged phone solution; UMA, the proposed Invention, and CTP.

a) In a UMA system the mobile subscriber (MS) 1308 connects over WLAN 1309 through an IP broadband system 1310 to the UMA Network Controller (UNC) controller 1302, 1311 using the Ub protocol specification. This UNC controller performs the job of a base station controller (BSC) in a cellular system, handling the de-encapsulation of protocols and managing mobility and handoff in conjunction with the cellular core network. The UMA controller 1302 interfaces with a set of subsystems within the core network HPLMN/VPLMN 1301a to provide cellular coverage over WLAN. Roaming authentication is handled by way of an AAA proxy call between 1313, 1316 to the home location register (HLR) 1315a of a roaming subscriber in their HPLMN 1314. If successful in authentication the UNC handles the signaling required to achieve handoff. In order to make a call outside the core cellular network, for example to another cellular network or a fixed line subscriber, a gateway to the mobile subscriber controller (GMSC) 1305 is used to communicate either over SS7 1303 or SIP 1306 to other subscribers. The subscriber mobile location controller (SMLC) 1300 can provide valuable information regarding customer location to aid in discovery of WLAN connectivity and provide mobility and location services. The interfaces between the UNC and core network are:—

A-interface, circuit Switch
Gb-interface, packet switch
Lb-interface, locations services b) In the proposed invention packets initially take the same path as in a UMA solution, originating from an MS 1319, traveling over a WLAN router 1320 via an IP connection 421, but then arriving first at our server that supports SIP 1318. The packets themselves are simpler in format (see FIG. 26) than in a UMA system as less protocol encapsulation is required. The SIP server is the main centralized control element in our system, interfacing with all the other systems and managing roaming, handoff and location management, but the handset can take control in a number of cases and obviate the necessity for a server, providing peer-to-peer capabilities that are not envisaged by UMA.

The SIP server in the invented system performs a number of tasks which are more fully described later in FIG. 15. To make a call the SIP server communicates via a media gateway function 1317 over SS7 or if the other system supports a SIP interface directly using SIP. A SIP connection to a cellular core network GMSC (Gateway Mobile Switching Centre) 1326 is shown for example. Authentication is provided using RADIUS (Remote Authentication Dial-In User Service) to ANY AAA (Access, Authorization, and Accounting) server and might include RADIUS proxy authentication calls to the cellular core network 1330, 1333 or any other AAA server that the user specifies (including one that is part of the SIP server 1318). The core network VPLMN (Visited Public Land Mobile Network) 1323 pictured is out of scope for our system, as is the UMA 1324, UNC 1329 block, so these are not further described. The WLAN router 1320 may contain a subset of the SIP server 1318 and media gateway 1317, such that it is able to route calls directly to the PSTN locally.

c) In a CTP system the MS 1335 must support CTP and the WLAN device 1336 must also support CTP—a standard Bluetooth profile. This Bluetooth device must be paired with a transcoder 1337, able to convert the Bluetooth CTP protocol either into SIP protocol or telephone system (POTS/ISDN) signals for carrying down regular telephone lines to the PSTN 1339. The WLAN Bluetooth transcoder may convert to SIP and route over an IP broadband connection 1338 to a SIP server 1334 which can terminate calls to the PSTN via a gateway or proxy SIP calls to further SIP servers. However this SIP server does not have end-to-end SIP connectivity with the MS 1335 which limits the call scenarios that may be handled.

One of the problems that have to be accommodated when utilizing both WWAN and WLAN networks is the problem of handing off the call between the networks. With regard to FIG. 14, handoff cases will now be described with reference to a state diagram but firstly we should define what handoff and handover are and the different forms that they take. Handoff involves passing the user to a different network. Handover involves passing the user to a different radio antenna on the same network.

Seamless handoff is where:—.
I. The user does not have to do anything
II. There is no break in the call
   You can also have seamless handoff with the audio visual warnings but without requiring the user to actually press a button to choose what they want to do unless they choose not to handoff.

Non-seamless handoff is where:—
I. Where user has to make a decision and take some action—such as to walk back into WLAN coverage.
II. Where there is an appreciable break in the call Make-before-break is where packet streams are sent via two paths during handoff/over. Break-before-make is where there is a pause in packet sending as handoff is made. Break & Make is where there is such a short time between the break and make that the user does not notice it even though it is technically a break before make event. Pre-buffering and rate conversion techniques can be used to smooth over a break-before-make handoff so that the listeners do not hear an interruption, however there is a transitory increase and then decrease in latency which might be noticed by some users.

TABLE 6

Handoff Cases

| Case | Handoff from | Handoff to | Arrow | Typical use case |
|---|---|---|---|---|
| Case 1 | Voice call on WLAN (IP Circuit) | Voice call on WWAN (IP Circuit) | 1460 | Walk away from Wi-Fi AP where 3G is available, picks up UMTS data connection. |
| Case 2 | Voice call on WWAN-Audio Circuit | Voice call on WLAN (IP Circuit) | 1459 | Walk into Wi-Fi coverage area call is diverted to Wi-Fi and GSM call drops. |
| Case 3 | Voice call on WLAN (IP Circuit) | Voice call on WWAN-Audio Circuit | 1458 | Walk away from Wi-Fi AP, (no 3G) reverts back to GSM call via conference feature. |

TABLE 6-continued

Handoff Cases

| Case | Handoff from | Handoff to | Arrow | Typical use case |
|------|-------------|------------|-------|------------------|
| Case 4 | Voice call on WWAN-Audio Circuit | Voice call on WWAN (IP Circuit) | 1454 | Voice call on GSM switches to voice call on UMTS-VoIP |
| Case 5 | Voice call on WWAN (IP Circuit) | Voice call on WWAN-Audio Circuit | 1457 | Voice call on UMTS-VoIP switches to voice call on GSM |
| Case 6 | Voice call on WWAN (IP Circuit) | Voice call on WLAN (IP Circuit) | 1464 | WLAN becomes available again and call is switched back to use it. |

TABLE 7

Discover Case

| Case | From | To | Arrow | Notes |
|------|------|-----|-------|-------|
| Discover Case 1 | WLAN off | WLAN connect | 1453 | Discovers and connects to WLAN |

Case 1: WLAN to WWAN-IP (UMTS, EDGE, GPRS and others)

In a case where a call is currently progressing over WLAN via an access point and the user moves out of range the phone will switch to transmitting the packets via WWAN. Prior to handoff, the mobile device will have communicated with the SIP Micro-Proxy in the Access Point or server to ensure that both WLAN and mobile data paths have connectivity, at least during the discovery and authentication process 1453 and probably from time to time due to handover or polling events, 1462, 1463. (A SIP Micro-Proxy supports a subset of SIP such that it can provide similar functionality to that of a full SIP server as now described.) The phone will be known to the server by two IP addresses which are resolved in the SIP server or SIP Proxy by a Network Address Processor (NAP). In some cases the phones IP address may remain the same via both paths even though the paths differ and ports may be used to distinguish the two streams. If neither the ports nor IP address differ the RTP systems should still cope with the packet duplication as this is a standard feature of the SIP/RTP protocol.

As edge of range is detected by way of either, Receive Signal Strength Indication (RSSI), Bit Error Rate (BER) or Network Location Services (NLS), the phone will initiate handoff using either a seamless or non-seamless method.

a) Seamless handoff is achieved by either rapidly switching the IP stream from the WLAN socket to the WWAN socket connection 'break-before-make' OR, copying the IP stream to two sockets and once end-to-end connectivity is proven stopping the stream to the WLAN socket 'make-before-break'.

b) A non seamless handoff is achieved by using 'break-before-make' handoff and notifying the user using some form of audio or visual indication that the WLAN connection is becoming or has become unavailable and giving them the option to either move back into coverage, accept the handoff, or terminate the call. This allows the user to move back into coverage and deliberately avoid handoff. Users rapidly learn the limits of range within their environment.

Figure 12:
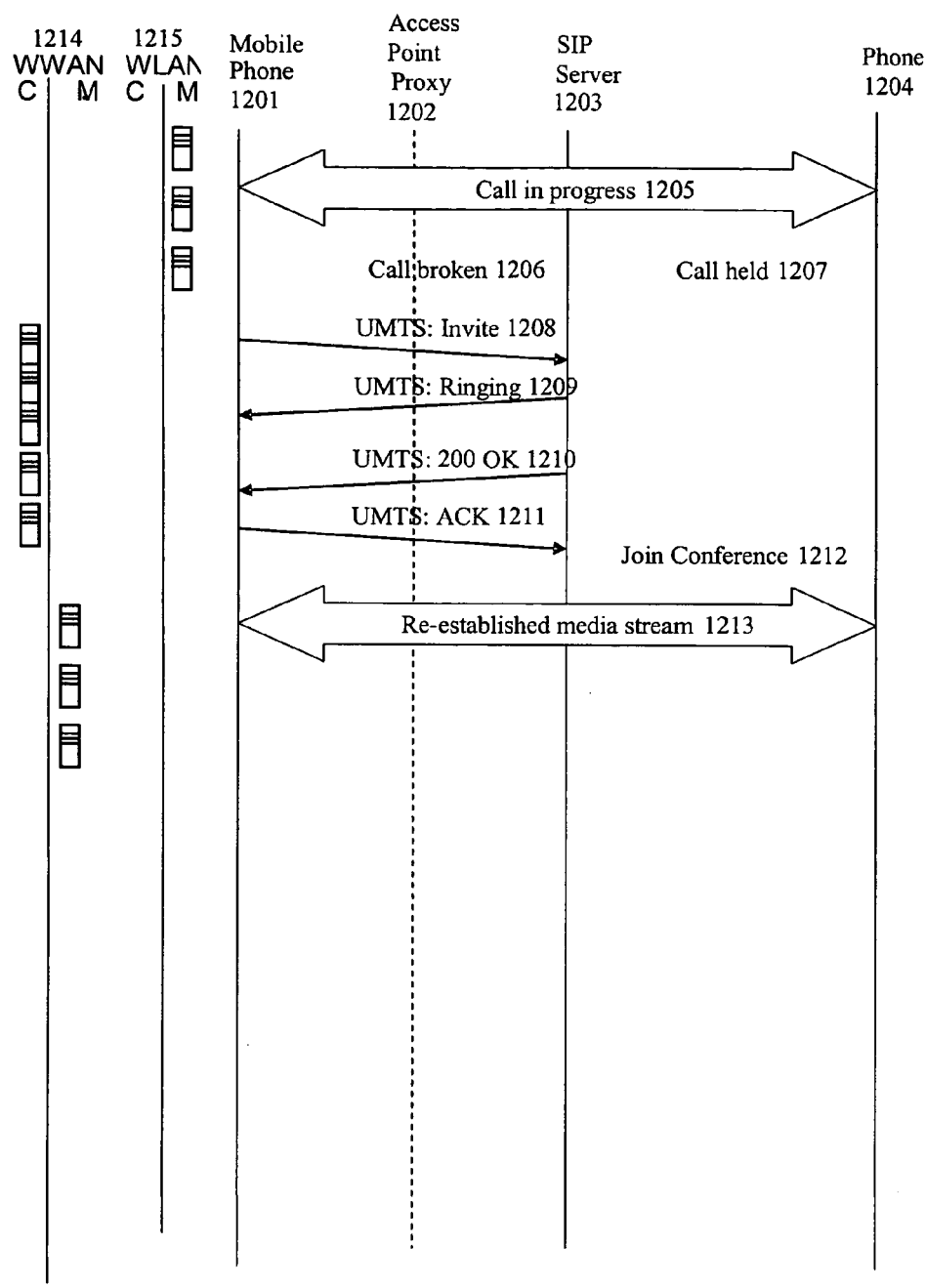
FIG. 12 is a call flow diagram for the SIP protocol elements during handoff between a WLAN call and a WWAN-audio protocol call in accordance with one embodiment of the invention.

The benefit of non-seamless handoff is that the costs associated with the new mobile data link may be higher and notification of the user is desired. FIG. 12. is a call flow diagram showing one embodiment for handing off a call that was initiated as a WLAN call and will be switched to a WWAN-audio protocol call. The SIP server supports conference calling function. At the starting point a call is in progress 1205 (the set up of which is not shown) between the mobile phone and the fixed phone: The mobile phone 1201 is connected to the SIP server 1203 via an access point 1202 which is in communication with a PSTN phone 1204. All calls in the system are setup as a conference call so that when the SIP call is broken because the user moves away from the WLAN access point the onward call is held 1207 awaiting further parties to join. This call is held for a programmable time period, typically 10 seconds, and a notification is made to the user that the call is handing off if handoff has not been made within 1.5 seconds. Greater than 1.5 seconds being an arbitrary definition of the boundary between seamless and non-seamless handoff that can be varied as required.

The WLAN 1215 and WWAN 1214 control, C and media, M channels are shown to the left of the mobile phone 1201. The mobile now sets up a call by one of two mechanisms. If a WWAN channel 1214 is available then using a SIP call method with invite 1208 acknowledge 1209, 1210 mechanism the phone re-joins the conference call 1212. The media stream is re-made 1213 and a handoff between WLAN-VoIP and WWAN-VoIP is effected.

Alternately, if a WWAN-IP connection is not available, under control of the handset software client, the phone dials using the native voice calling capabilities of the phone (WWAN-Audio) and joins the conference via the PSTN. The media stream is transcoded from the PSTN and re-joined to the conference bridge. In general the dial up procedure takes 2-7 seconds and so will rarely be seamless but in some networks high speed connection is available and seamless connection can be achieved.

There are many other call cases and handoff cases that this technique can be applied to.

A make before break alternative can be used where WWAN-IP is available such as in UMTS. A duplicate audio path to/from the proxy via another IP route is created when hand-off is looking likely, then when hand-off is confirmed, the handset switches over to the new audio-path and disconnects the old one. This does not require any re-invites or conferencing as the proxy is the client as far as the server is concerned and so never changes its IP address.

Figure 29:
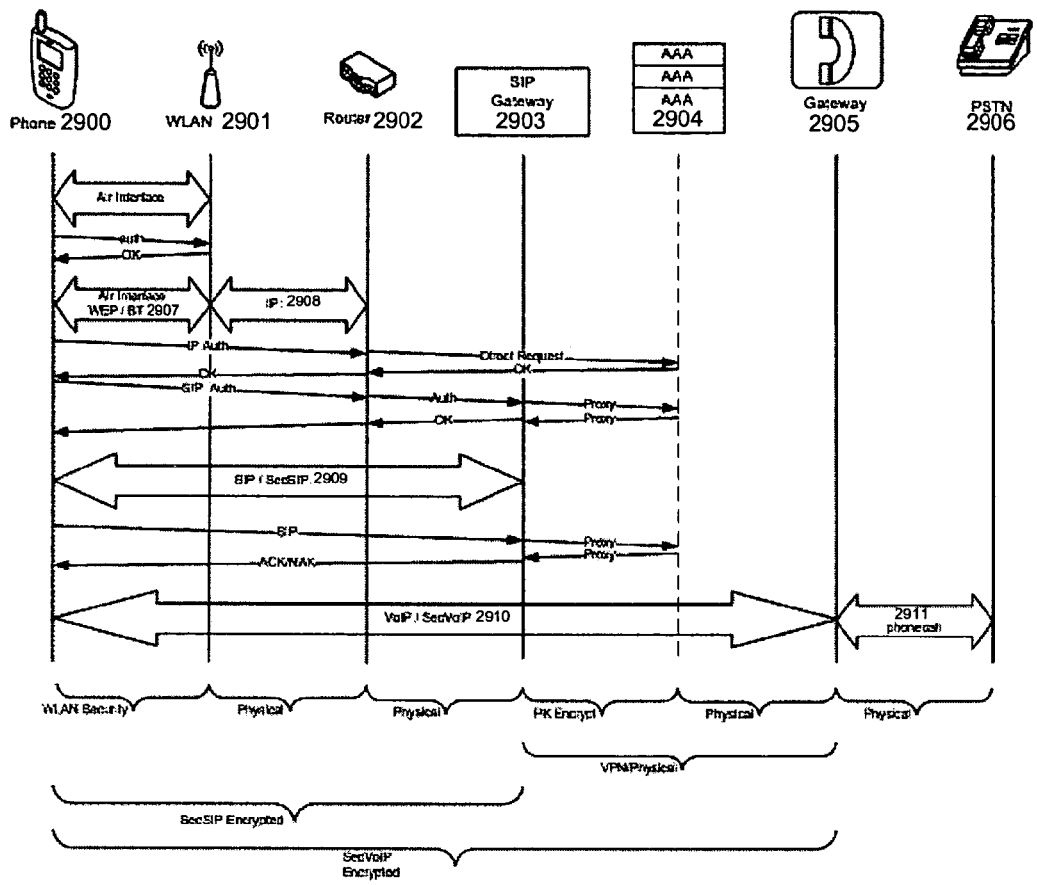
FIG. 29 is a flow diagram showing the security and authentication procedure for a wireless LAN connection to the system in accordance with one embodiment of the invention.

Referring back to FIG. 14, Case 2 depicts the scenario of handing off from a WWAN-Audio to WLAN. A call is proceeding over the WWAN-Audio circuit typically a GSM call. The first step in handling this handoff is to determine the availability of a WLAN AP. There are two possibilities here depending on the availability of a WWAN data path. If no WWAN data path is available at this time because the call takes precedence, then the phone may pick up the availability of WLAN through its regular timed mechanism where it searches for potential availability of a WLAN connection as illustrated in FIG. 29. If a data path is available, then location based messages can be received to indicate a WLAN resource is available.

In either case the phone will acquire a WLAN resource through the discovery procedure. Transferring the call to WLAN will depend on the nature of the two phones involved in the call and the nature of the carrier network that started the call.
  a) Call originator—the operator originating the phone call—has a programmable phone routing table. In this case a signal can be sent by the server to the originators call center using SS7 or SIP to request the call media be re-routed to our server or directly to the phone end point.
  b) Call terminator—the operator receiving the phone call for termination—has a programmable phone routing table. In this case a signal can be sent by the server to the call termination center using SS7 or SIP to request the call media be re-routed to our server or directly to the phone end point.
  c) The call was made to an intermediate one number service prior to routing to the call terminator. This allows the call to be unhooked at this intermediate point by sending a message to the intermediate point using SS7 or SIP.
  d) If both handset ends support our system then a message can be sent to the originating phone client to switch call methods to VoIP and obviate the need to signal to any call routing servers.

Case 3: WLAN to WWAN-Audio

Although handoff to WLAN-IP 1460 allows for the simplest architecture it is not always available. In particular WWAN-IP connections such as UMTS are only available in a limited number of countries and areas within those countries. Other WWAN-IP technologies such as EDGE do have coverage but data rate and latency are not useful for making a voice call on presently deployed systems. To solve this, the SIP server is used as a conference bridge to mediate handoff to a WWAN-Audio-only technology, such as GSM:

There are 3 methods of doing this:
  a) Handset initiated handoff with the server.
  b) Server initiates handoff with the handset
  c) Handset takes over and bypasses the server.
  a) Handset initiates handoff to WWAN-AUDIO: While making a VoIP WLAN call the signal conditions for data transmission become unacceptable. The SIP server is programmed to hold all calls for a predetermined time limit if streaming is interrupted and to allow all calls to be conference calls. (A SIP server consumes almost no resource to allow a call to be a conference call but there is a statistical calculation required of the media gateways to determine the number of PSTN/PBX connections that might be active at any time.) The phone application optionally reads the GSM RSSI to determine whether a handoff is possible, if not simply terminating the call. Once the phone determines that a handoff is possible it calls the conference call phone number, and the user is automatically connected to the other party in the call. (This is the same party with whom they are already in communication.) A smart phone is capable of calling a conference number and entering a DTMF password without user intervention and indeed totally silently so as to give the impression of an automatic relatively or totally seamless handover. In this case it should be noted that although there is a conference call function being used there are in fact only two parties: the caller and the receiver.

Note that it is not necessary for every user to have a unique conference number. A bank of numbers can be used and a specific number reserved only while the VoIP call is in progress. Once the call is over the number can be reused (with a different passcode) for other users—the number range only needs to be large enough to cope with the maximum number of active users plus a margin of safety. In addition the use of passcodes can be obviated if the caller line identification (CLI) from the handing off caller matches that stored in the user's record. This speeds the conference set up and improves user experience.

'Call-in handoff' (where the GSM call to the conference bridge is initiated by the handset) is particularly attractive from a commercial point of view as the calling leg is initiated by the calling party using their normal mobile phone account and will be billed to their regular phone bill. There is therefore no additional cost incurred by the conference bridge owner. (In fact they will generally receive a call termination fee.) There is still an attractive price benefit for the user as the conference call number will generally be a local number chosen from a small table of least cost routes and the outward leg from the conference bridge will still be using VoIP call. The conference bridge is implemented by the SIP server so that an appropriate billing record can be generated for either the call as a whole, or the non-GSM portion of the call—the remainder being handled by the customer's normal billing mechanism.

There are a number of methods for implementing hand-back if the data channel recovers.
  i) User initiated hand-back where a visual display of RSSI tells the user that signal is available on WLAN and the user simply presses a button to indicate hand back is desired. The conference bridge handoff is used executed in reverse.
  ii) Phone initiated hand back where the RSSI for WLAN indicates good signal has been recovered and the phone initiates connection.

On today's devices the GSM call must then in general be dropped prior to reconnection of the VoIP call as the GSM subsystem must release resources to the VoIP system. In future phones it is expected that WLAN, UMTS and GSM could have simultaneous use of the phone's resources: the described scheme caters for both.
  a) In Call-back handoff the conference bridge initiates the call to the mobile device when the VoIP call becomes untenable. This can be a benefit for phones with less scope for programmability and the user experience can be better with perceived lower handoff time but the financial implications are that the conference bridge makes an outward call which will incur a charge. If the SIP conference bridge is owned by the same organization as the customer's network provider then this is an internal charge and can be catered for by internal commercial arrangements
  b) Handset takes over and bypasses the server: In this form of handoff, which can be viewed as a peer-to-peer handoff, the caller detects a loss of data signal as before and automatically initiates a regular GSM call directly to the called party. That party's handset recognizes the CLI (Calling Line Identity) of the caller's handset, knows that the VoIP call is having trouble (due to RSSI or error rate measure), accepts the GSM call, and simultaneously drops the VoIP call, presenting a near-seamless handover as the call control is automated by the Smartphone client software so that it is substantially invisible to the user. The benefit of this method is that no additional network resources are required for creating conference bridges but the VoIP service provider loses control of the call when this happens and both users must have a Truphone client to implement this method. The phones can still log call information for preparation of CDRs (Call Detail Records) and post them back to the VoIP provider SIP server at next reconnection. This is only possible where the destination caller can support two calls at once—one using the VoIP session and the other direct through a cellular network or PSTN—to perform the "make-before-break". If this is not the case then the VoIP call must be dropped first and the PSTN call made immediately afterwards to perform a "break-before-make" handoff.

Case 4: This case is conceptually similar to case 2. A user on an audio call will switch to VoIP using the same mechanisms as explained in case 2 are available with of course the proviso that the call is re-routing to WWAN-IP not WLAN-IP.

Case 5: This case is conceptually similar in operation to case 3, in that a handoff is made between a VoIP call and a voice call with the same techniques being applicable. However in this case the phone needs to make a regular WWAN-Audio call, for example a GSM call in order to rejoin the conference bridge and maintain the call.

Case 6: is the inverse of case 1. A user making a call over WLAN-IP moves out of range and the handset switched to WWAN-IP. This is a straightforward switch as authentication remains valid and the call path in the higher level stack needs no change. In fact, in case 1 and case 6, the units can flip back and forth freely between the cases and the Network Address Processing element in the server (or the access point or repeater if implemented there) will ensure that the user appears to the rest of the world as if they are not moving between networks. Make before break, or make and break can be implemented to make the user experience optimal and indeed both paths may be used in poor signal conditions as a form of multi-bearer diversity signaling.

Handover Cases: WLAN->WLAN (Wi-Fi/Bluetooth)

TABLE 8

| Case | From | To | Link Num | Example use case |
|---|---|---|---|---|
| Case A | Bluetooth | Bluetooth | 1463, 1462 | Moving around your home |
| Case B | Wi-Fi | Bluetooth | 1463, 1462 | Approaching a Bluetooth capable AP and selecting it for lower power operation |
| Case C | Bluetooth | Wi-Fi | 1463, 1462 | Leaving the Bluetooth zone |
| Case D | Wi-Fi | Wi-Fi | 1463, 1462 | Moving around an office |

The above handover cases are all capabilities of the invented system and allow the user to walk through a large space where a single access point can not provide complete coverage. Since the protocol stack is 'all IP' and communicates over a general socket layer, a handover between Bluetooth and Wi-Fi is possible. Once again, the SIP proxy can cope with two IP addresses or endpoints connecting to the same caller and handoff is a matter of beginning, sending packets on one bearer, and ceasing on the other. Packets can be sent over both bearers to give diversity reception implemented at the IP level and in devices that can connect to more than one AP, either Bluetooth or Wi-Fi then multiple packet streams can be sent to multiple AP's if desired. Another benefit of being able to switch from Bluetooth to Wi-Fi is to use the extremely low power capabilities of Bluetooth to preserve battery life.

With both Wi-Fi and Bluetooth in normal operation, standard discovery, pairing and authentication need to be executed as mobile devices move from AP to AP. Bluetooth reconnect takes 1.2-3 seconds if the devices have been pre-paired and up to 30 seconds if not.

Figure 15:
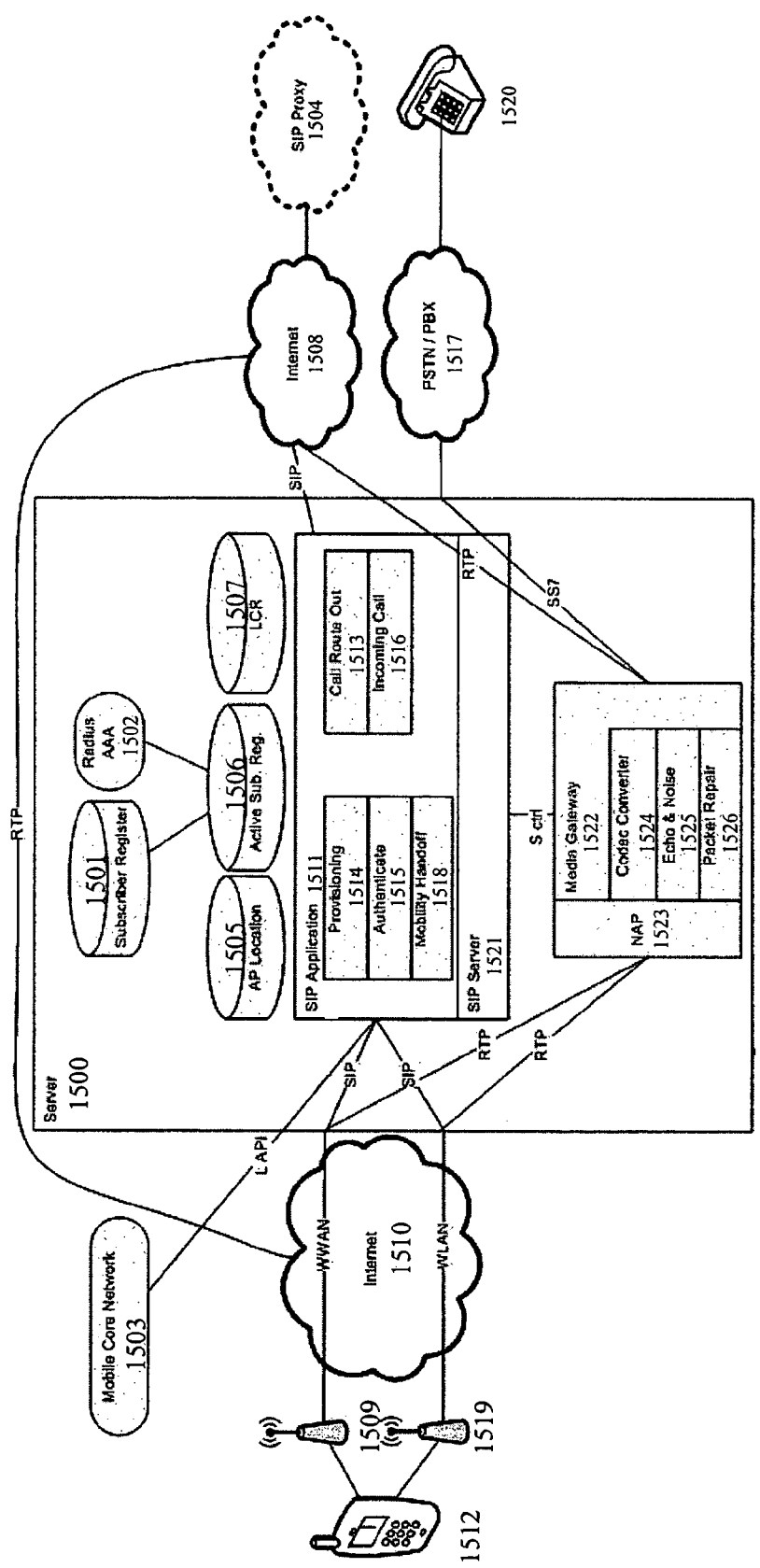
FIG. 15 depicts a system wherein one or more servers within the system provide a range of telecommunications functions including call handling and termination.

FIG. 15 shows one or more servers within the system providing a range of telecommunications functions including call handling and termination. A call originates on the mobile phone 1512 and connects to the server 1500 via wireless connections WLAN 1509 and WWAN 1519 and an Internet connection 1510. The system comprises three main parts: a Media Gateway 1522 that handles the real time elements of media streams, a server 1521 that handles signaling commands, and an application 1511 that contains the logic and communicates with databases 1505, 1506, 1507 and other external sources of information. The signaling and streams are handled by the server as follows.

Authentication (Roaming):

The phone 1512 initiates a search for WLAN resources 1519 and locates them. Some resources 'cloak' and so the phone may probe using a system ID such as an SSID from its access rights table, other resources broadcast their availability publicly, for example by broadcasting their SSID in a Wi-Fi system. Once located the phone checks its local table of access rights and uses the appropriate logon authentication for this AP. The table is maintained in least cost order by updating from time to time from the LCR (least Cost Routing) data store 1507. For Bluetooth, access generally involves pairing with the device using a PIN although the AP's can be set in open mode: The link encryption key is automatically generated. For Wi-Fi either or both the SSID and WEP (Wired Equivalent Privacy) keys form keys for access to the system and these are provided automatically by the system—Advanced Encryption Standard (AES) and Temporal Key Integrity Protocol (TKIP) may be used in place of WEP.

At this point the user has achieved local connection to radio resources and a local IP domain. For connection to the Internet a user name and password must be sent to an appropriate domain controller with an optional affiliation. This is then authenticated directly or via Radius proxy authentication for which an affiliation is usually required. This process is generally automated by roaming software located in the LAN that will attempt an authentication against a broad range of possible service providers but may also be provided by the cooperative tunneling agent described in above.

TABLE 10

| Access Right Table | | |
|---|---|---|
| Generic | Bluetooth | Wi-Fi |
| Hardware ID | Bluetooth Address | MAC Address |
| System ID | Name | SSID |
| Name | Name | SSID |
| Access key | PIN or open | SSID or WEP key or open |
| Security Key | Self setting | WEP key or self setting |
| Affiliation | Affiliation | Affiliation |
| User Name | User Name | User Name |
| Password | Password | Password |

This table of access rights is updated from time to time with information that is relevant to the approximate location of the user and their behavior pattern so that only a subset of access rights needs to be stored at any one time in the mobile device. If the access rights table does not include the WLAN access point in its table then the phone sends a request via WWAN for an updated access rights entry for that resource giving as much information as possible to narrow the request and minimize the data sent. If no access information is available then a service ticket is generated according to the distributed discovery description below.

Distributed discovery is enacted when a radio resource has been located but no authentication was achieved. A service ticket is automatically sent to the Access Point Location register 1505 with as much detail as possible, ideally using WWAN network location services or global positioning system (GPS) location information to exactly pinpoint the AP. The central server can then take a variety of actions to contact the radio resource and recruit them to the system. An automated method is available by creating and publishing a naming specification that the AP resources may use that allows owners of AP's to give the AP a unique address that can be resolved to the email address of the owner. The distributed discovery method is an automatic system for users to cooperate to grow the network and is akin to other distributed computing methods. For cooperative access points that want to ensure security using link keys those keys are provided over the WWAN encrypted connection to authenticated users.

For some systems access to the Internet is much simpler than the above general process as the AP and IP systems are configured for public access directly to the Internet. Further Truphone Zones systems are configured to allow free access to the IP address of a Truphone server on the understanding that revenue is derived by the AP owner from a share of calls rather for timed access to the network resource. The Truphone server logs the IP of the access point from which the call packets originated and the client may give the IP address and system ID of the system that allowed it access for added security.

At this point the user has been authenticated to the radio resource, encrypted that link if desired and achieved access to network resources, either the Internet or a restricted subset of address ranges or a local address range for corporate users residing within their offices. The user desires to make a call and the mobile device signals to the application server. The application server checks its active subscriber register to determine if the user is in good standing (no blocks on accounts, credit available or credit worthiness still active), again Radius proxy authentication may be enacted for users that are not 'home' on this server and whose primary records are held elsewhere. The least cost route database will then use available information from the Access Point Register, Location information provided by the phone and IP address range information to form a least cost path. The priority for routing is:

a. signaling the phones to route VoIP media data locally at the radio layer,
b. to route within their LAN,
c. via the optimum path in the Intranet,
d. via the optimum path on the Internet,
e. via the optimum path over PSTN having routed through an appropriately located media gateway. Either the local gateway 623 or one located on another SIP server in closer proximity to the PSTN end point.

The Media Gateway 1523 is involved in a number of scenarios:

i) When the call must be terminated to the PSTN 1517 and therefore converted to the right media, typically G.711 and signaling format such as SS7 and POTS.
ii) When the call must be forwarded to another server for example using the SIP server proxy functions 1504, and that further SIP server does not support the CODEC used by the phone.
iii) When mobility management requires network address translation to 'fix-up' the addresses of all incoming packets so that they appear not to change IP addresses as the user moves between different networks.

This fix-up of addresses deserves further description which is done later in FIG. 14. Mobility Management (Handoff, handover) is handled in the Application Server 1511 which controls the Network Address Translation and mapping functions 1523 and possibly other functions such as codec conversion, echo and noise cancellation and packet repair as needed.

The CODEC conversion module 1524, allows real time conversion of packet streams from one CODEC such as AMR-WB to another such as G. 711.

TABLE 11

| CODEC | Rate | Notes | Trade names |
|---|---|---|---|
| G. 711 | 64 kbit/s | Fixed Line A-law/mu-Law | |
| G. 723.1 | 6.3 kbit/s 5.3 kbit/s | VoIP | 'True Speech' |
| G. 729 | 8 kbit/s or 6.4 kbit/s & 11.8 kbit/s | VoIP | |
| AMR | 4.75 kbit/s to 12.2 kbit/s | Cellular calls | |
| AMR-WB | 6.6 kbit/s to 23.8 kbit/s | Cellular talk radio | |
| AMR-WB+ | Stereo and 23.kbit/s+ | Cellular music | |
| GSM | 13 kbit/s | Older GSM | |
| GSM ½ rate | 5.6 kbit/s | Newer GSM | |

The Packet Repair module 1526 provides for jitter buffering, duplicate packet removal, missing packet re-request or masking, and packet re-ordering. Duplicate packet removal is particularly important when make before break seamless handoff is used where the packets must be de-duplicated in conjunction with the NAP function as duplicate packets may not have the same IP address and port.

AMR (Adaptive Multi-Rate) CODECs are especially used in such systems as they have very good packet loss masking characteristics and good quality over lossy radio systems. In addition in lossy radio systems that suffer burst noise such as WLAN but where bandwidth is otherwise high such as our system, packets can be interleaved and transmitted multiple times to extend range while minimizing interference. In a Wi-Fi based system turning off the auto re-try mechanism for VoIP packets and relying on AMR interleaved over transmission can improve Quality of Service (QoS). For Bluetooth based systems, moving from CTP to AMR over ACL can extend practical ranges by a factor of 3 or greater in noisy scenarios.

Echo and noise cancellation module 1525 is often implemented in the end points but in circumstances where the handsets do not have this function or have a limited function it may be an advantage to implement a short and particularly long echo cancel function in the Media Gateway.

TABLE 12

| CODEC | Type | Time | Notes |
|---|---|---|---|
| G. 167 | Acoustic echo | 50 ms | To stop handset microphone feedback |
| G. 168 | Long Echo Cancel | 3 seconds depending on process power | To stop echo in the network due to impedance mismatch or a lack of far end acoustic echo cancellation |

CODECs may be renegotiated during a call if bandwidth conditions change but a benefit of this invention is that a low data rate CODEC is chosen initially and so CODEC renegotiation is minimized.

The SIP server can implement a range of added value voice and data services once the basic link has been established. By using the access table method described in FIG. 6 and background pre-pairing we ensure that the most handovers are pre-paired unless there is a system failure in which case an automated trouble ticket will be created. Buffers and rate converters can ensure no voice is lost in these circumstances by temporarily buffering a large amount of data. Any 'catching up' required can be implemented using a speech rate converter. (A speech rate converter allows 5 seconds of speech to be played in 4 seconds of time without changing the pitch of the voice. It does this in simple form by throwing away a percentage of the waveforms while maintaining continuity at the zero crossing. Improved versions are described in the literature and are common components of media gateways.) An improvement to make the handoff apparently more seamless when there is a substantial break in this 1.2-3 second range is made by sending an 'about to handoff' command and then a 'handoff' command. The about to handoff command indicates to the server that it should temporarily increase its voice buffer and increased voice delay (which requires a non audible rate conversion to slow the output of speech packets) once the handoff occurs the delay must be clawed back by the 'catch up' mechanism.

Using the access table and a context translation mechanism allows Wi-Fi to handoff quickly even when there are different makes of Wi-Fi controller involved in the system.

International Roaming

The handoff/handover cases apply in a broadly similar manner to the situation where a person has traveled internationally but there are some subtleties in the current UMTS system there are some caused by this.

WLAN connections when roaming internationally work in the same way as in your home country. Essentially the roaming principles that would be applied if a person traveled from New York to Boston are the same as if that person travel from New York to London. The IP network is homogenous internationally. That person will have a source IP address in a number range that is associated with the place you have traveled to. (IP address location can be ignored but may be used as a cross check for fraud.)

WWAN data in current schemes is carried by the roamed to network internally but transited back to your home network for termination. The person's IP packets will exit from a GGSN in the person's home country and will have an IP address in a number range that is associate with that person's home network.

WWAN audio will be carried and terminated in the network that is roamed to. Therefore it will not travel through home networks audio gateway. Any SS7 signaling to control handoff between WWAN-AUDIO when traveling internationally will need to be sent to and accepted by the network that has been roamed to. Any least cost routing tables and methods must take into account the International charging issues.

Further improvements can be achieved by providing fast handover methods that allow context to be transmitted from one WLAN AP to the next. These context switching methods include LAPP within Wi-Fi or the equivalent within Bluetooth. Further improvements on these can be done by allowing this context switching to be transmitted over the air either on the same protocol or via an alternated protocol. One example would be the sending of Bluetooth context data over the Wi-Fi or UMTS network to assist in handover.

Figure 14:
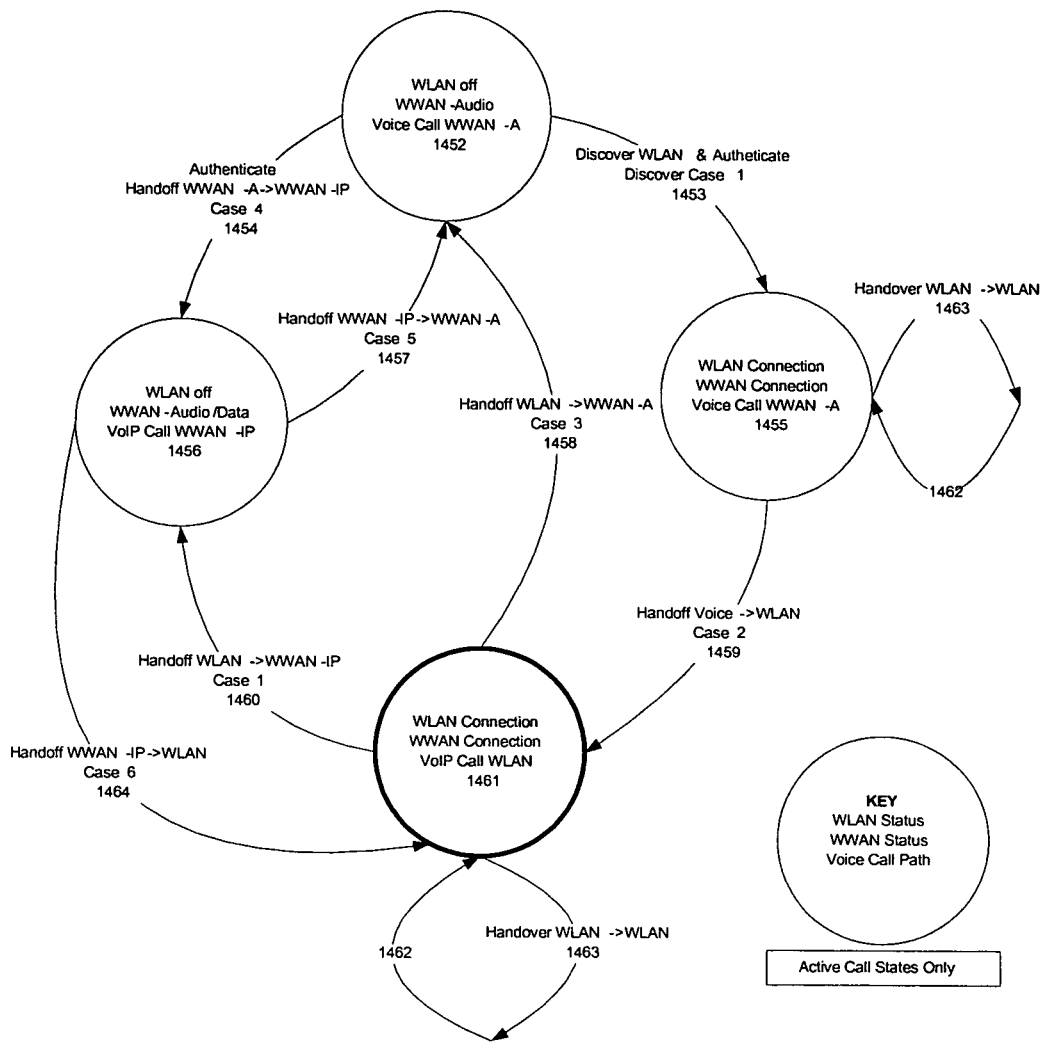
FIG. 14 is a state diagram that illustrates the types of handoff cases that are handled by one embodiment of the invention.

The state table in FIG. 14 represents the in call handover and handoff states. A more complete list of the states is shown below:

TABLE 9

State Table

Phone off
Phone on
Discovered WWAN
Authenticated to WWAN
Connected WWAN-Audio
Connected WWAN-DATA
Discovering WLAN
Connected to WLAN
Authenticated WLAN-IP
Authenticated WLAN-VoIP
In call incoming WWAN-Audio
In call incoming WWAN-VoIP
In call incoming WLAN-VoIP
In call outgoing WWAN-Audio
In call outgoing WWAN-VoIP
In call outgoing WLAN-VoIP
Handing off
Handing over SS7 Signaling In several cases above a message needs to be sent to the SS7 system of the originating or terminating telco server to indicate that it should reroute the call to the invented proxy SIP server to implement roaming. These commands can use standard follow-me methods that are more fully described in the literature and will not be described here. If the $3^{rd}$ party telco server has a SIP interface then this may be used in preference.

Figure 16:
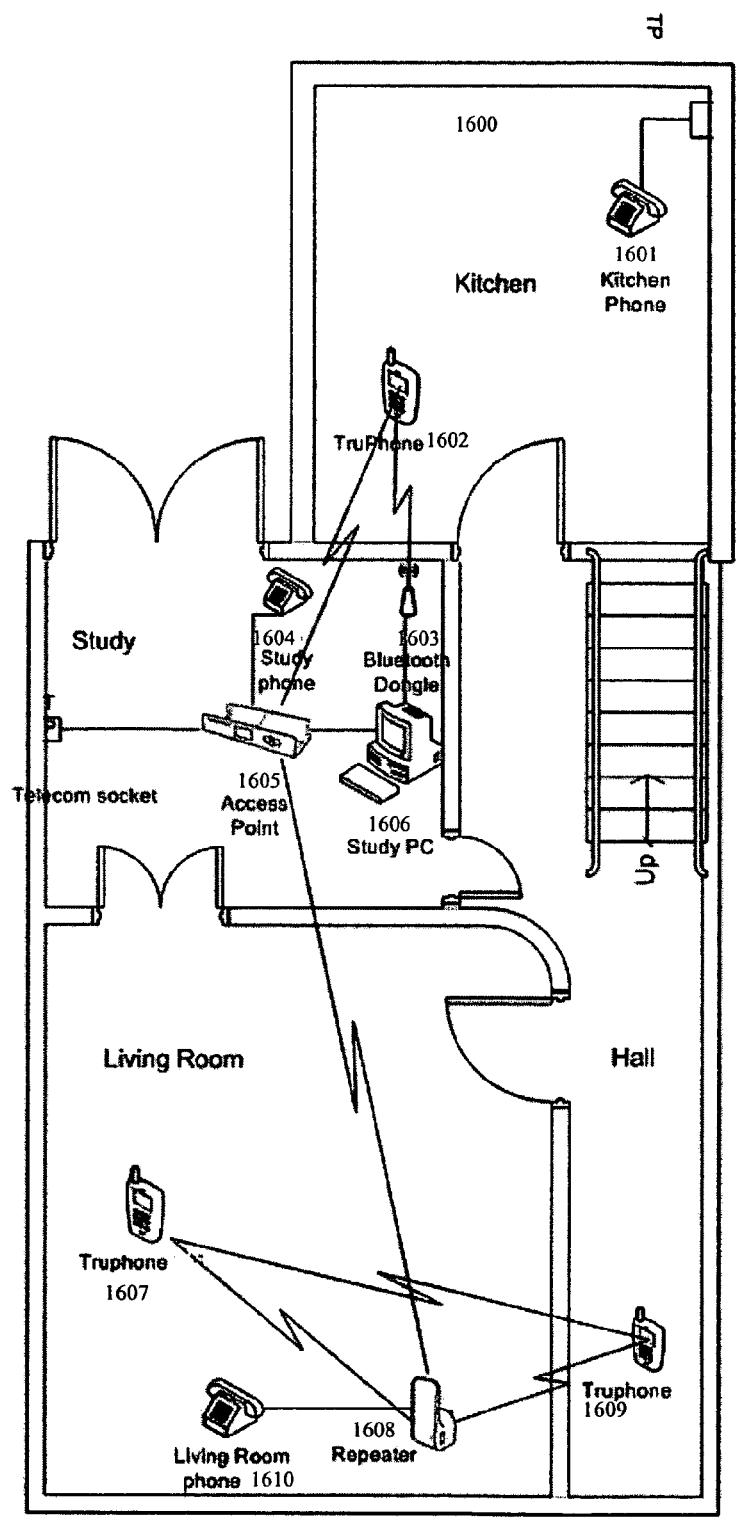
FIG. 16 depicts a home system illustrating the different uses of one embodiment of the present invention.

FIG. 16 shows different scenarios for usage of the invented system in the home. In the simplest scenario (e.g. for a small flat/apartment) the Truphone enabled phone 1602 connects directly to a Bluetooth dongle 1603, which is connected to the study PC 1606, which in turn is connected by Ethernet or USB to an ADSL modem (not shown). In this scenario the PC must be turned on for the Truphone to work, range is not optimal, but the cost is minimized. Phones 1607 and 1609 may be out of range of the dongle, and would be limited to making a conventional GSM call, or a UMTS VoIP call.

For a larger dwelling a more extensive setup is illustrated. In this case the study PC 1606 is connected to an access point 1605. This may either be a conventional Wi-Fi enabled ADSL or cable modem, or a specifically Truphone compatible device with additional Bluetooth and mesh networking capabilities. In the descriptions below, the latter is assumed. The PC does not have to be switched on in these scenarios.

In this example:
the kitchen phone 1601 is a conventional landline phone and is unaffected by the Truphone equipment in the home.
Truphone 1602 is currently in the kitchen which is sufficiently close to the study that it can connect directly through Bluetooth to the access point 1605.
Truphones 1609 and 1607 connect via Bluetooth to the repeater 1608, which connects via WiFi to the access point 1605, which connects to an ISP and the Truphone server.
Additional repeaters could be located elsewhere in the house and would link together using mesh networking techniques to extend the coverage area.
Phone 1607 and 1609 are sufficiently close together that they could communicate directly with each other. This capability is more relevant when used between, say, a living room and a child's bedroom in an intercom or baby monitor mode
There is no telephone socket in the Living Room, but the conventional analogue telephone 1610 connects into the repeater, and can be used to make and receive VoIP calls.

This is useful because, unlike a mobile handset, it can neither be lost nor run out of batteries.

The study phone 1604 is plugged into the access point 1605, which in turn is plugged into the telephone socket 1611. This phone can be used to make VoIP calls, but if the access point or network connection fail or are switched off, the lines are automatically connected so that calls are made directly through the telecom socket in the conventional way as a fail-safe measure The table below summarizes some of the potential routings for calls out of the home:

TABLE 13

Truphone ↔ Truphone
Truphone ↔ Bluetooth dongle ↔ PC ↔ ADSL/cable modem ↔ Truphone server
Truphone ↔ Access point ↔ Truphone server
Truphone ↔ Repeater ↔ Access point ↔ Truphone server
Truphone↔ Repeater 1 ↔ Repeater 2 ↔ Access point ↔ Truphone server
Landline phone ↔ Access point ↔ Truphone server
Landline phone ↔ Repeater ↔ Access point ↔ Truphone server
Landline phone ↔ BT socket ↔ SIP Server Note that the Study PC 1606 would normally be connected to either a Bluetooth dongle 1603 or to an access point 1605, although for completeness both are shown in this diagram. The device can be the first hop on a multi-hop or subsequently star network topology and can provide mobile IP fix up at the radio level or the IP level or implement mobile IP as per any one of the IETF RFCs.

Figure 21:
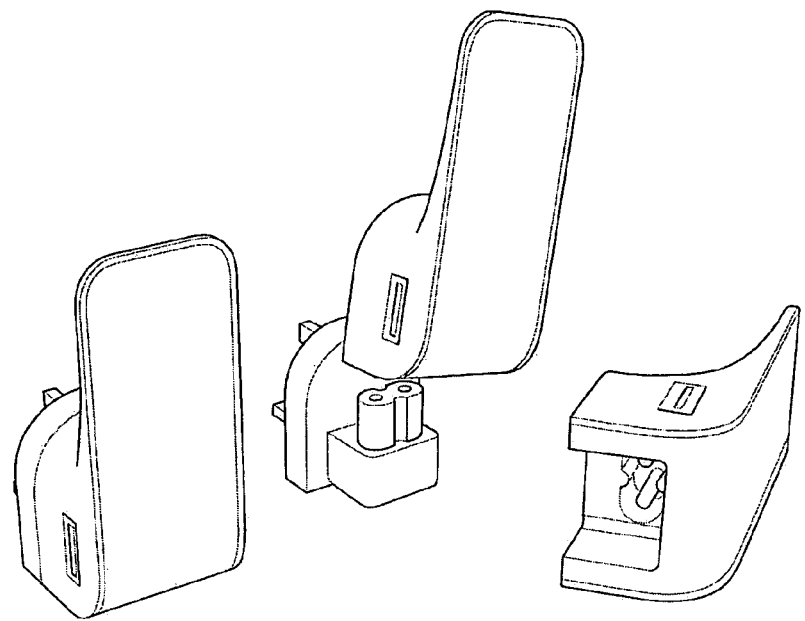
FIG. 21 depicts the repeater utilized in one embodiment of the present invention.
Figure 21:
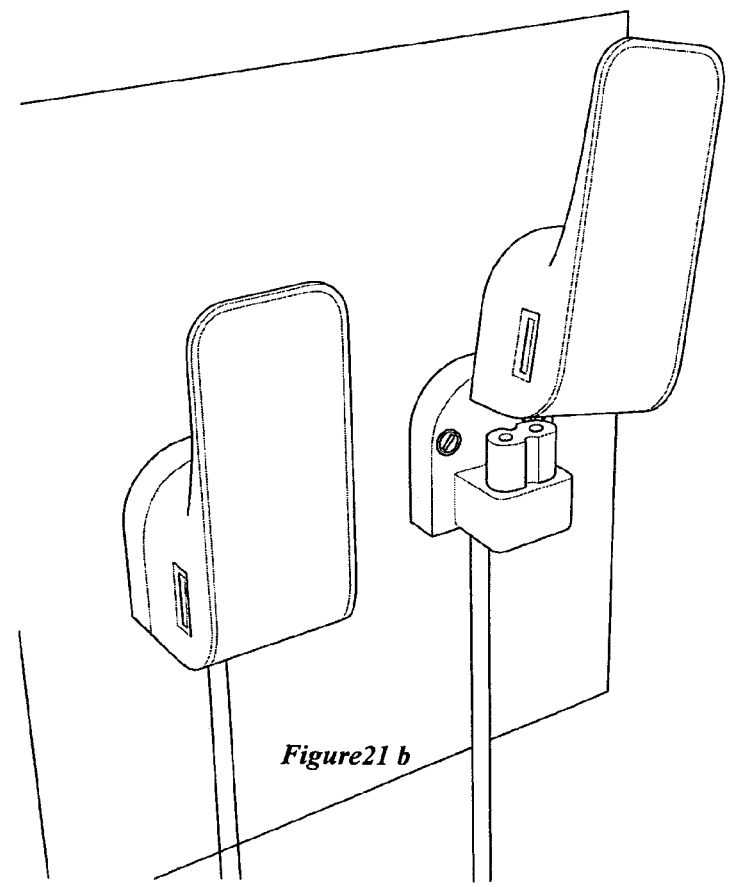

FIGS. 17 and 18 illustrate a repeater in isometric and orthogonal projections. FIG. 21 illustrates the repeater in exploded view showing the attachment of a cable, interchangeable plugs and a wall mounting bracket. In one embodiment, the repeater is approximately the size of a UK mains adapter in width (2 inches, 50 mm) and the length of a PCMCIA card (4 inches, 100 mm) with a depth in the predominately flat section approximating that of PCMCIA card (¼ inch, 5 mm) and then increasing to accommodate the connectors and main plug unit. The optional extender cable length is approximately the head height of a human being (5 feet, 1.5 meters) and the wall bracket is sized to sit discreetly behind the unit when wall mounted.

The device comprises a mains plug plus a rectangular form that houses the PCB(s) with Antenna mounting and one or more connectors. The form factor of the device solves several problems:
  i) Permitting easy and discreet fitting in the home.
  ii) Allowing the easy substitution of a range of mains adapters and extender cables.
  iii) Locating the antennas a suitable distance from the mains input and achieving a good ground plane.
  iv) Presenting an aesthetically pleasing design.
  v) Provides diversity enabled Wi-Fi and potentially diversity enabled Bluetooth with hi-sensitivity that gives considerable repeat range.
  vi) By using Network Address Processing can handle mobile IP scenarios so that a user may move between different repeaters without switching IP address.
  vii) Translates between Bluetooth and Wi-Fi to allow a Bluetooth enabled device to connect to the repeater which connects back to the WLAN router using Wi-Fi.
  viii) Provides optional connectors including
    a. A POTS (Plain old telephone system) port—typically RJ45 or BT socket—to allow wired devices to connect into the wireless VoIP system thus simplifying wiring.
    b. A USB connector allowing the device to connect to and control or communicate with range of other devices.
    c. A 10-Base-T connector to provide wireless capability to ADSL base stations.

Figure 19:
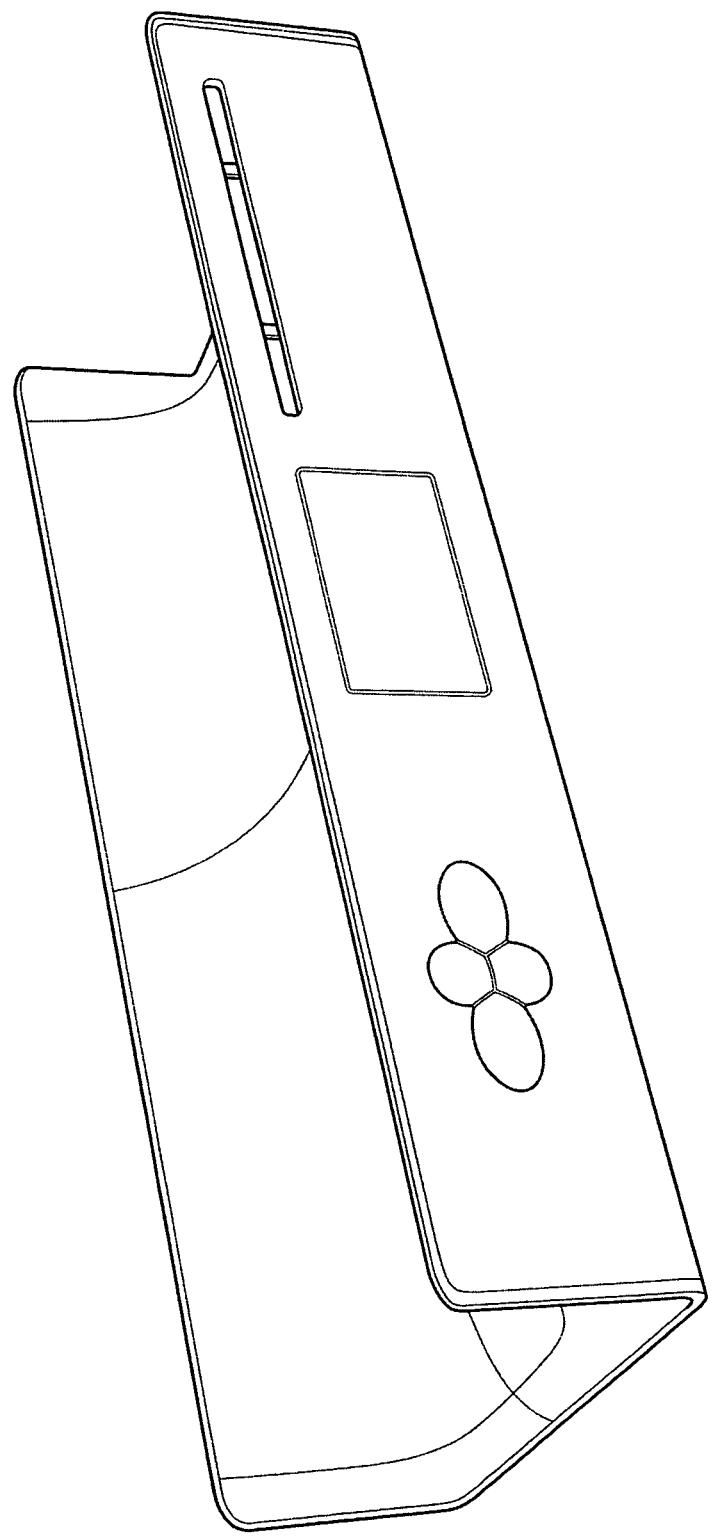
FIGS. 19 and 20 depict the set top box utilized in one embodiment of the present invention.
Figure 20:
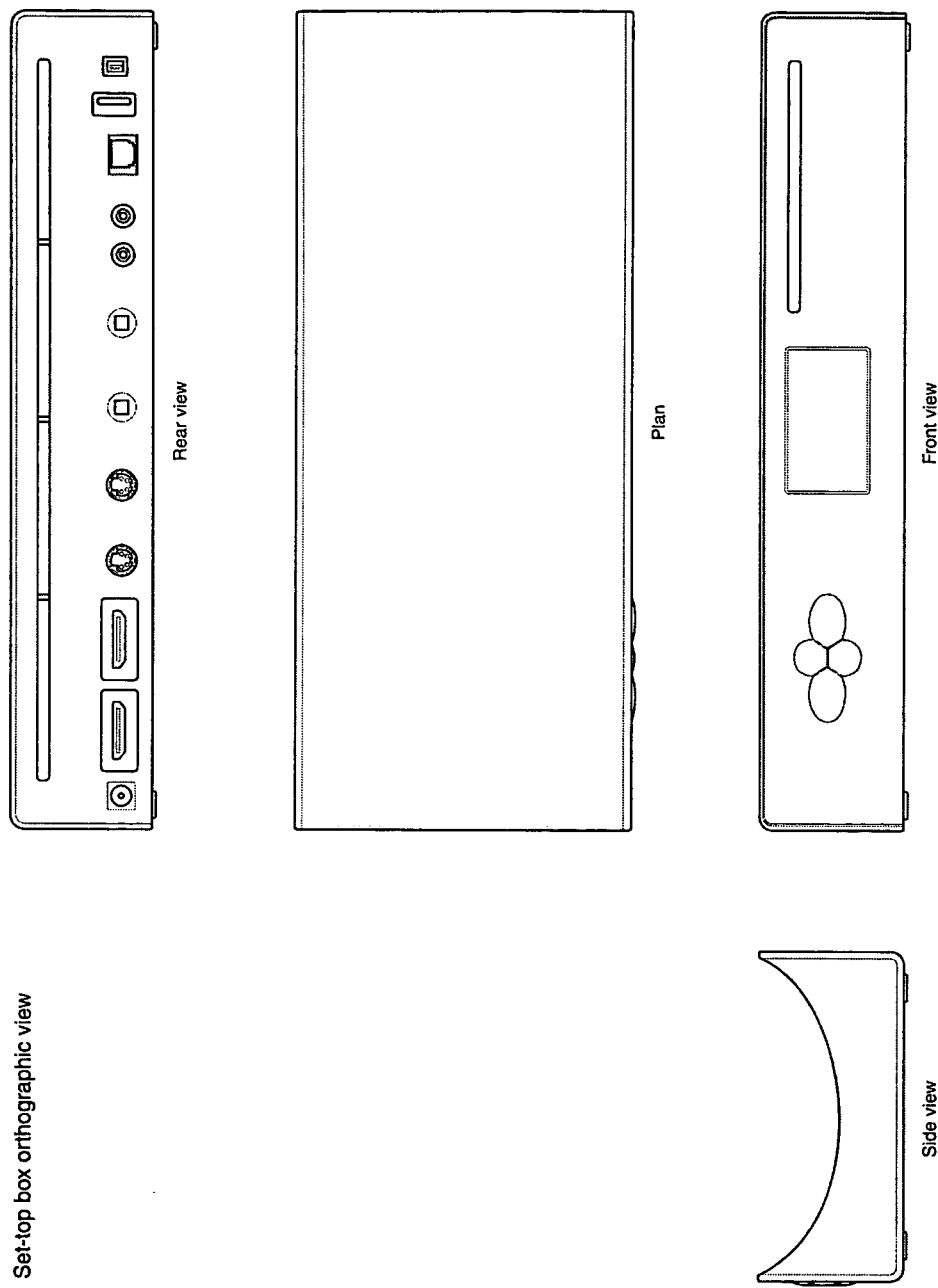
Figure 22:
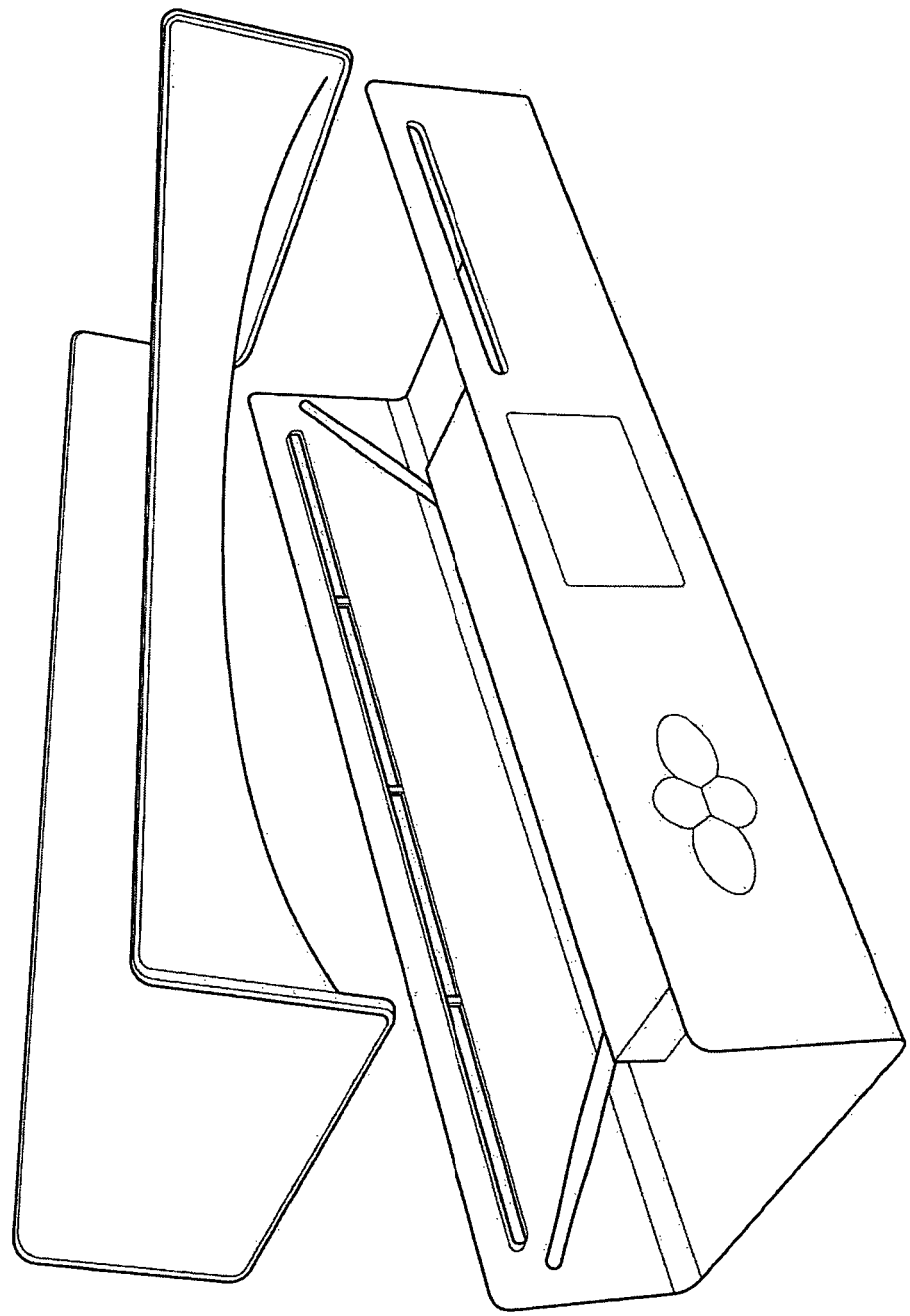
FIG. 22 depicts the set top box utilized in one embodiment of the present invention.

FIGS. 19 and 20 illustrate a set top box in isometric projection. FIG. 22 illustrates the set top box in exploded view showing the internal arrangement of components and the attachment of antennae. In one embodiment, the set top box fits within a rectangle that is approximately the same size as a regular full size hi-fi unit. (12 inch wide, 8 inches deep and 4 inches high, 300 mm×200 mm×100 mm). The device form factor design to solve several problems.
  i) Stopping people putting items on top of it that would detune the antennas.
  ii) Allowing either low cost 'rubber duck' antennas to be used or advanced chip antennas or connection of directional antennas.
  iii) while presenting an attractive outward appearance that would be appropriate in the home.
  iv) The casing may be mounted either horizontally or vertically.
  v) Provides a range of connectors including HDMI, digital audio to allow the system to connect to an audio visual system and provide video on demand and other similar services wirelessly.

Figure 23:
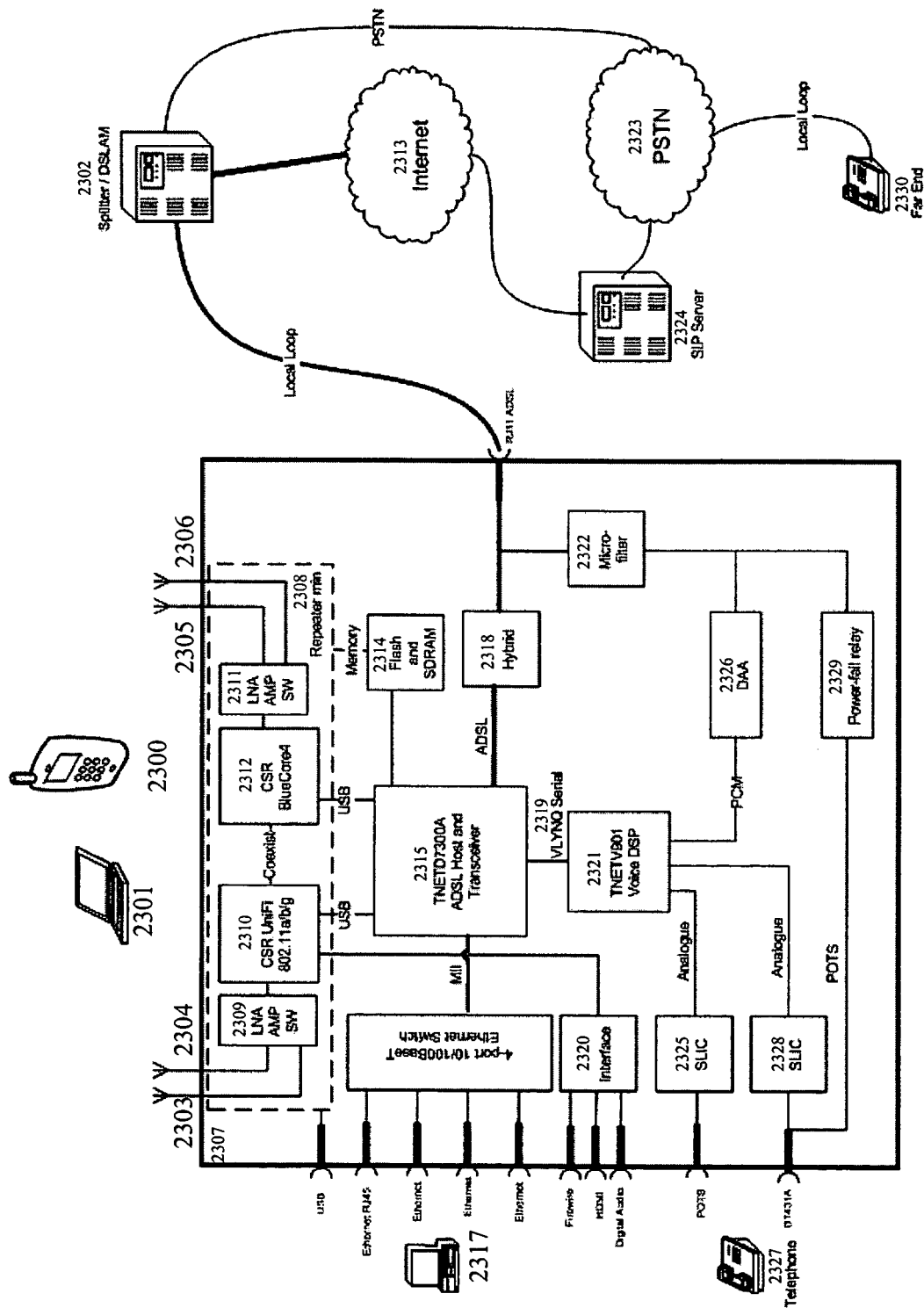
FIG. 23 is an electronic block diagram of a series of components that would form a system that allows voice, video and data wiring for the home, an office or a hotspot in accordance with one embodiment of the invention.

FIG. 23 is an electronic block diagram of a series of components that would form a system that allows voice, video and data wiring for the home, an office or a hotspot. Subsets of this block diagram can be implemented to provide a low cost repeater function, a low cost home wiring function, a set top box or a wireless Internet access point with ADSL connection.

Repeater Version

The minimal repeater contains a Bluetooth radio transceiver system 2310 and Wi-Fi radio transceiver system 2312 with co-existence interface between them to reduce interference and de-sensitization issues to a minimum. The systems have a direct interface to Flash 2314 or similar memory that contains their program and settings and may also route out their internal USB ports to an external connector.

More complex repeaters are possible which incorporate a Host Transceiver 2315 element that includes a Microprocessor, Flash ROM and RAM 2314 for program storage and execution and provides Ethernet 100-Base-T capability 2316. (The device pictured has 100-Base-T and ADSL but the ADSL may not be used in lower cost implementations of the repeater or a simpler chip may be substituted).

Further components may be added in each case giving additional interface capabilities. Optional SLIC (Subscriber Line Interface Circuit) 2338 with POTS connector for POTS interface telephone device can be added in conjunction with a Voice processing DSP so that DECT (Digital Enhanced Cordless Technology) handsets or traditional wired telephones can be included within the system.

The repeaters most complex version envisages is a version supporting 802.11, Bluetooth, USB, 100-Base-T, POTS. Providing translation and bridging between these interfaces. This product would enable a home, office or hotspot to be enabled for wireless VoIP in the vast majority of scenarios. The repeater could either be used as the primary access point device—as a wired to wireless repeater—with wired connection to incoming data connection, or as range extending repeater that forms a backbone network over Wi-Fi back to the primary connection point and connects to local devices such as handsets, PDAs and laptop computers that use either Bluetooth, Wi-Fi or both.

Multi-country PSU module with optional cable extension, driver disks and packaging are not pictured but would be included within a compete package. The wall mounting bracket providing optimal wall mounting or it may itself be bolted to a universal joint mounted on the wall to provide an ability to move the antenna direction.

Access Point

APs contain all the blocks and components from the repeater above plus the addition of ADSL Host Transceiver 2315 with ADSL line interface hybrid 2321, ADSL microfilter 2329, diversity antenna configurations, external antenna connectors, DAA (Data Access Arrangement) 2336, emergency service power fail fallback routing for POTS 2341, SIP proxy, firewall, AntiVirus and standard home SOHO features. Used in the primary data connection position in the home or SOHO network, it provides for wireless connections to devices (handsets, PDAs laptop PCs) or to repeaters as described above. A VoIP client and server could be introduced that would allow for direct termination to the PSTN or inclusion of the POTS telephones into the system.

Set-Top Box or Media Centre.

Set-Top Box or Media Centre includes all features of the Access point plus digital audio and video send and receive for home media networking with appropriate connectors for linking to common AV components. IRDA transceiver for remote control extension. Commonly available components could be added, such as hard disk drives and CD and DVD drives to offer complete home multi-media centre features.

A Phone may be Built using the WiFi/Bluetooth Coexistent System Described.

This has Bluetooth and Wi-Fi cordless phone capability and remote control function capable of interfacing with and programming other elements within the system. A CODEC chip, speaker and microphone must be added to the bill of material. The benefit of having a cordless phone incorporated into the system that includes coexistence is to further maximize system capacity while keeping to absolute minimum power consumption.

Figure 24:
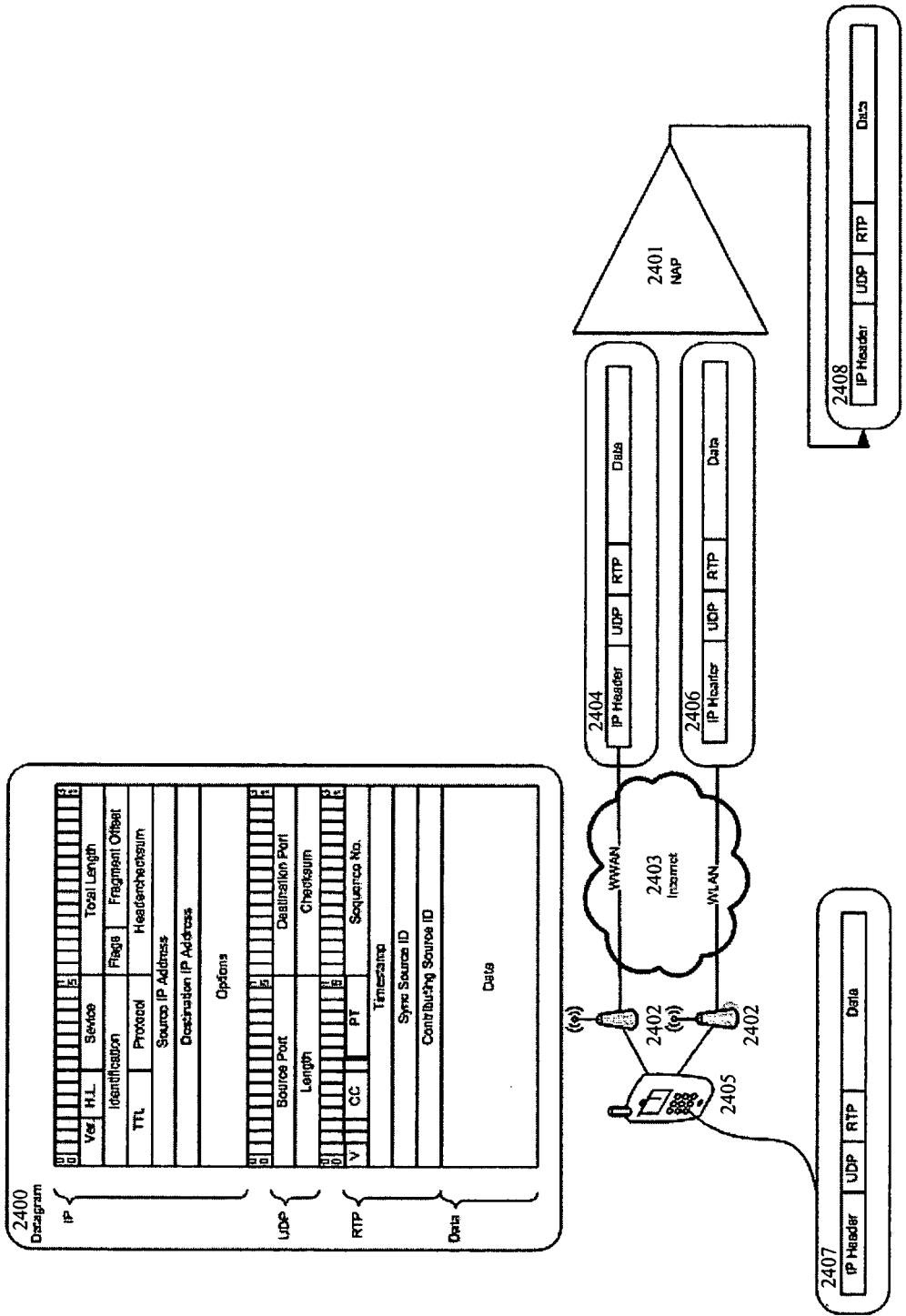
FIG. 24 illustrates the Network Address Processing required to process IP v4 RTP datagrams for the mobile roaming, handoff and handover in accordance with one embodiment of the invention.

FIG. 24 illustrates the Network Address Processing required to process IP v4 RTP datagrams for the mobile roaming, handoff and handover. For this discussion, we will talk about RTP packets but a similar process is needed for the SIP and other packets. The RTP datagram 2400 is constructed in the normal way with IP, UDP, RTP and Data headers, hereafter referred to as an RTP packet. As can be seen each RTP packet contains source and destination information for both IP address and port-together known as a socket. The phone sends RTP packets to one or more sockets during handoff, handover and other events and these packets may travel over WWAN 2402 or WLAN 2404 infrastructure prior to reaching the Internet and our server. RTP packets 2404 and 2406 may arrive from two different sockets and these need to be processes and de-duplicated into one stream prior to traveling on to the media gateway 2408. An important factor is that both the WLAN and WWAN paths will need authentication to allow streams to enter the SIP server and in addition the user name password SIP address should be authenticated against the SIM address in the phone.

Figure 25:
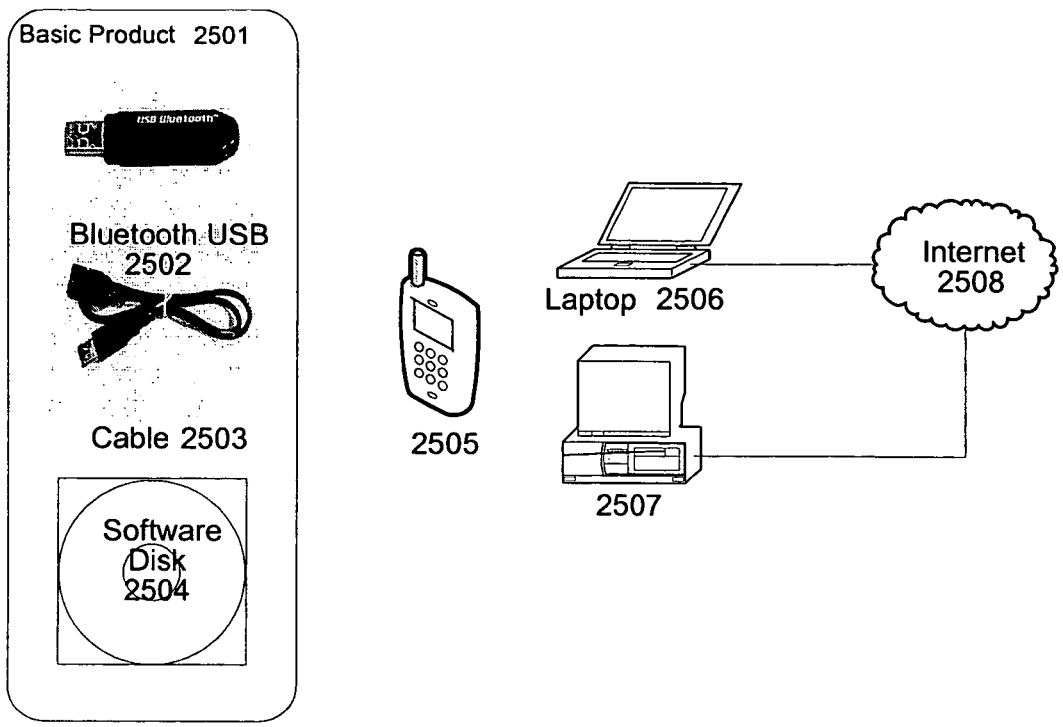
FIG. 25 shows a configuration of a basic product in accordance with one embodiment of the invention.

FIG. 25 shows configuration of a basic product. A user can enable their home PC(s) 2506, 2507 as 'micro-cells' capable of connecting to their mobile phone 2505 to the telephone system (PSTN or SIP network or Proprietary Networks) by way of the Internet 2508. The kit comes in a blister pack and contains:

TABLE 14

Basic Product Part List 1601

Blister Pack, transparent plastic (not shown)
0.5 m-1.0 m Cable 1602
Bluetooth Class I high sensitivity USB Dongle with BT1.2 or above. 1601
Card inner printed in 2 color with appropriate graphics (not shown)
Software Disk, CD ROM 1604
CD ROM graphics 2 color 1604
Manual 8 page full color not shown
CD ROM contents PC installer
Bluetooth Redirector
Wi-Fi Bridge-Redirector
Manual in PDF
Bluetooth Driver & Bluetooth software
Proprietary Interconnect plug-ins
Symbian OS 8.0a and above compatible Truphone VoIP software.

Figure 26:
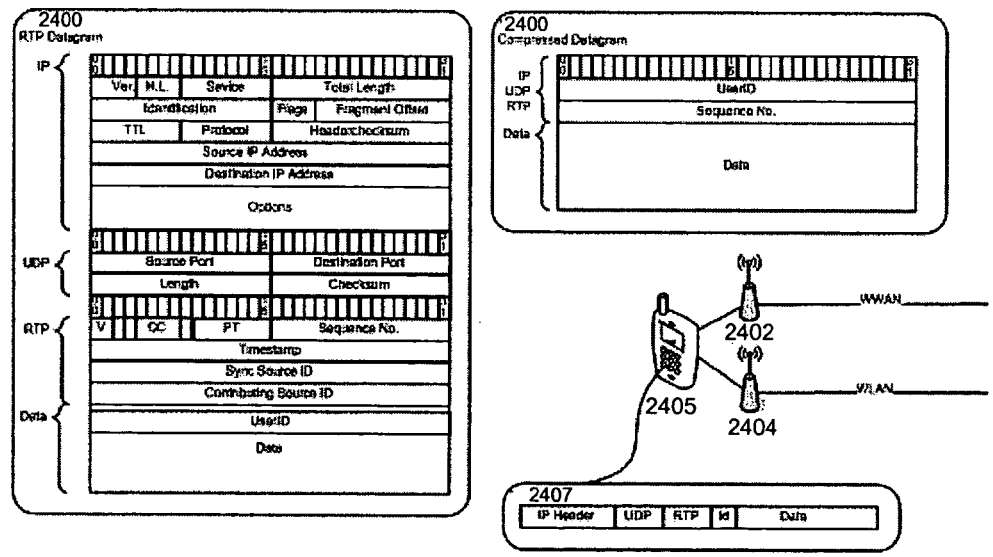
FIG. 26 Illustrates the UDP header compression and resolution of two compressed streams into a single outgoing stream.

FIG. 26 shows microSIP to SIP translation. In the case where the handset does not implement SIP, or implements a subset of SIP (eg. MicroSIP) the AP may need to implement a transcoding function to:—
  i) Provide Mobile IP mapping to allow multiple IP addresses from the different connection paths to be represented as a single IP end point to the SIP server.
  ii) Provide transcoding to the media streams so that any limitations in the media gateway or with the end point device associated with the SIP server can be mitigated.
  iii) Map audio data and subset of SIP/IP to full SIP/RTP for any endpoint device that does not support full SIP.
  iv) Provide IP routing and tunneling functions such as NAT traversal and VPN functions.

Figure 27:
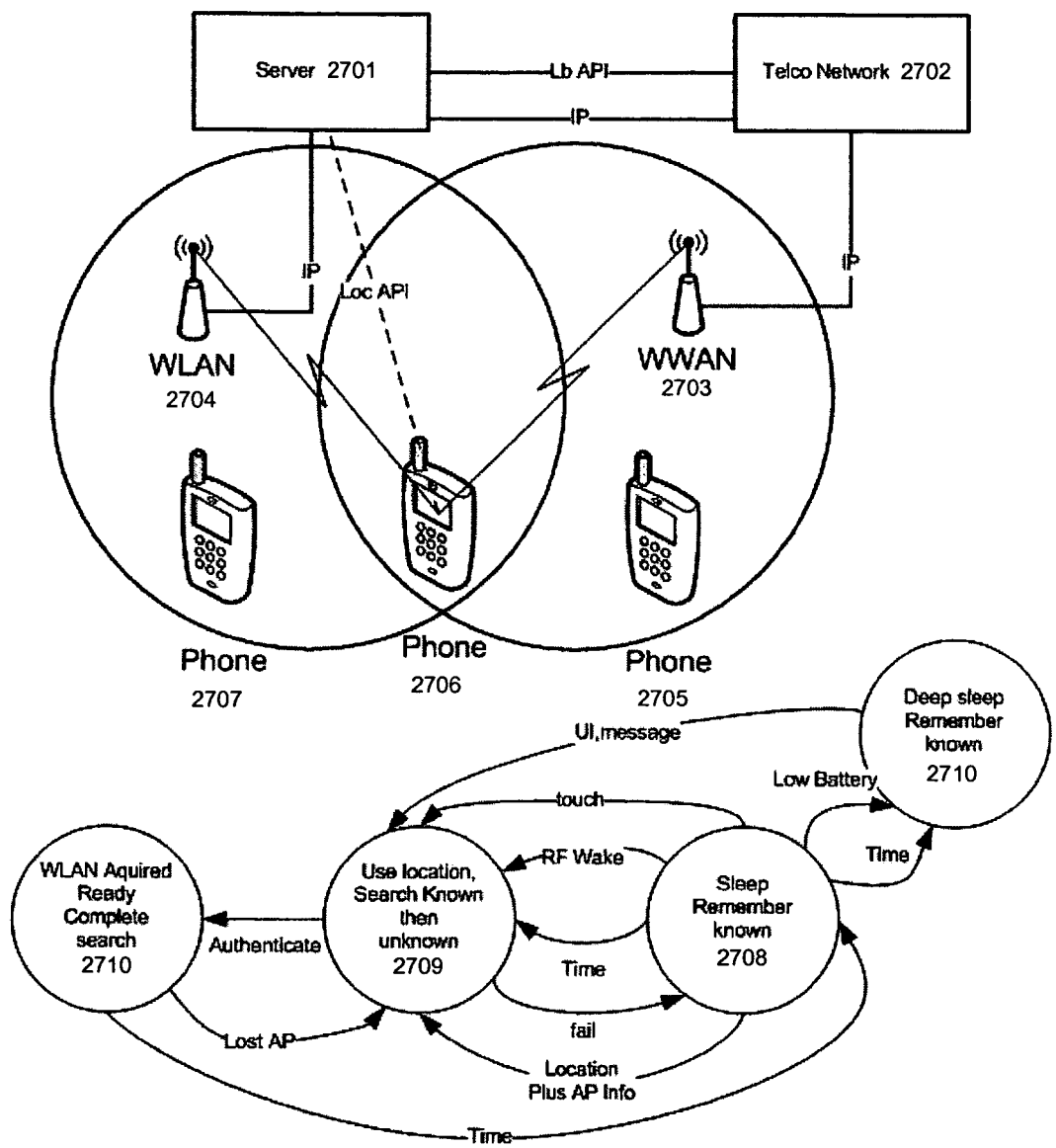
FIG. 27 depicts a state diagram and physical schematic for power management and service discovery in a WLAN and WWAN system in accordance with one embodiment of the invention.

FIG. 27 represents a state diagram and physical schematic for power management and service discovery in a WLAN, WWAN system. The handset can be in one of three coverage zones: WWAN only 2705, WLAN 2707 only or an overlap zone 2706. Power Management involves cycling between the different discovery and active states. If a handset comes into an overlap zone it will look for resources due to three possible stimuli; a timer, location information received from the WWAN system (or local GPS data although no phones currently support this), or any touch by the user on the UI provided that an update has not recently been undertaken. The phone then moves into discovery mode 2709 where it will first use information provided by any location message, such as cell ID or latitude and longitude, then search for known devices based on location information and any movement vector information it has, and finally go through a full unknown device scan. At the end of this phase it will either succeed and move to 2710 'ready' or fail and return to sleep until next woken. If the phone has good battery it may continue with further searches once the first WLAN AP has been acquired so that it can populate its WLAN access table with a complete map. This search does not have to be exhaustive as it is likely to be undertaken reasonably regularly so eventually a full picture will be built up. Any discovered APs are notified to the home server to keep the map up to date. Also other phones will be searching and cooperatively building the map.

If the AP is lost the handset returns to its search pattern in 2709. After a period of time the handset may return to sleep state 2708 but it now remembers its AP table and can quickly wake and re-acquire the AP. It is undefined currently whether the WLAN RF circuitry can be woken from sleep state by a message or whether the AP receive RF is fully off. A deep sleep state 2710 can be entered where the unit no longer searches for WLAN, but can be woken by receiving a message or a UI command.

Figure 28A:
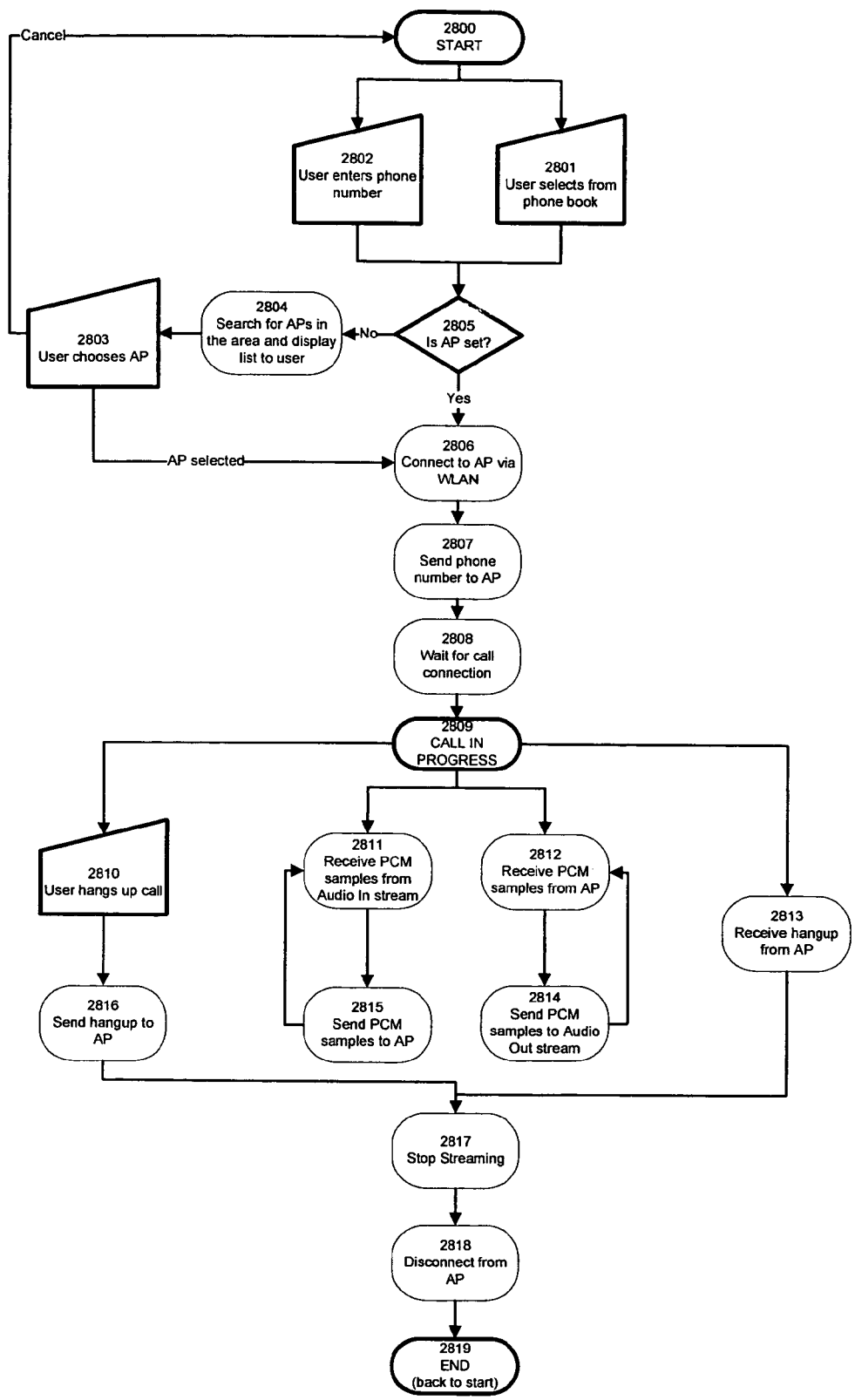
FIGS. 28a and 28b are a flow diagrams showing the procedures carried out in both the handset and AP when making a call where the SIP and RTP clients are both implemented in full on the AP in accordance with one embodiment of the invention.
Figure 28B:
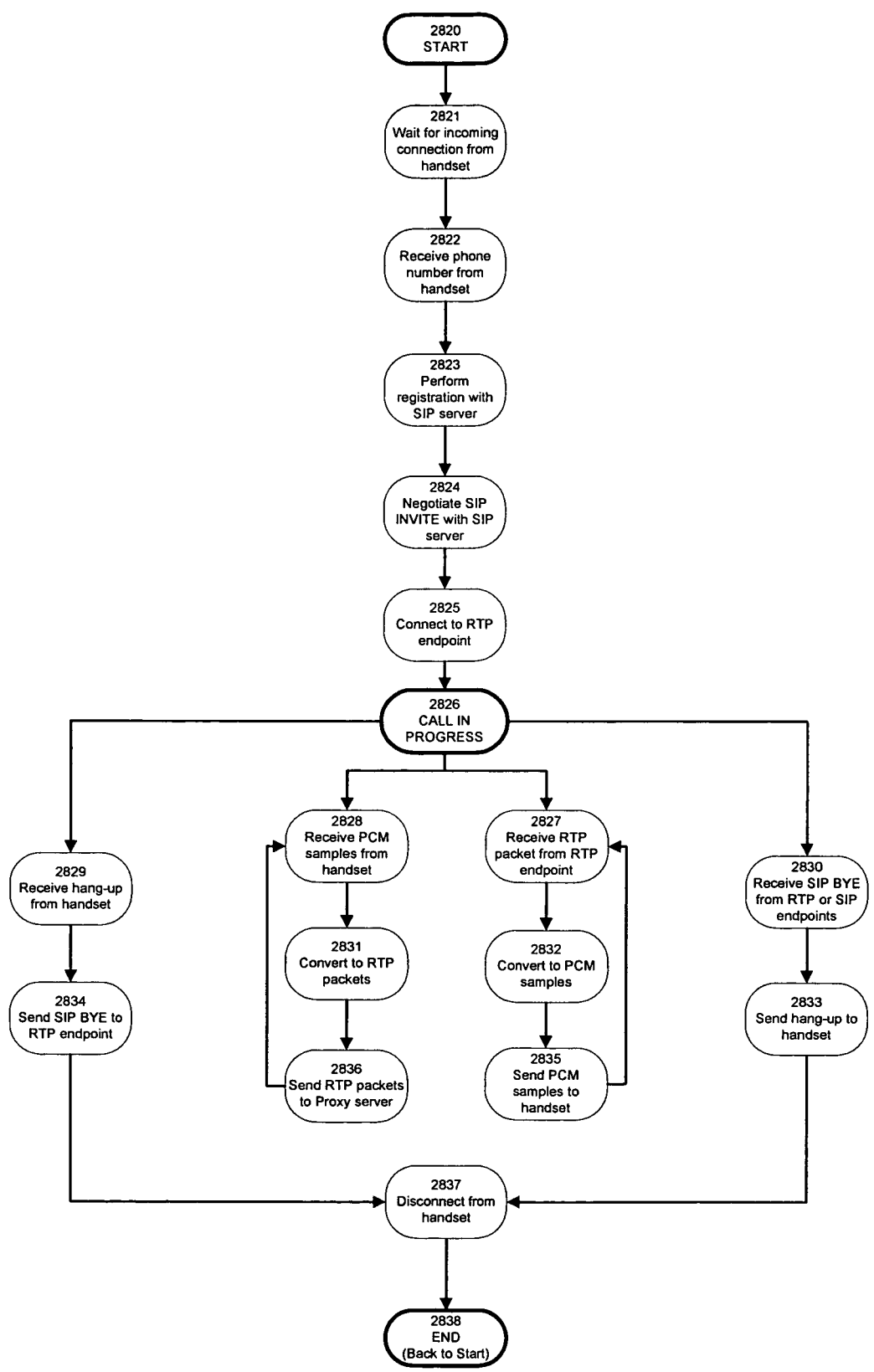
Figure 28C:
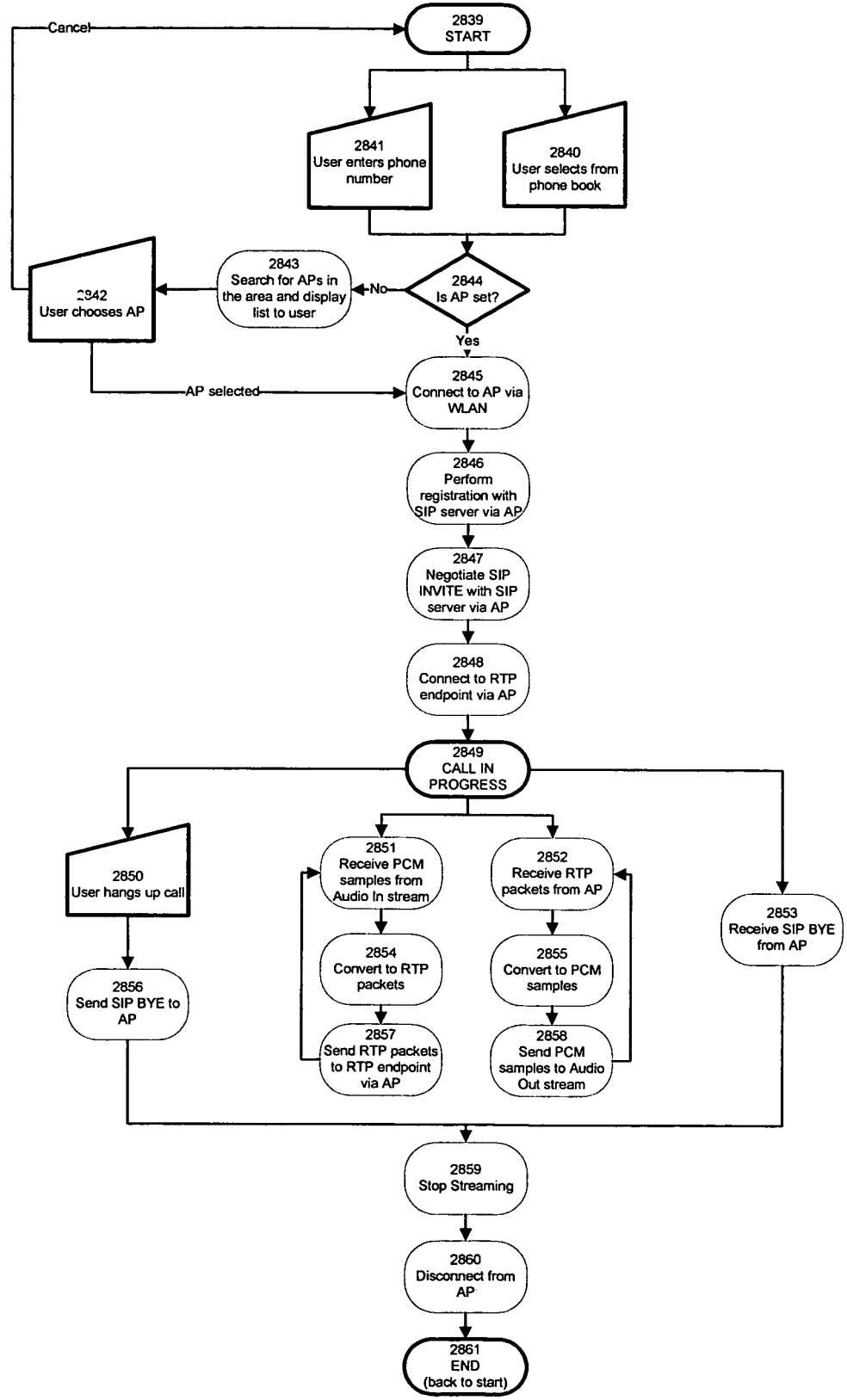
FIGS. 28c and 28d are a flow diagrams showing the procedures carried out in both the handset and AP when making a call where the SIP and RTP clients are both implemented in full on the handset in accordance with one embodiment of the invention.
Figure 28D:
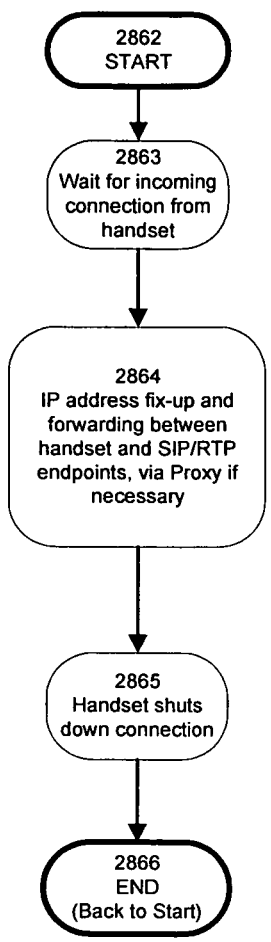

FIGS. 28a-e illustrate the procedures carried out in both the handset and AP when making a call for different scenarios. These diagrams are representative of all the calling procedures possible and are by no means exhaustive. In particular, FIGS. 28a and b show the instance where the SIP and RTP clients are both implemented in full on the AP. FIGS. 28c and 28d show the situation where the SIP and RTP clients are both implemented in full on the handset.

It is clear that some parts of the SIP and/or RTP functionality can be moved to the "other" device in both of these cases without substantially altering the calling procedure. As such, these two pairs of diagrams should be understood as the two endpoints of a series of diagrams (not shown) where various parts of the SIP and/or RTP procedures are implemented on the handset with the rest being done on the AP. All communication between the handset and the AP may be done via a repeater and all communication between the AP and the SIP/RTP servers may be done via a proxy. These are not shown for the sake of clarity. Conversion to and from PCM/RTP may optionally include encoding and decoding.

FIG. 28a illustrates the calling procedure using a very simple system on the handset, with the more complicated procedures of SIP and RTP being carried out wholly on the AP (see FIG. 28b). The process starts when the user selects the number that they wish to call, for example, by entering it manually 2802 or selecting it from the phonebook of the handset 2801. The phone number then needs to be passed to the AP to make the call but this can only be done once a connection to the AP has been established. It is therefore necessary to check which AP the user wishes to connect to so, if they have not selected one before, they must do so now before a call can be made. This is done by searching for all available APs in the vicinity in step 2804, displaying a list to the user, and waiting for them to select their preferred AP in step 2803. If the user does not select an AP then the call is cancelled and the process starts again. Once the user has selected an AP then they will not need to do so again unless they wish to. The user can also be allowed to change their AP selection between calls, or the system may automatically choose one from a list of pre-known preferred APs, but this does not affect the calling procedure and is therefore again for the sake of clarity, not shown in the diagram. The handset connects to the AP in step 2806 and sends it the phone number that the user wishes to call in step 2807. Once the call is connected, the handset begins to send PCM audio data from its audio in stream (usually from a microphone) to the AP in step 2815 and to play PCM audio data received from the AP to the audio out stream (usually an earpiece or headset) in steps 2812 and 2814. This continues until the call is hung up, either by the user 2810 or the AP in step 2813, when the streams will be stopped and the connection with the AP dropped.

FIG. 28b illustrates the procedure on the AP that corresponds to the handset procedure in FIG. 28a. The process starts when the handset has connected to the AP and sent the phone number that the user wishes to call in step 2822. The AP then connects to, and authenticates with, a SIP server using the settings for the AP in step 2823 or, if the system allows various users to connect via any AP, settings it receives as part of the connection procedure with the phone (for clarity, not shown). The AP will then convert the phone number into a SIP INVITE command and negotiate with the SIP server to get an endpoint (usually a media gateway connected to the PSTN) for sending and receiving VoIP RTP packets in step 2824. Once the RTP endpoint is known a connection is established in step 2825 and the call can proceed. The AP takes the PCM data from the handset in step 2828 and converts it to RTP packets in step 2831 before sending it on to the RTP endpoint in step 2836. Audio is simultaneously received from the RTP endpoint in step 2827 and converted in the reverse manner in step 2832 before being sent to the handset in step 2835. This exchange of audio/RTP data continues until the call is hung up, either by the handset in step 2829 or by either of the SIP or RTP endpoints sending a SIP BYE command in step 2830, and the connection to the handset is dropped.

FIG. 28c illustrates the procedure on the handset where SIP and RTP are both done wholly on the handset. This is a similar procedure to that in FIG. 28a, but all of the SIP negotiation and RTP (de)packetisation from FIG. 28b are moved from the AP to the handset. The diagram should be self-explanatory with reference to the explanations of FIGS. 28a and b.

Figure 28E:
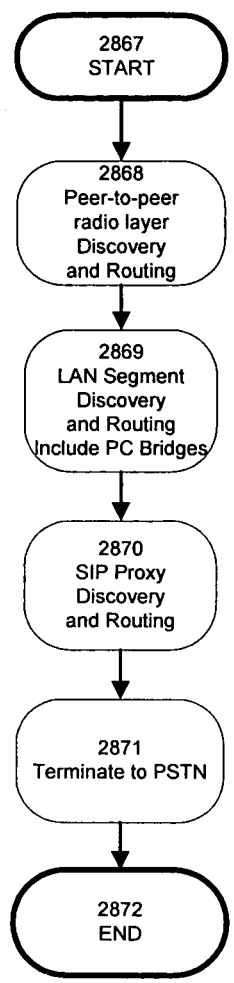
FIG. 28e are flow diagrams that illustrate the peer-to-peer discovery process.

FIG. 28d illustrates the procedure on the AP that corresponds to the handset procedure in FIG. 28c. With all of the SIP and RTP functionality on the handset the AP is now a simple pass-through server—effectively a proxy. It performs IP packet "fix-up", until the call is hung up, by changing the source and destination addresses in order that any messages sent to it may be forwarded between the handset and the SIP/RTP endpoints FIG. 28e illustrated the peer-to-peer discovery process by which a handset attempting to make a call first determines whether it can connect directly to another handset at the radio layer 2868, if this is not possible it determines whether a connection on the LAN 2869 is possible, then checks whether the other party can be connected by an all IP SIP routing 2870 and if these all fail terminates the call via the PSTN 2871. In this way the client always attempts to make a peer-to-peer connection if possible. In particular when checking on the LAN segment a check of each cooperative PC is also made to see if it has a bridge to a $3^{rd}$ party VoIP service such as SKYPE or MSN.

FIG. 29 illustrates the security and authentication procedure for a wireless LAN connection to the system. A phone 2900 connects to a WLAN AP 2901 to a broadband router 2902 that contains a firewall and access control system, then via broadband connection to our SIP server 2903 which may authenticate directly or via a proxy 2904. A gateway to the PSTN 2905 is provided allowing calls to be made to the PSTN 2906.

The phone looks for a WLAN AP resource using its radio search capability and making use of any access permission information stored in its memory. If access is allowed the phone will authenticate to the AP and obtain a local IP connection. The radio layer connection may be protected by WEP for Wi-Fi APs and Bluetooth Encryption for Bluetooth APs. The IP segment of the connection is only physically protected by default.

The phone will then request external access from the router at the edge of the LAN. This may either ask the SIP server 2903 which may proxy the authentication to one ore more chained AAA servers, may grant the request itself from its local authentication table or the phone may bypass the SIP server and request IP access directly from a AAA authority. In this case two authorizations will be required: one to the Internet access and one to the SIP access. These authentication messages use MD5 encryption and security is provided at a transaction level.

The system may then optionally use encryption on either or both the SIP message 2909 and the RTP VoIP streams 2910. To make a call, the phone sends a SIP Invite message to the SIP server which may check on a transaction by transaction basis with an external AAA server 2904 that the person is in good standing to make a call. If call rights are granted then VoIP call is initiated. Note that the final leg of the call 2911 on the PSTN circuit is only protected through physical security.

The at risk elements in the system are as follows.

TABLE 15

| Activity | Security | Code |
|---|---|---|
| Radio authentication | Key exchange security | Bluetooth pairing or Wi-Fi WEP/WEP2 |
| Authentication to IP Access | transactional security | Radius, MD5 |
| Authentication to SIP Server | transactional security | Radius, MD5 |
| AIR | | |
| SIP & RTP | Encryption of link | WEP or Bluetooth Encryption |
| LAN | | |
| SIP & RTP Or Secure SIP | None normally Transactional or Encryption | IPSec or SecSIP |
| And/or Secure VoIP | Encryption | IPSec or VoSIP |

The greatest security concern in these systems is attacks to the LAN segment. Both session and stream are available at this point and physical security may be low particularly if the wireless router is in a public hot spot such as a café. Although all the authentications are made using MD5 challenge-response secure methods, once the user had authenticated another person would be able to insert a listening device between the WLAN AP and the router and eavesdrop or attempt to take over the connection. Such attacks are not simple. Eavesdropping is very easy and would not disrupt the system. Masquerading and take-over attacks would be detectable as the WLAN router would likely lose its connectivity to the Internet in the process. Therefore several levels of defence could be used:
 a) Weakly encrypt the RTP stream to avoid casual eavesdropping. This can be effected with a simple substitution cipher.
 b) Strongly encrypt the RTP stream. This would make the link secure.
 c) Strongly encrypt the SIP messages
 d) Encrypt the entire channel using IPSec, VoSIP or similar methods.

The authentication interchanges have been illustrated in the diagram with a simple request/acknowledge transaction. In some known systems, a challenge response mechanism such as MD5 is used. In these schemes, the mobile subscriber requests access, receives a challenge message, responds to this message and then receives an authentication message. The challenge and response are matched using public key encryption techniques to prove that both parties have a shared secret (username/password) without transmitting that secret password over the link.

Phone based authentication may use the Subscriber Identity Module SIM to provide authentication either by performing the authentication using the SIM ID transported over WLAN layers or by requesting username password using the SIM ID as authentication for an initial transaction and thereafter using the user name password combination.

Referring back to FIG. 11, in order to work with $3^{rd}$ party VoIP systems that are resident on the PC, the $3^{rd}$ Party Authentication 1136 and SIP translation (control and media) 1137 are used. These provide a method for interconnecting at the PC level with services such as MSN™ or SKYPE™. In each case the $3^{rd}$ party interoperability element receive the data and control streams from the phone and perform further authentication and media translation. Additionally this PC $3^{rd}$ party interoperability may implement the session bonding roaming and handoff protocols described in FIG. 24 and the cooperative tunneling agent which is described above.

Figure 30:
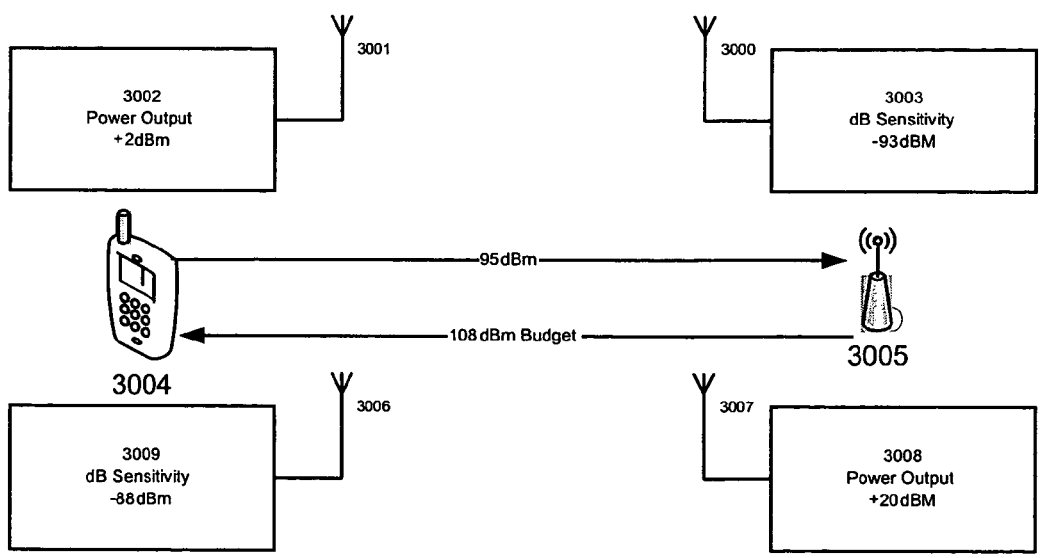
FIG. 30 illustrates the link budget and therefore the maximum achievable range for a WLAN systems in accordance with one embodiment of the invention.

FIG. 30 shows that the range of WLAN systems and indeed all radio systems depends on the link budget and the attenuation caused by intervening materials. The following link budget and sensitivity calculations are given for Bluetooth devices but very similar calculations apply to WLAN devices. The maximum sensitivity achieved by Bluetooth devices today is:
 −86 dBm older CMOS chips
 −88 dBm newer CMOS chips
 Additional −3 dBm Low Noise Amplifier
 Additional −2 dBm Antenna Gain The best products on the market today achieve −90 dBM sensitivity by using newer CMOS chips with high quality antennas. In an improved design we have proposed to use new CMOS with low noise amplifiers and high quality antennas to achieve −93 dBm. This would provide further theoretical range for Bluetooth and is nearing the noise floor for the radio spectrum in question.

An improvement in link budget (difference between transmit power and receive power) of 6 dBm will double the effective range in free space. A rough estimate is that an increase of 10 dBm in-building will double the range. This is a rough estimate as factors unrelated to basic special geometry come in to play, primarily fringing and multi-path problems: Effectively some proportion of the signal is translated into noise within buildings. If good diversity receiving schemes are used that can select and reject this noise then the 6 dB for double the range would apply in buildings as well. Achieving this selectivity is a purpose of this invention.

To assess the link quality one must look at both the Transmit Link Budget and the Receive Link Budget. In each case the noise present at the receive end from other in band noise generators (such as Bluetooth for Wi-Fi and Wi-Fi for Bluetooth) must be considered.

There is interplay between data rate, symbol rate and signal to noise within these systems. Ranges within WLAN are generally quoted at 1 bit in 100 error rate ($10^{-2}$). The error rate rises with range as the signal to noise ratio drops. (A square law for free space and a power of 3.3 for in building.) The audible perception of this error rate will depend on the probability of packet loss due to this bit error rate, the redundancy level of packets and the audible perception of a lost VoIP packet given the ability of CODECs to mask lost packets.

There are a number of practical limits to improving the link budget:—Due to interference considerations and battery consumption within handsets output power is often set quite low. It is difficult to find enough room in a handset to put two high quality antennas for diversity reception. The combination of these factors limits the range capacity of mass produced handsets. A repeater is a good solution in these situations.

The proposed repeater is constructed to optimally use 802.11g with advanced diversity reception to maximize in building transmit range and act as a backbone link so that Bluetooth can be used to make the final short hop to the handsets. This obviates the need to use Bluetooth to repeat itself as it is complicated because of the master/slave role switching that would be needed. The function of this repeater is to translate packets from one protocol into the other and is more fully described in FIG. 22.

To maximize system efficiency within the invented system, it employs:

Multiple interleaved VoIP packets.
    VoIP original RTP1 RTP2 RTP3
    FEC 2×RTP1 RTP1 RTP2 RTP2 RTP3 RTP3
    Interleaved 2×RTP1 RTP2 RTP1 RTP3 RTP2 RTP3

FEC (Forward Error Correction) at the radio layer by setting the appropriate Bluetooth or Wi-Fi FEC parameters. Ensuring that the packets match the Bluetooth and Wi-Fi MTU so that there are no empty packets and so that an error in a radio layer packet does not damage two RTP packets.

Encoding Audio using AMR CODECs that have missing packet masking capability. Encoding audio using small AMR codec so that VoIP packets can be transmitted with multiple copies without overloading the radio channel. Connected using UART giving theoretical 961 kbaud an ACL link is nominal 721 kbps. VoIP using AMR 4.85 can use all 7 channels while still using less than 10% of the link budget thus giving better range and or more channels.

A side effect of using AMR to encode voice is that few packets are sent for a given call. Each Bluetooth packet represents a potential inference event for Wi-Fi and reducing these events helps with co-existence. Finally using these digital methods with error correction and detection allows little or no interference to breakthrough into the perceived audio signal as compared with high bit rate CODECs that do not have error correction such as Bluetooth SCO.

VoIP Packet Redundancy SCHEME

Bluetooth chips that have been created with coexistence capability toggle their coexistence pins for each packet they transmit. Full Diversity schemes for Bluetooth can be achieved but are complex. A simple scheme that will increase the effective range of VoIP calls is as follows: Transmit each VoIP packet in a packet that fits exactly inside one Bluetooth air interface packet. Transmit multiple but odd-numbered (e.g. 3,5,7) copies of each VoIP packet, and toggle the antenna switch for each Bluetooth packet transmit signal. You are then guaranteed that each VoIP packet will be transmitted at least once on two different antennas in the diversity scheme.

Packet Redundancy Scheme

An alternate way to do this is set the Bluetooth hardware Forward Error Correction to transmit 3 Bluetooth packets for every data packet and toggle the antenna as above. Again this will have the effect that at least one copy of each packet will go by an alternate antenna Receive Signal to Noise Level Diversity The can be achieved by measuring the Signal to Noise ratio (RSSI, BER) on the air interface packet pre-amble by switching antennas and choosing the best signal.

In the Bluetooth implementation of the present invention VoIP using AMR 4.85 is implemented so that all 7 channels can be used while still using less than 10% of the link budget thus giving better range and more channels from a given Bluetooth access device. It is advantages that this CODEC is used end to end in the system to provide a high MOS. This compares favourably with the current situation where the audio link is at 50% utilisation (721 kbps) using 2 Bluetooth SCO links giving little headroom for error tolerance.

FIG. 31 illustrates the system elements to permit co-existence between Bluetooth and Wi-Fi systems. WLAN systems in the unlicensed bands have traditionally been free to choose their coding schemes. This has resulted in the two main schemes, Bluetooth and 802.11 having poor intrinsic coexistence features. Bluetooth works by frequency hoping across the entire ICM band. While 802.11 divides the ICM band into 14 sections and picks one particular band for its spread spectrum coding. Thus each time a Bluetooth frequency hop lands in the chosen 802.11 band both systems suffer interference and loose data. Coexistence can be achieved by adaptive methods and proactive methods. The adaptive method used today is for Bluetooth to sense the interference levels on each of its 79 channels and pick those channels on which there is no interference for its hopping sequence. Approximately $1/14$ of the total frequencies are therefore excluded (because the 802.11 specification allows for overlapping bands the calculation is not precise). However in this scheme the Bluetooth device has to learn the sequence which takes time. An improvement can be achieved by sending a signal from the 802.11 hardware to the Bluetooth system to tell it actively what frequency band the 802.11 has chosen. This has the advantage that interference avoidance is immediate. A further improvement can be achieved by actively signaling Bluetooth activity to the Wi-Fi subsystem. This scheme provides considerable interference immunity but further benefits can be achieved in our system as the repeater device has knowledge of both Bluetooth and Wi-Fi timing. The power saving beacon schema of 802.11 allows the repeater device to know when the next transmission from a remote device will be received. This time can be signaled to the Bluetooth subsystem to instruct it not to transmit during this time slot and so avoiding interference with remote 802.11 APs as well. This gives further improvements in interference rejection which translate into increased range or increased capacity for the system as a whole. A subtlety is required to implement this. The beacon time wake up is intended to give the system enough time to start up from its low power state, we want to ensure that the system does not start transmitting in the beacon time.

FIG. 31 illustrates the stack and timing arrangements for this system. Beacon wake events 3115, 3116 occur with an interval between them where the AP can indicate that it has queued data for the mobile device. The mobile device is programmed to wake prior to the beacon time slot 3117, 3118, at time W and begin listening, time W+T for signals from the AP. At the end of this time interval the mobile device either takes action based on some information it received during the beacon or sleeps again after shutting down its systems, time S. The beacon time hold off when Bluetooth may not transmit is the TX time indicated in the diagram and so the system needs to keep track of time W and S so that it may transmit in this time. Time W=wake, TX=beacon transmit, S=going to sleep, Interval=sleep, power down.

The repeater functionality is as follows. The 802.11 subsystem 3107 and the Bluetooth Subsystem 3108 interface to the higher levels within the repeater and to a coexistence means 3104 that uses channel information, Bluetooth activity information and the beacon time (Along with an assessment of the startup time) to holdoff Bluetooth transmissions and so avoid interference with the AP. The AP is not shown in this diagram but would be any standard 802.11 access point: The repeater is located within its coverage. The lower level stacks for 802.11, MAC 2212 and PHY 2213 are explained previously within the patent and have the same function. The Bluetooth stack elements, shown in schematic form 3109, 3110, 3111, 3114 are also explained mode fully elsewhere. The upper level functions of the repeater are to communicate with the subsystems using a driver 3103, control the hardware 3102, extract the data to the IP level 3101 and bridge the data streams together 3100. Further control functions such as setup and configuration may also be provided but are not illustrated.

While the invention has been described in detail with reference to preferred embodiments thereof, it will be apparent to one skilled in the art that various changes can be made, and equivalents employed, without departing from the scope of the invention.

In particular, mobile devices, mobile subscriber and endpoints are used interchangeably and usually refer to a mobile phones with WLAN capability: A general purpose computing device that has been modified to implement a phone function using wireless WAN or wireless LAN protocol can be substituted. An access point (AP) or access node or PC that has radio connectivity and appropriate software to allow it to act as an access point may be substituted for each other. WLAN is used to generically describe any wireless local area network including, but not limited to, Bluetooth, 802.11, DECT and Zigbee. For descriptions of mobile WWAN data usage, UMTS is referred to in the description, but any wide area mobile data might be substituted such as GPRS, EDGE, TETRA et. al.

Smartphones allow complex reprogramming of their functions using downloadable software: It is perfectly possible to use the aforementioned techniques in general purpose mobile phones by reprogramming their firmware or implementing the features in hardware in each case achieving an improvement in performance while reducing flexibility. Although this means a degree of integration and test is required the integration is less onerous as it occurs at a higher level within the stack.

In many examples above it is assumed that the caller is the party that does authentication or roaming but it should be noted that since the system can accept incoming calls the receiver may be the active party and indeed if two members are both using the system both the caller and the receiver may handoff, roam and authenticate.

One possible system has a Bluetooth enabled mobile phone connected by way of a Bluetooth enabled laptop computer to the public Internet terminating at a SIP server which is able to make calls to the PSTN via a media gateway. All IP and protocol translation is handled within the PC making a server based SIP proxy unnecessary. All handoff and handover may be executed by placing SIP server capability in the handset and PC.

The use of the term a SIP server describes a general purpose Session Initiation Protocol servers which might be a SIP server as defined by the IETF or in implementation by JSR116 but substitution of an alternative SIP server such as one based on Global IP (a proprietary specification) or even the older H323 protocol are all possible. Such substitutions and the necessary modification of software would be possible for one skilled in the art who had understood our description based on IETF SIP.

Throughout the patent The Internet is used. For business purposes it is possible to place the servers inside an Intranet which creates a private system. This might either be protected by physical barriers such as the walls of the building and firewalls on any network connections which leave the building or by making a Virtual Private Network (VPN). In these cases a further connection to other private or public systems may be made by configuring SIP proxy and AAA proxy components within the private system to route to the public system when an address can not resolved internally.

We claim:

1. A telecommunications system that connects a mobile unit to an intended recipient for a telephone call, comprising:
   a mobile telecommunications unit; said mobile telecommunications unit having a transmitter unit to simultaneously transmit WLAN and WWAN communications using a WLAN and a WWAN;
   a WLAN access point that receives a communication of the WLAN communications from said mobile unit to be transmitted to said intended recipient through a communication path on a communication network;
   a server connected to the communication network; said server receiving said WLAN and WWAN communications simultaneously;
   wherein said mobile telecommunications unit obtains authentication for accessing said WLAN access point through said WWAN communication when said WLAN access point is not identified as an authorized access point by said mobile unit;
   wherein said communication is encoded into IP before being transmitted to said communication network when said communication path comprises a WLAN;
   wherein the WLAN is arranged to authenticate the mobile telecommunications unit so that the telephone call to the intended recipient is continuous when the communication path switches between utilizing the WLAN communication and utilizing the WWAN communication;
   wherein said mobile unit further comprises an audio processing layer that is independent of, and interacts with, multiple radio communication paths to maintain consistent audio quality; and
   such system is capable of handoff of said communications between WLAN and a WWAN.

2. A telecommunications system as recited in claim 1;
   wherein said communication is encoded into IP before being transmitted to said communication network when said communication path comprises a WWAN, and said WWAN transmits data using a separate data channel.

3. A telecommunications system as recited in claim 1;
   wherein said communication is not encoded into IF' before being transmitted to said communication network when said communication path comprises a WWAN, and said WWAN is not capable of transmitting data using a separate data channel.

4. A telecommunications system as recited in claim 1; wherein said communication is a person's voice, and said IP is VoIP.

5. A telecommunications system as recited in claim 3;
   wherein said system determines whether said communication path comprises said WLAN or said WWAN based on least cost routing algorithms.

6. A telecommunications system as recited in claim 5;
   wherein said least cost algorithm is computed to minimize the inter-network transcoding steps.

7. A telecommunications system as recited in claim 5;
   wherein said system hands off the transmission of said communication between different communication paths seamlessly.

8. A telecommunications system as recited in claim 5;
   wherein said system hands off the transmission of said communication between different communication paths in a manner to appear seamless.

9. A telecommunications system as recited in claim 1; wherein said handoff is accomplished by maintaining at least two radio links simultaneously.

10. A telecommunications system as recited in claim 5; wherein said mobile unit makes said determination.

11. A telecommunications system as recited in claim 1; wherein said WLAN access point is a PC.

12. A telecommunications system as recited in claim 1;
    wherein said transmission between said mobile telecommunications unit and said WLAN access point can utilize a Bluetooth data channel to improve error correction and increase range.

13. A telecommunications system as recited in claim 1; wherein said mobile telecommunications unit transmits data to said WLAN access point using Bluetooth and Wi-Fi, said system determining whether to use Bluetooth or Wi-Fi based on considerations of power consumption and quality of service.

14. A telecommunications system as recited in claim 5; wherein said handoff is controlled by said mobile unit.

15. A telecommunications system as recited in claim 5; wherein said handoff is accomplished by using a conference bridge.

16. A telecommunications system as recited in claim 15; wherein said mobile unit initiates a connection to the conference bridge.

17. A telecommunications system as recited in claim 5; wherein said system performs authentication based on the communication path used.

18. A telecommunications system comprising:
a mobile telecommunications unit that has a transmitter;
an access point, in radio communication with said mobile unit;
wherein said access point has a data receiver to receive data from said mobile unit and a data transmitter to transmit data to a communication network; said access point being identified as an authorized access point by said mobile unit;
wherein said communication network communicates with an intended recipient;
wherein the mobile telecommunications unit simultaneously transmit WLAN and WWAN communications to said intended recipient using a WLAN and a WWAN; and
wherein a communication of the WLAN and WWAN communications is received by said mobile telecommunications unit and is transmitted to a session initiation server to be communicated to said intended recipient through a communication path on said communication network when said communication path comprises a WLAN; wherein said mobile unit obtain authentication information for said access point through said WWAN communications when said access point is not identified as an authorized access point by said mobile unit;
wherein the WLAN is arranged to authenticate the mobile telecommunications unit so that the telephone call to the intended recipient is continuous when the communication path switches between utilizing the WLAN communication and utilizing the WWAN communication;
wherein the mobile unit further comprises an audio processing layer that is independent of, and interacts with, multiple radio communication paths to maintain consistent audio quality; and such system is capable of handoff of said communications between WLAN and WWAN.

19. A telecommunications system as recited in claim 18; wherein said session initiation server is based on the SIP standard.

20. A telecommunications system as recited in claim 18; wherein said communication is transmitted to said session initiation server when said communication path comprises a WWAN, and said WWAN transmits data using a separate data channel.

21. A telecommunications system as recited in claim 18; wherein said communication is not transmitted to a session initiation server when said communication path comprises a WWAN, and said WWAN is not capable of transmitting data using a separate data channel.

22. A telecommunications system as recited in claim 18; wherein said session initiation server is located on said mobile telecommunications unit.

23. A telecommunications system as recited in claim 18; wherein said access point is in radio communication with said mobile telecommunications unit via a repeater.

24. A telecommunications system as recited in claim 23; wherein said repeater comprises two or more WLANs configured to minimize interference.

25. A telecommunications system as recited in claim 23; wherein said repeater can interconnect between WLANs.

26. A telecommunications system as recited in claim 23; wherein said repeater utilizes diversity.

27. A telecommunications system as recited in claim 23; wherein said repeater may connect to a wired phone system.

28. A telecommunications system as recited in claim 23; wherein said repeater maintains contact with said session initiation server allowing incoming calls.

29. A telecommunications system as recited in claim 18; wherein said system discovers the communication paths that are available between said mobile telecommunications unit and said intended recipient.

30. A telecommunications system as recited in claim 18; wherein the parameters of the communication paths discovered for a location are stored in said session initiation server.

31. A telecommunications system as recited in claim 18; wherein mobile telecommunications unit and Access Point respond to a discovery request with its identity and routing parameters.

32. A telecommunications system as recited in claim 30; wherein said mobile telecommunications unit senses the resources available at a particular location to determine the available communication paths for said location and said available communication paths are stored in said session initiation server for that location.

33. A telecommunications system as recited in claim 18; wherein the mobile telecommunications unit enters a sleep mode when not connected to a WLAN;
wherein said mobile unit exits said sleep mode to receive a communication from a WLAN in response to a signal received by said mobile unit through WWAN.

34. A telecommunications system as recited in claim 18; wherein the session initiation server can emulate the UMA protocol.

35. A telecommunications system as recited in claim 18; wherein the Access Point can transcode to a different protocol.

36. A telecommunications system as recited in claim 18; wherein the mobile telecommunications unit plays games while simultaneously communicating to said session initiation server.

37. A telecommunications system as recited in claim 18; wherein the mobile telecommunications unit plays music under control of said session initiation server.

38. A telecommunications system as recited in claim 18; the mobile telecommunications unit wherein said mobile unit further comprises a digital signal processor that processes digital signals within said mobile unit.

39. A telecommunications system as recited in claim 38; wherein said digital signal processor is utilized in encoding said communication into IP.

40. A telecommunications system as recited in claim 18; wherein said mobile telecommunications unit is programmable.

41. A telecommunications system as recited in claim 18; wherein said radio communication may be via an unmodified WLAN Access Point.

42. A telecommunications system as recited in claim 18; wherein said mobile unit compresses the audio prior to transmission over the radio network.

43. A method for sending data from a mobile unit to an intended recipient, comprising the steps of:

receiving a person's communication of WLAN and WWAN communications in a mobile unit, the mobile unit simultaneously transmitting the WLAN and WWAN communications to said intended recipient using a WLAN and a WWAN; wherein said WLAN communications is transmitted to an WLAN access point that is connected to a network, said network being in communication with said intended recipient; and authentication for accessing said WLAN access point for said WLAN communication can be done through said WWAN communication when said access point is not identified as an authorized access point by said mobile device;

transmitting said communication over a path on said network to the intended recipient; and determining whether said path comprises said WLAN or said WWAN based on least cost routing algorithms;

wherein said communication is encoded into IP when said path comprises a WLAN;

wherein said communication is encoded into IP when said path comprises a WWAN that sends data over a separate data channel; and wherein said communication is not encoded into IP when said path comprises a WWAN that is not capable of sending data over a separate data channel wherein the WLAN is arranged to authenticate the mobile telecommunications unit so that the telephone call to the intended recipient is continuous when the communication path switches between utilizing the WLAN communication and utilizing the WWAN communication; and wherein the mobile unit further comprises an audio processing layer that is independent of, and interacts with, multiple radio communication paths to maintain consistent audio quality; and such system is capable of handoff of said communications between WLAN and WWAN.

* * * * *